US008190681B2

(12) United States Patent
Markus et al.

(10) Patent No.: US 8,190,681 B2
(45) Date of Patent: May 29, 2012

(54) COLLECTIONS OF LINKED DATABASES AND SYSTEMS AND METHODS FOR COMMUNICATING ABOUT UPDATES THERETO

(75) Inventors: Michael J. Markus, Litchfield, OH (US); Heather A. Markus, Litchfield, OH (US); Brian N. Smith, Cleveland Hts., OH (US)

(73) Assignee: Within3, Inc., Cleveland, OH (US)

( * ) Notice: Subject to any disclaimer, the term of this patent is extended or adjusted under 35 U.S.C. 154(b) by 353 days.

(21) Appl. No.: 11/989,039

(22) PCT Filed: Jul. 27, 2006

(86) PCT No.: PCT/US2006/029210
§ 371 (c)(1),
(2), (4) Date: Jan. 18, 2008

(87) PCT Pub. No.: WO2007/016252
PCT Pub. Date: Feb. 8, 2007

(65) Prior Publication Data
US 2009/0055476 A1 Feb. 26, 2009

Related U.S. Application Data

(60) Provisional application No. 60/702,940, filed on Jul. 27, 2005.

(51) Int. Cl.
*G06F 15/16* (2006.01)
(52) U.S. Cl. ........................ 709/204; 709/206
(58) Field of Classification Search .................. 709/204, 709/206
See application file for complete search history.

(56) References Cited

U.S. PATENT DOCUMENTS

| 3,509,930 A | 5/1970 | Martain |
| 4,640,329 A | 2/1987 | Nakasaki et al. |
| 4,790,366 A | 12/1988 | Kadota |
| 5,309,355 A | 5/1994 | Lockwood |
| 5,576,951 A | 11/1996 | Lockwood |
| 5,911,687 A | 6/1999 | Sato et al. |
| 6,016,475 A | 1/2000 | Miller et al. |
| 6,103,275 A | 8/2000 | Seitz et al. |

(Continued)

FOREIGN PATENT DOCUMENTS
EP 1288795 3/2003
(Continued)

OTHER PUBLICATIONS

"A Model of Network Capitalism: Basic Ideas and Post-Soviet Evidence", Journal of Economic Issues, Mar. 2004, vol. 38, No. 1, pp. 85-111.

(Continued)

Primary Examiner — Brian P Whipple
(74) Attorney, Agent, or Firm — Fay Sharpe LLP

(57) ABSTRACT

This technology is generally directed to one or more methods or systems relating to personal communication networks. This technology is further directed to methods and systems for communicating about updates to the profiles associated with members of personal communication networks. Still further, this technology is generally directed to informing members of the personal communication network about accolades and historical search data of other members in the personal communication network, thereby giving the members a broader knowledge base in order to determine how much to trust the other members of the personal communication network and to inform members about additional expertise areas of members of the personal communication network.

40 Claims, 26 Drawing Sheets

U.S. PATENT DOCUMENTS

| | | | |
|---|---|---|---|
| 6,108,493 A | 8/2000 | Miller et al. | |
| 6,151,581 A | 11/2000 | Kraftson et al. | |
| 6,175,831 B1 | 1/2001 | Weinreich et al. | |
| 6,223,165 B1* | 4/2001 | Lauffer | 705/8 |
| 6,269,369 B1 | 7/2001 | Robertson | |
| 6,302,844 B1 | 10/2001 | Walker et al. | |
| 6,327,590 B1 | 12/2001 | Chidlovskii et al. | |
| 6,438,539 B1 | 8/2002 | Korolev et al. | |
| 6,508,604 B1 | 1/2003 | Bechmann et al. | |
| 6,549,937 B1 | 4/2003 | Auerback et al. | |
| 6,581,039 B2* | 6/2003 | Marpe et al. | 705/7 |
| 6,658,431 B1 | 12/2003 | Norman, Jr. | |
| 6,671,693 B1* | 12/2003 | Marpe et al. | 1/1 |
| 6,709,681 B2 | 3/2004 | Benjamin et al. | |
| 6,714,916 B1 | 3/2004 | Robertson et al. | |
| 6,745,178 B1 | 6/2004 | Emens et al. | |
| 6,772,139 B1 | 8/2004 | Smith, III | |
| 6,789,089 B2* | 9/2004 | Scoggins | 709/203 |
| 6,947,922 B1 | 9/2005 | Glance | |
| 6,965,313 B1 | 11/2005 | Saylor et al. | |
| 7,047,202 B2* | 5/2006 | Jaipuria et al. | 705/1.1 |
| 7,069,308 B2 | 6/2006 | Abrams | |
| 7,155,419 B2* | 12/2006 | Blackman et al. | 705/80 |
| 7,613,769 B1* | 11/2009 | Hess | 709/203 |
| 2001/0053986 A1 | 12/2001 | Dick | |
| 2002/0023230 A1 | 2/2002 | Bolnick et al. | |
| 2002/0049828 A1 | 4/2002 | Pekarek-Kostka | |
| 2002/0059201 A1* | 5/2002 | Work | 707/3 |
| 2002/0082919 A1* | 6/2002 | Landau et al. | 705/14 |
| 2002/0091667 A1 | 7/2002 | Jaipuria et al. | |
| 2002/0116466 A1 | 8/2002 | Trevithick et al. | |
| 2002/0123053 A1 | 9/2002 | Luo et al. | |
| 2002/0124053 A1 | 9/2002 | Adams et al. | |
| 2002/0135614 A1 | 9/2002 | Bennett | |
| 2002/0169737 A1 | 11/2002 | Armstrong et al. | |
| 2003/0009440 A1 | 1/2003 | Inaba et al. | |
| 2003/0167324 A1 | 9/2003 | Farnham et al. | |
| 2003/0208578 A1* | 11/2003 | Taraborelli et al. | 709/223 |
| 2004/0073476 A1 | 4/2004 | Donahue et al. | |
| 2004/0088312 A1 | 5/2004 | Elder et al. | |
| 2004/0088325 A1 | 5/2004 | Elder et al. | |
| 2004/0122681 A1 | 6/2004 | Ruvolo et al. | |
| 2004/0122803 A1 | 6/2004 | Dom et al. | |
| 2004/0148275 A1 | 7/2004 | Achlioptas | |
| 2004/0153336 A1 | 8/2004 | Virdee et al. | |
| 2004/0176993 A1 | 9/2004 | Rajasingham | |
| 2004/0215793 A1 | 10/2004 | Ryan et al. | |
| 2005/0021630 A1 | 1/2005 | Cannata et al. | |
| 2005/0021750 A1 | 1/2005 | Abrams | |
| 2005/0027802 A1 | 2/2005 | Madsen et al. | |
| 2005/0080854 A1* | 4/2005 | Tervo | 709/206 |
| 2005/0091202 A1 | 4/2005 | Thomas | |
| 2005/0171799 A1 | 8/2005 | Hull et al. | |
| 2005/0198305 A1* | 9/2005 | Pezaris et al. | 709/227 |
| 2005/0216550 A1 | 9/2005 | Paseman et al. | |
| 2005/0246420 A1 | 11/2005 | Little | |
| 2006/0026147 A1 | 2/2006 | Cone et al. | |
| 2006/0042483 A1 | 3/2006 | Work et al. | |
| 2006/0112111 A1 | 5/2006 | Tseng et al. | |
| 2006/0117378 A1 | 6/2006 | Tam et al. | |
| 2006/0184617 A1* | 8/2006 | Nicholas et al. | 709/203 |
| 2006/0218153 A1 | 9/2006 | Voon et al. | |
| 2006/0235873 A1 | 10/2006 | Thomas | |
| 2006/0259957 A1 | 11/2006 | Tam et al. | |
| 2006/0294134 A1 | 12/2006 | Berkhim et al. | |
| 2007/0112719 A1 | 5/2007 | Reich et al. | |
| 2007/0130164 A1 | 6/2007 | Kembel et al. | |
| 2007/0192461 A1 | 8/2007 | Reich et al. | |
| 2007/0214097 A1 | 9/2007 | Parsons et al. | |
| 2007/0226248 A1 | 9/2007 | Darr | |
| 2007/0245245 A1 | 10/2007 | Blue et al. | |
| 2007/0260599 A1 | 11/2007 | McGuire et al. | |
| 2008/0046458 A1 | 2/2008 | Tseng et al. | |
| 2008/0091834 A1 | 4/2008 | Norton | |
| 2008/0104225 A1 | 5/2008 | Zhang et al. | |
| 2008/0104679 A1 | 5/2008 | Craig | |
| 2008/0189621 A1 | 8/2008 | Reich et al. | |
| 2008/0189768 A1 | 8/2008 | Callahan et al. | |
| 2008/0201447 A1 | 8/2008 | Kim | |
| 2008/0255989 A1 | 10/2008 | Altberg et al. | |
| 2008/0301114 A1 | 12/2008 | Hibbets et al. | |
| 2009/0018903 A1* | 1/2009 | Iyer | 705/14 |
| 2009/0070665 A1 | 3/2009 | Chijiiwa et al. | |
| 2009/0070684 A1 | 3/2009 | Aldrich et al. | |
| 2009/0070852 A1 | 3/2009 | Chijiiwa et al. | |
| 2009/0234711 A1 | 9/2009 | Ramer et al. | |

FOREIGN PATENT DOCUMENTS

| | | |
|---|---|---|
| EP | 1338966 | 8/2003 |
| EP | 1338967 | 8/2003 |
| JP | 04163209 | 6/2004 |
| WO | WO 99/23591 | 5/1999 |
| WO | WO 01/16839 | 3/2001 |
| WO | WO 01/86484 | 11/2001 |
| WO | WO 00/68860 | 11/2002 |
| WO | WO 03/030051 | 4/2003 |
| WO | WO 03/052621 | 6/2003 |
| WO | WO 2004/061612 | 7/2004 |
| WO | WO 2005/006152 | 1/2005 |
| WO | WO 2005/013058 | 2/2005 |
| WO | WO 2005/029362 | 3/2005 |

OTHER PUBLICATIONS

Bardon, Debbie, "Online Social Networking for Business: An Interview with Konstantin Guericke Marketing VP, LinkedIn Interview", Online, Nov. 1, 2004, No. 6, vol. 28, p. 25.

Dickie, Jim, Is Social Networking an Overhyped Fad or a Usefull Tool? When Put to the Test, This Sales and Marketing Application Delivers: Reality Check, CRM Magazine, Feb. 1, 2005, vol. 9, p. 20.

Dvorak, John C., "The New Networking Crock: This is Plan, Old-Fashioned, Hopeless, Silicon Valley Utopianism at Work. Grab Hold of Your Wallets and Hold on for Dear Life!", PC Magazine.com, Feb. 11, 2004.

Fitzgerald, Michael, "Internet Working", Technology Review, Apr. 1, 2004, vol. 107, No. 3, p. 44.

Frauenfelder, Mark, "Sir Tim Berners-Lee He Created the Web. Now He's Working on Internet 2.0", Technology Review, Oct. 2004, pp. 40-45.

Gathier, Chris, "West Coast 'Social Networking' Web Sites Attract Users, Investors", Boston Globe, Dec. 7, 2003.

Greenbaum, Joshua, "Circle of Friends: Social Networking Software Can Help Enterprises Take Advantage of Existing Relationships, Both Internally and Externally", Intelligent Enterprise, Apr. 3, 2004, p. 36.

Harney, John, "Social Networks in Sales: Social Network Software Tells Salespeople Who in Their Organization Knows Whom Within a Company They're Trying to Sell to and Then They Can Use the Intermediary to Broker a Sale", KM World, Jun. 1, 2004, No. 6, vol. 13, p. 16.

Herman, Jim, "The New Science of Networks", Business Communications Review, Jun. 1, 2003, No. 6, vol. 33, p. 22.

Hicks, Matt, "Spoke Revs Hosted Enterprises Social Networking Application: The Startup Plans to Offer Spoke Workgroups in the Spring for Smaller Sales Teams that Want to Tap into Social Networking Without Deploying Software", eWeek.com, Mar. 4, 2004.

Hicks, Matt, "Social Networking Stretches its Reach" Two Smaller Companies Move to Integrate the Concept of Mapping Social Connections with Mobile-Phone Text Messaging and With Web Conferencing, eWeek.com, Apr. 8, 2004.

Lee, Ellen, "New 'Social Networking' Sites Help Land Jobs in San Francisco Area", Contra Costa Times, Sep. 17, 2004.

Padgett, Lauree, "Networking Migrating and Aggravating: In Other Words, Discusses Migrating Library Systems, Malware Tools, Social Networking", Information Today, Mar. 1, 2004, No. 3, vol. 21, p. 40.

Pankhurst, Steve, "Social Networks Run on Trust, As Do We At Friends Reunited", Revolution, Feb. 9, 2004, p. 13.

Schofield, Jack, "Software to Help you Network", Computer Weekly, Mar. 16, 2004, p. 32.

Solheim, Shelley, "Social-Networking Vendors Set Their Sights on the Enterprise", eWeek.com, Mar. 19, 2004.

Solheim, Shelley, "Let's Keep in Touch: Social Network Tools Take Air at Enterprise Sales." eWeek, News & Analysis, Mar. 29, 2004, p. 31.

Solomon, Marc, "Searching Becomes Conversing: Social Networking Application for Sales, Recruiting, etc.", Searcher, Mar. 1, 2004, No. 3, vol. 12, p. 16.

Smith, Philip, "Marketing Promise of Social Sites", Revolution, Apr. 21, 2004, p. 17.

Topper, Elisa F., "Working Knowledge: Putting Networks to Work: Professional Development", American Libraries, Dec. 1, 2003, No. 1.1, vol. 34, p. 88.

Whaley, Charles, "Six Degrees of Separation Takes on an Electronic Spin: Social Networking Via the Web is All the Rage, and Venture Capitalists of Throwing Handfuls of Money at Startups", Computing Canada, Mar. 26, 2004, No. 4, vol. 30, p. 13.

International Search Report for WO 2006/036165 (Application No. PCT/US04/38064); Mar. 9, 2006.

International Search Report for WO 2006/036187 (Application No. PCT/US05/06617); May 8, 2007.

International Search Report for WO2006/036216 (Application No. PCT/US05/15952); Aug. 25, 2006.

International Search Report for WO2006/041425 (Application No. PCT/US04/30259); May 30, 2006.

International Search Report for WO2006/055555 (Application No. PCT/US05/41349); Jun. 1, 2006.

International Search Report for WO2006036186 (Application No. PCT/US2005/005847); Apr. 21, 2006.

International Search Report for WO2007005463 (Application No. PCT/US06/25166); Dec. 14, 2007.

Written Opinion for WO 2006/036187 (Application No. PCT/US05/06617); May 8, 2007.

Written Opinion for WO2006/036165 (Application No. PCT/US04/38064); Mar. 9, 2006.

Written Opinion for WO2006/036216 (Application No. PCT/US05/15952); Aug. 25, 2006.

Written Opinion for WO2006/041425 (Application No. PCT/US04/30259); May 30, 2006.

Written Opinion for WO2006/055555 (Application No. PCT/US05/41349; Jun. 1, 2006.

Written Opinion for WO2007005463 (Application No. PCT/US06/25166); Dec. 14, 2007.

Written Opinion for WO2007016252 (Application No. PCT/US06/29210); Jul. 13, 2007.

* cited by examiner

Build Your Network: Send An Invitation

Who to invite:
Invite colleagues whose opinions you value and trust when making decisions regarding any of the medical services you provide. This network should include physicians you trust to provide reliable information or advice regarding medical diagnoses or treatments, or in any other context relevant to your practice of medicine. If you highly value the opinions, judgements, advice, or interpretations of a physician, you should invite them into your Trusted Source Network.

What you can learn:
Information is only as good as the source that delivers it. Building this network can help you manage your current contacts - the physician you trust and know directly - as well as help you identify the trusted sources of your trusted colleagues. Expand your trust network to obtain volumes of valued opinions and reliable information from your colleagues, colleagues' colleagues, or colleagues' colleagues' colleagues.

Full Name: Steven (First Name) Johnson (Last Name)

Email address: sjohnson@anyhospital.com

☐ I attest (under penalty of law) that this person is a real certified physician and that I have read and comply with the MyMedwork terms of service I consult this physician regarding the following medical issues: (check all that apply). Click on any of the filters for a description:

Trust basis: (check all that apply)
- ☐ Diagnostic (description...)
- ☐ Treatment (description...)
- ☐ Pharmacological (description...)
- ☐ Research (description...)
- ☐ Education (description...)
- ☐ Practice Management (description...)

☐ I would like to automatically accept a reciprocal invitation if this physician elects to create one. I feel that I am qualified to provide advice in the following areas:

Reciprocal trust basis: (check all that apply)
- ☐ Diagnostic (description...)
- ☐ Treatment (description...)
- ☐ Pharmacological (description...)
- ☐ Research (description...)
- ☐ Education (description...)
- ☐ Practice Management (description...)

[Send Invitation...]

Fig. 4

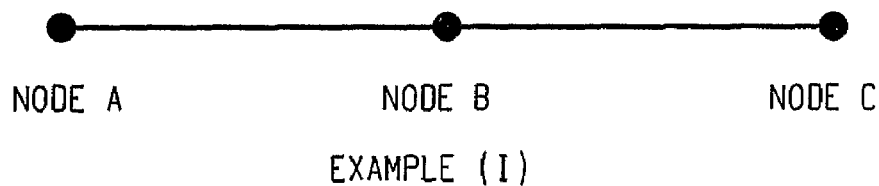
EXAMPLE (I)
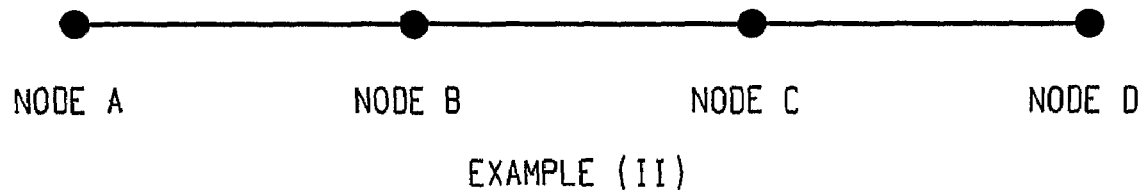
EXAMPLE (II)
Fig. 8

Fig. 15

Dr. Mike Markus' Cancer Homepage
Dr. Mike Markus is dedicated to eliminating cancer as a major health
problem by preventing cancer, saving lives, and diminishing suffering through...
www.drmarkus.net/ -37k - Dec 11, 2004 - Cached - Similar pages
Path: Myself (Dan Schlue) —→ Heather A. McGuire —→ Mike Markus Cancer Research Institute of Virginia
Cancer Research Institute of Virginia. Founded by George DiDomizio. Home,
Cancer Topics, Clinical
Trials, Cancer Statistics, Research & Funding, News, About NCI. Quick Links...
www.criva.com/ - 38k - Dec 11, 2004 - Cached - Similar pages
Path: Myself —→ Mike Markus —→ Brian Smith —→ George DiDomizio Cleveland: Cancer Care
...Use these selections to find out about cancer types... Cancer Care Cleveland
Office,
275 7th Avenue, Cleveland OH, 10001, Ed Januska, CEO ©2003 by Cancer Care,
Inc....
www.cancercare.com/ - 36k - Dec 11, 2004 - Cached - Similar pages
Path: Myself —→ John Coyne —→ Ed Januska Canadian Cancer Society/SociÃ©tÃ©du cancer canadienne
Welcome to the Canadian Cancer Society website (Jacques Cartier, webmaster) -
we are a national, community-based organization of volunteers, whose mission is the
eradication of cancer...
www.cancer.ca/ - 13k - Dec 11, 2004 - Cached - Similar pages
Path: Myself —→ Don Firca —→ Sarah Johnson —→ Seema Saigal —→ Jacques Cartier

*Fig. 21*

COLLECTIONS OF LINKED DATABASES AND SYSTEMS AND METHODS FOR COMMUNICATING ABOUT UPDATES THERETO

CROSS REFERENCE TO RELATED APPLICATIONS

This application claims the benefit of priority from PCT Application No. PCT/US2006/29210, filed on Jul. 27, 2006, which in turn claims the benefit of priority from U.S. Provisional Application No. 60/702,940, filed on Jul. 27, 2005. These prior applications, including the entire written description and drawing figures, are hereby incorporated into the present application by reference.

FIELD

The technology described herein is generally directed to making and using inferential networks. The technology is further directed to making inferential networks using data generated from directed searches of collections of linked databases.

BACKGROUND

When seeking information, many people rely upon sources such as the internet, intranets, pamphlets, magazines, and advertisements to provide them with adequate information and ultimately to aid in their decision-making process. In their searches, however, such sources often include barriers that prevent people from acquiring the valid, reliable and useful information they need. Notably, the anonymity of interconnected computer networks (e.g., the internet) prevents people from trusting the reliability of the information source. Clearly, most people would rather consult their friends and colleagues that they know and trust on a first name basis—or knowledgeable people that they know through their friends and colleagues—when seeking the answer to a particular question. For example, it is well known that informal communication via personal communication networks allows decision makers to reduce the uncertainty regarding unfamiliar technologies and/or products by questioning and consulting trusted others. Posing questions to the members of one's personal communication network allows individuals to obtain first, second, and third-hand accounts from individuals they know directly or through intermediaries. Theoretically, the varied experiences of one's network of peers, acquaintances, and people connected to the person through countless others should more than adequately serve to answer one's questions. Unfortunately, experiential and other knowledge can be difficult to procure; because people are unaware of who in their interpersonal network has experience or information regarding the information they seek, informal searches for advice can seem arbitrary, unfocused, and inefficient. The absence of a formal map or knowledge of communication structure prevents the person from realizing the full potential of the collective IQ of his network of friends and colleagues.

Social network analysis is known and has been described as the mapping and measuring of relationships and flows between people, groups, organizations, computers, or other information/knowledge processing entities.

Social network analysis (SNA) can be used to generate data and draw conclusions based upon the flow of information (or other resources) within a social network. SNA maps the relationships of people within a social network in order to monitor, understand, and utilize the informational flow within the network—who do people get their information from and who do they give it to? A social network is distinct from an organizational chart because the organizational chart shows formal relationships—who works where and who reports to whom. On the other hand, a social-network-analysis map shows more informal relationships—who knows who and who do they share information with. SNA therefore facilitates visualizing and understanding personal relationships that can either facilitate or impede knowledge creation and sharing.

While social network analysis is known, little has been done to streamline its use in an effort to maximize its potential. Further, implementations of social-network analysis have yet to be fully explored. Specifically, most individuals interested in social network data have merely conducted interviews or surveys to obtain the data, and they have then kept the conclusions drawn from such data exclusively in the world of academia. For example, sociologists who studied the diffusion of hybrid seeds through the social networks of farmers in Iowa published their findings in academic journals. They did not, however, disclose the conclusions that they reached based on the analysis of their data to the general public.

SNA is gaining popularity in the field of marketing in order to facilitate the diffusion of innovations (e.g., new products) through customer networks. To this end, a number of companies have conducted preliminary data analyses using SNA in an attempt to map customer networks and determine who most customers contact for advice within a particular domain. In theory, if a company can identify and market to the small percentage of people that make up the opinion leadership or opinion leaders within a given customer network, they can lower both the cost of marketing and the time it takes for the innovation to diffuse through the customer network. Marketing departments are therefore anxious to identify "opinion leaders" within a given field. Such individuals are often highly connected "hubs" within a social network web, and they are important targets for marketing because other members in the customer network often go to them for advice regarding the latest trends and innovations. Clearly, the ability to selectively target opinion leaders, which may cut advertising and marketing costs while simultaneously increasing the effectiveness of marketing messages, would be highly beneficial. However, with current technology, collecting, mapping, and identifying what role each potential customer plays within a given network demands considerable time, effort, and money—making such an approach prohibitive to all but a few companies.

While companies first demonstrated interest in the utility of SNA for targeted marketing in the 1950's, prior-art technology is slow and cumbersome. Most recently in the pharmaceutical domain, some pharmaceutical companies gathered relational information within the medical field by sending a two-page survey to approximately 800,000 physicians in the United States. The pharmaceutical companies paid each participating physician approximately $250 for their time, but the survey yielded only a 5% to 8% response rate—this equates to a one time $10,000,000 to $16,000,000 data-collection procedure. Further limitations on the accuracy or utility of such a strategy include the "static" nature of a one-time survey that fails to capture the dynamic nature of social networks.

Additional prior-art methods for performing SNA exist. One prior art method attempts to draw an inference on who is well known and influential within the field of medicine based on general publications, conference presentations and disclosures. This prior-art method is clearly limited in its lack of a social-network map that clearly depicts the informal and formal communication links between physicians. In other words, the approach is lacking because the data does not directly and clearly correspond to advice, influence, or communication among physicians. Clearly, a new approach to the collection of reliable, valid, meaningful, and cost-effective social-network data is needed.

In the domains of leisure and entertainment, parlor games such as "Six Degrees of Kevin Bacon" and websites such as "Friendster" and "LinkedIn" have demonstrated the ability of an internet system to create social networks of friends and business associates for the purposes of making friends, finding dates, identifying potential job candidates, and seeking employment. A major drawback of such popular social-network sites, however, is the seemingly arbitrariness of the links between users. Allowing "friends" to link to one another in a situation that almost promotes competition to score high volumes of links creates a chaotic environment wherein the context, strength, or value of relationships between users cannot be ascertained. Arbitrary links undermine the utility of social networks that purport to connect people to trustworthy second and third-degree contacts premised upon mutual "friends." Therefore, the data captured and utilized by these websites is highly unreliable. Because the websites have not set parameters, guidelines, or norms to govern or define the links between users, the social networks generated by these sites provide limited aid to users and are nearly useless to parties interested in using social-network data for their own purposes.

Prior-art methods for inviting new people into social networks online or indicating first-degree contacts via a survey typically lack the sophistication to accurately capture the directionality of an established social-network link. It is generally known that social-network links can be either unidirectional (e.g., from A to B) or bi-directional (e.g., from A to B and from B to A). Capturing reliable, valid, and meaningful social-network data typically necessitates the directionality of the links within a social-network. Establishing and recording accurate directionality information about social-network links increases both the meaning and utility of a social-network map and social-network data generated therefrom. Prior-art methods for inviting (or listing) people into a social network often erroneously or prematurely infer bi-directional relationships—and misinterpretation of the directionality of a link leads to misleading information.

More specifically, prior-art methods directed to determining the directionality of social-network links do not provide a way to confirm the actual existence of a unidirectional or bi-directional link. For example, in the prior art, a first person will typically declare that a second person is linked to the first person, and as a result, the second person is incorporated into the first person's social network as a unidirectional or bi-directional link. Note that the prior-art methods don't provide for a way to confirm the existence or directionality of the link. In other words, the prior art doesn't provide for a method by which the second person can confirm or deny the relationship that the first person has alleged. Further, if a first person listed a second person as a member of the first person's social network, then the prior art doesn't provide a way to consult the second person as a way to confirm the relationship. The art therefore needs a more accurate method for determining the directionality of a social-network link.

Relatedly, prior-art internet search engines are typically designed to match search criteria—general words, names, phrases, etc.—with a list of "best fit" websites, based upon keywords and the popularity of the websites. The recent application of social networks to such search engines has introduced the concept of including evaluation of websites by an individual's contacts in the ranked presentation of the "best fit" websites. There still, however, remains a need in the art for an electronic search engine that can both: identify individuals in a field of interest that have knowledge regarding the searched topic and how the searcher is connected through a set of intermediaries to the individual that possesses the knowledge, and allows the searcher to ascertain the degree to which the person and information can be trusted.

Prior-art methods for performing broadcast searches of data are well known. And broadcast searching is widely used in many areas of technology today. Broadcast searching can generally be described as a search method that searches all available searchable data in an effort to locate the sought-after data. Broadcast searching can be slow and cumbersome, and there is therefore a need in the art for an additional search method for searching collections of databases and social networks.

SUMMARY

In general, the present technology provides a method of updating a first member of a personal communication network about a development pertaining to a second member of the personal communication network. The method comprises the steps of establishing the second member as a first-degree contact in the first member's personal communication network in response to the second member's acceptance of an invitation from the first member, acquiring information describing at least an aspect of the development pertaining to the second member, assembling the information in an electronic format to be presented to the first member, and facilitating presentation of the assembled information to the first member.

The present technology further provides a system for updating a first member of a personal communication network about a development pertaining to a second member of the personal communication network. The system comprises a network that includes a server in communication with a remotely-located computer terminal over a communication link. At least one of the server and the computer terminal comprises computer-executable instructions for establishing the second member as a first-degree contact in the first member's personal communication network in response to the second member's acceptance of an invitation from the first member, computer-executable instructions for recording information describing at least an aspect of the development pertaining to the second member, computer-executable instructions for assembling the information in an electronic format to be presented to the first member, and computer-executable instructions for facilitating presentation of the assembled information to the first member.

The present technology further provides a computer-readable medium having computer-executable instructions for performing a method of updating a first member of a personal communication network about a development pertaining to a second member of the personal communication network. The method comprises the steps of establishing the second member as a first-degree contact in the first member's personal communication network in response to the second member's acceptance of an invitation from the first member, recording information describing at least an aspect of the development pertaining to the second member, assembling the information in an electronic format to be presented to the first member, and facilitating presentation of the assembled information to the first member.

The present technology further provides a method for communicating to a first member of a personal communication network of professionals about an accolade pertaining to a second member of the personal communication network of professionals. The accolade in this example is information related to a professional accomplishment, and knowledge of the accolade may raise the other member's trust of the second member. The personal communication network of professionals is a type of social network for professional persons that is based upon communication links between professional persons. The method comprises the steps of: establishing the second member as a contact of the first member in the personal communication network of professionals, updating a second member's profile in the personal communication network of professionals with information pertaining to an accolade of the second member, acquiring the information pertaining to the accolade from the second member's profile, and presenting the information pertaining to the accolade to the first member.

The present technology further provides a computer implemented method of communicating to a first member of a personal communication network with historical search data pertaining to a database of a second member of the personal communication network. The method comprises the steps of: acquiring historical search data, the historical search data including a search term that was entered in a search engine and information describing an association between the search term and the second member, updating the second member's profile in the personal communication network with the historical search data, retrieving the historical search data from the second member's profile, and presenting the historical search data in electronic format to the first member.

The present technology further provides a system for updating a first member of a personal communication network about an accolade pertaining to a second member of the personal communication network. The accolade is information related to a professional accomplishment, and knowledge of the accolade may raise the other member's trust of the second member. The system comprises: a network that includes a server in communication with a remotely-located computer terminal over a communication link. At least one of the server and the computer terminal comprises: means for establishing the second member as a first-degree contact of the first member in the personal communication network; means for updating a second member's profile in the personal communication network with information pertaining to an accolade of the second member; means for acquiring the information pertaining to the accolade from the profile of the second member; means for assembling the information pertaining to the accolade in an electronic format to be presented to the first member; and means for presenting the information pertaining to the accolade to be presented to the first member.

DEFINITIONS

A seed database is a database within a collection of linked databases, wherein the seed database acts as an originating database from which all other databases stem. Stated differently, a seed database is a database that is a central hub in the collection of databases, and all other databases within the collection are linked either directly or indirectly to the seed database.

A direct link between databases occurs where there are no intervening databases between two linked databases. An example of a direct link is provided:

D-D wherein each D represents a database.

An indirect database link occurs where there is at least one intervening database between two databases that are indirectly linked. An example of an indirect link is provided:

$$D_z \dashv D \dashv_n D_z$$

wherein $D_z$ are databases that are indirectly linked;
wherein each D represents a database; and
wherein n is an integer greater than or equal to 1.

A non-limiting example of indirectly linked databases, wherein there are three intervening databases, is provided:

$$D_z\text{-}D\text{-}D\text{-}D\text{-}D_z$$

In one embodiment, a social-network search anchor can generally be described as a first-degree contact in a searcher's social network that the searcher designates as being likely to possess information on a particular subject that is being searched or know of someone who does. In another embodiment, a social-network search anchor is a first-degree contact in a searcher's social network that the searcher designates as being likely to have a social-network profile containing data related to at least a portion of the sought-after data. The search anchor acts as the database/node to which all other databases/nodes are compared when making the relative determination of which database/node is to be searched next when conducting a directed search.

A search anchor can generally be described as a database that the searcher designates as being likely to possess information on a particular subject that is being searched or be directly linked to a database that has the information on a particular subject that is being searched. Additionally, a search anchor is a database that the searcher designates as being likely to have searchable data that is related to at least a portion of the sought-after data. The search anchor acts as the database/node to which all other databases/nodes are compared when making the relative determination of which database/node is to be searched next when conducting a directed search.

In an additional embodiment a social-network search anchor is a first-degree contact in a searcher's social network that the searcher designates as being most likely, relative to all of the searcher's first-degree contacts, to have a social-network profile containing data that will match at least a portion of the search topic or search string. In another embodiment, a social-network search anchor is a first degree node that is designated as being likely to be directly or indirectly connected to personal-communication-network members or nodes who have the sought-after information.

A social-network profile can generally be described as information relating to a social-network member. In one embodiment, a social-network profile is made up of information that has been input by the social-network member. In another embodiment, the social-network profile is itself a searchable database.

A personal-communication-network member is a person that is a node in a personal communication network.

An opinion leader is a person that has an above-average ability to influence people in a field of interest.

A field of interest is an area of specialization.

Personal-communication-network data is any information related to or generated from a personal communication network. Non-limiting examples of personal-communication-network data include: electronic invitations to current and/or new members of a personal-communication network, archives of personal-communication-network communications, persons that are personal-communication-network members, a communication generated from or directed to personal-communication-network member, a personal-communication-network member's FAQ's data, archived search terms generated by a personal-communication-network member, a personal-communication-network member's field of interest, keywords used by a personal-communication-network member, phrases used by a personal-communication-network member, personal-communication-network member names, a personal-communication-network member's specialty or field of interest, the context of a communication to or from a personal-communication-network member, a personal-communication-network member's geographic location, schools attended or general educational background information of a personal-communication-network member, a personal-communication-network member's graduation year, a personal-communication-network member's work location or place of business, a personal-communication-network member's profession, a personal-communication-network member's insurance information, a personal-communication-network member's clinical interests, a personal-communication-network member's research interests, a personal-communication-network member's patients or clients, or any combination thereof.

A personal communication network is a type of social network that is directed to and based upon communication links between nodes. A communication link can generally be described as a link between a first node and a second node, wherein the communication link is established or based upon the communication subject matter between the two nodes. Note that the link is not based solely upon the fact that a first node knows a second node, but instead the link is directed to a common field of interest between the first and second node. Further, a personal communication network is directed to identifying to whom a personal-communication-network member talks to regarding a particular subject or field of interest. Because a personal communication network has communication links that have been created based upon who a node communicates with and seeks advice from or gives advice to regarding the common field of interest, personal communication networks are also commonly referred to as trust networks.

A common field of interest is a field of interest that is shared by two or more people.

A person has a personal-communication-network membership when a person is a node in a personal communication network.

Keyword searching is a manner of searching that uses a string of characters in the search term or search phrase.

A third-degree contact is a social-network member or personal-communication-network member that is three-degrees-of-separation away from a specific member or node.

A second-degree contact is a social-network member or personal-communication-network member that is two-degrees-of-separation away from a specific member or node.

A first-degree contact is a social-network member or personal-communication-network member that is one-degree-of-separation away from a specific member or node.

Degrees of separation is a term that describes the relative position of two nodes in a social network. A second node is one degree of separation away from a first node if the second node is directly linked to the first node; stated differently, a second node is one degree of separation away from a first node if there are no other network nodes intervening between the second node and the first node. Further, a second node is two degrees of separation away from a first node if there is exactly one network node intervening between the second node and the first node. Still further, a second node is three degrees of separation away from a first node if there are exactly two network nodes intervening between the second node and first node. Yet further, a second node is n+1 degrees of separation away from a first node if there are n intervening network nodes between the second node and the first node.

A person's quantity of memberships in personal communication networks equals the number of times a person is identified as a node in one or more personal communication networks.

A node is a person that is a member of a social network or personal communication network.

The frequency of communication describes the number of communications between two people or two nodes over a period of time.

Direction of communication is a term that describes who sent a communication and who received the communication. The direction of communication is from the sender of a communication to the recipient of the communication.

Innovativeness is a relative term that describes the degree to which an individual is relatively earlier in adopting new ideas than other individuals that are members of a social system. Further, innovativeness is a characteristic that describes an individual's receptiveness in adopting a new innovation relative to other members of the population. Innovativeness depends upon many variables; and non-limiting examples of those variables include risk-taking tendencies and knowledge of innovation. The levels of innovative ness (in decreasing order) are: innovators, early adopters, early majority, late majority, and laggards. Innovativeness can also describe an entity's receptiveness in adopting a new innovation relative to other entities. Non-limiting examples of such entities include a consumer, hospital, corporation, insurance company, medical practice, and the like.

A personal-communication-network invitation is an invitation that invites a person or invitee to become a member or node of a personal communication network.

The directionality of a link (or direction of a link) is a term that describes a personal-communication-network link or social-network link. The directionality of a link is based upon identifying the person that both received and accepted a social-network invitation or personal-communication-network invitation from the sender of the social-network invitation or personal-communication-network invitation. The directionality or direction of a link is from the sender of the invitation to the recipient/acceptor of the invitation. Stated differently, the directionality or direction of a link is from the inviter to the invitee, and upon accepting an invitation from the invitor, the invitee becomes a member of the invitor's personal communication network or social network.

A link is a path or connection from one node to another node.

Unidirectional is a term that describes a link between a first node and a second node, wherein the first node has accepted a personal-communication-network invitation from the second node, but the second node hasn't accepted a personal-communication-network invitation from the first node. In such a case, a link has been established only based upon the first node's acceptance of an invitation from the second node.

Bi-directional is a term that describes a link between a first node and a second node, wherein the first node has accepted a personal-communication-network invitation from the second node, and the second node has accepted a personal-communication-network invitation from the first node. In such a case, a link has been established based upon two invitations and acceptances of invitations: the first node's acceptance of an invitation from the second node, and the second node's acceptance of an invitation from the first node.

A personal-communication-network link is a link in a personal-communication-network.

Reciprocal invitation is a return invitation that is sent from an original recipient or invitee back to the original sender or inviter.

An invitation-and-acceptance process is a series of events that enables a person to become a member of a social network or personal communication network.

Mapping is a term that can be used to describe the manner in which a social network, inferential network, personal communication network, or any other collection of linked databases is visually illustrated.

A real-time online network is an online network that manipulates (e.g. records, analyzes, and presents) data in real time.

Local information can be defined as information possessed by people or databases that are directly linked to the searcher initiator.

Linked databases are databases that are connected to each other in some manner. In one embodiment, databases are linked electronically.

In at least one embodiment, the term "user" is used to describe a personal-communication-network member or other authorized individual who has been invited to join a personal communication network by a personal-communication-network member and use the system to communicate with other personal-communication-network members.

In at least one embodiment, a personal-communication-network member is used to describe an individual who has previously joined a personal communication network and has saved a profile of himself/herself in a computer-accessible memory that can be accessed to electronically store information to be used with the system.

An inferential-network search-initiator node is a node in an inferential network that represents a search initiator that has initiated a directed search of a collection of linked databases.

An inferential-network anchor-database node is a node in an inferential network that represents an anchor database that has been used in a directed search of a collection of linked databases.

BRIEF DESCRIPTION OF THE DRAWINGS

FIG. 4 is an illustrative display of an example screen used to specify the context in which a user may consult with a physician to be invited into the user's personal communication network;

FIG. 8 is an illustrative example of relationships between members of a personal communication network;

FIG. 15 is an illustrative example display of the search results of the example search of FIG. 14;

FIG. 21 is an illustrative display of an example search result display in which a web crawler locates websites and web pages relevant to social-network nodes;

DETAILED DESCRIPTION OF ILLUSTRATIVE EMBODIMENTS

Figure 1:
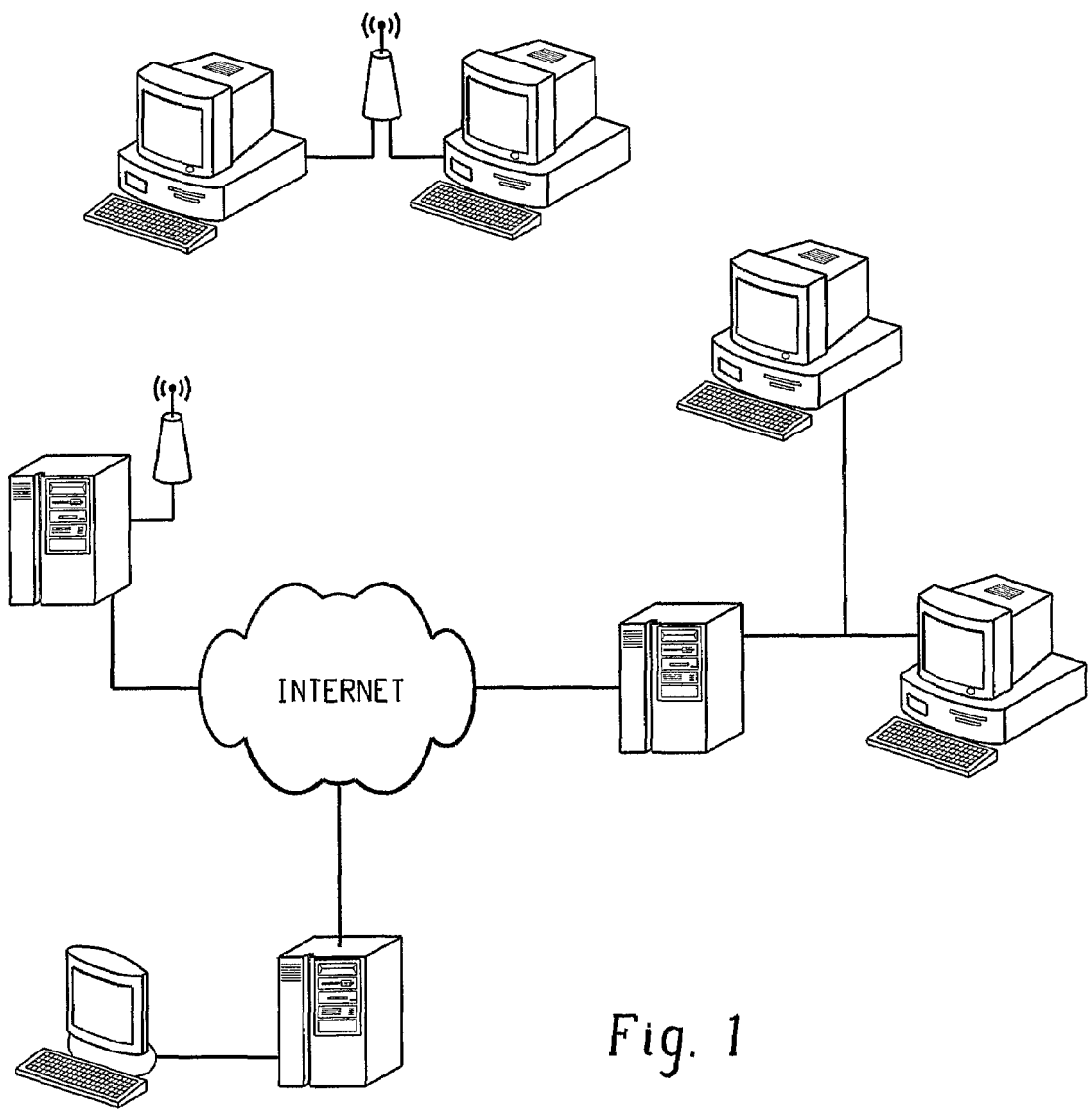
FIG. 1 is an example illustrative arrangement of a network for employing a system employing the technology described herein.
Figure 2:
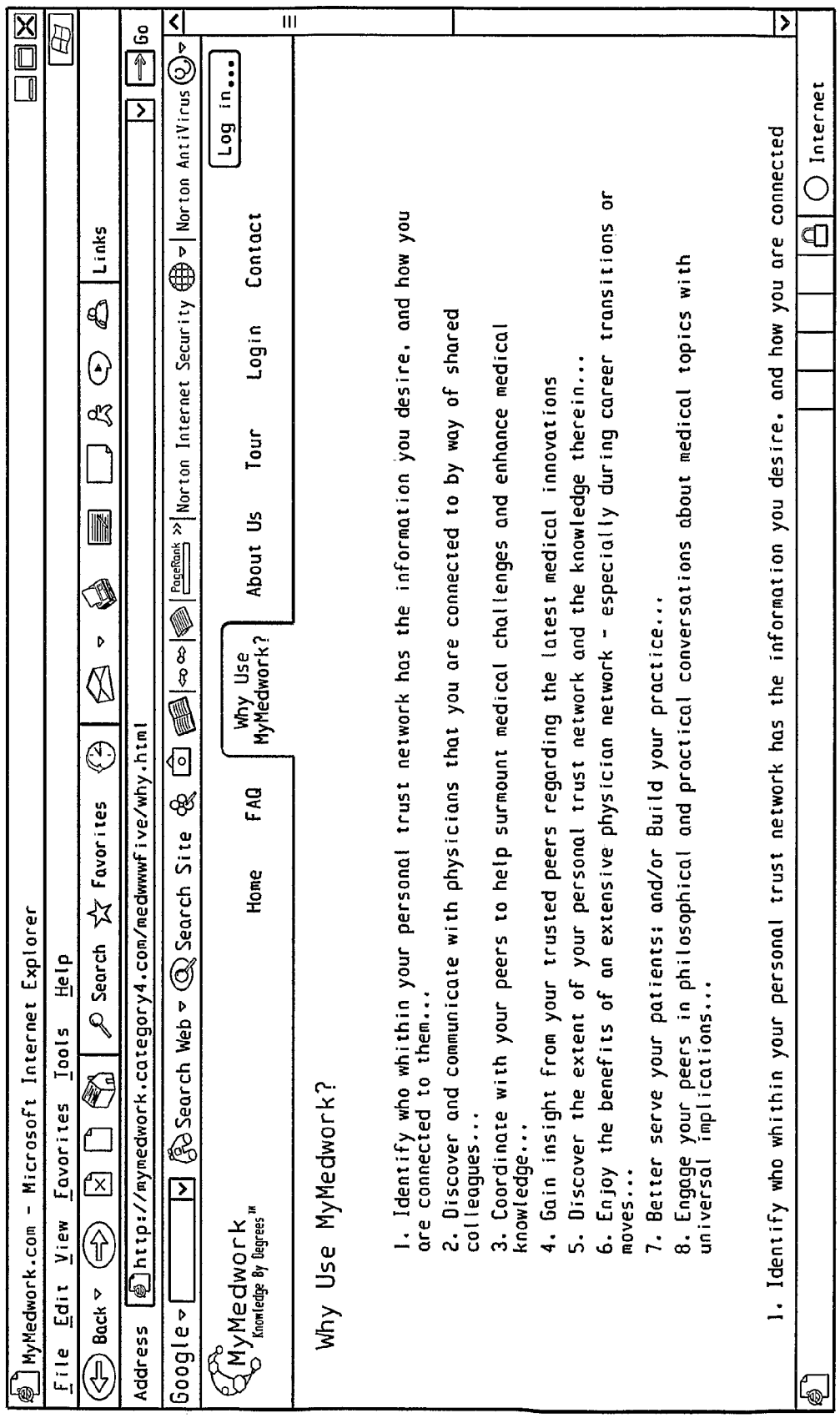
FIG. 2 is an illustrative display of an example screen explaining why one might use an embodiment of the technology described herein.

The technology described herein is generally directed to a collection or collections of linked databases. An embodiment is directed to inferential networks and using inferential networks to analyze data generated from directed searches of collections of linked databases. Further, this technology is directed to social-network maps, social-network-map data, and social-network analysis. One embodiment is generally directed to social-network analysis of a personal communication network or personal communication networks. This technology is also directed to systems and methods relating to collections of linked databases. An embodiment provides a system for classifying at least one personal communication-network member as an opinion leader in a field of interest based at least in part on personal-communication-network data. An additional embodiment is directed to performing a directed search of collectively linked databases or nodes in order to identify at least one database or node having information on the search topic.

As mentioned above, an embodiment provides a system for classifying at least one personal-communication-network member as an opinion leader in a field of interest based at least in part on personal-communication-network data. The system includes a computer-accessible memory for storing computer-readable logic that enables a central processing unit ("CPU") to identify an opinion leader within a field of interest. The CPU can be provided at the server, the computer terminal that the user enters data, or any other computational device. The identification of an individual as an opinion leader can be based upon data generated from the person's participation or interaction with a personal communication network, such as the person's discussion of a particular topic with another member of that person's personal communication network, or merely a membership in the at least one personal communication network.

In one embodiment, an opinion leader is a member of a personal-communication network that has established direct communication with many other members of the network. Direct communication requires the members to be related by a single degree of separation. Being separated by only a single degree of separation, the opinion leader will be a primary contact of many network members. The more members of the network that have the opinion leader as a primary contact, the higher his priority, rank, or reputation, as an opinion leader in that network will be. A predetermined number of primary contacts can be determined and set as the threshold number of contacts required to be considered an opinion leader, or opinion leaders can be selected based on the number of network members they communicate directly relative to other network members.

A single network member can be identified as the only opinion leader per network, that single network member having the most established contacts separated by a single degree of separation in the particular network. Alternately, a plurality of network members can be selected as opinion leaders, the plurality of network members comprising the top x network members in terms of the number of established contacts separated by a single degree of separation in that network.

According to other embodiments, an opinion leader or a plurality of opinion leaders can be selected based on the percentage of network members that have received one or more communications from the opinion leader(s). According to yet another embodiment, an opinion leader can be selected as such based on the overall number of contacts established, regardless of the particular network in which those contacts are established, quantity and direction of invitations linking the opinion leader to other network members, initiation and outcomes of searches conducted by opinion leaders and other members of the network.

An additional embodiment provides for identifying an opinion leader using personal-communication-network data that is based upon or related to an invitation-and-acceptance process. More specifically, the personal-communication-network data that is based upon or relates to an invitation-and-acceptance process can be data relating to electronic invitations to current or new members of a personal communication network.

A further embodiment provides for identifying an opinion leader using personal-communication-network data that is based upon or related to search terms or phrases employed by a personal-communication-network member in conducting a search of personal-communication-network data.

Defined as above, an opinion leader is considered to be a network member whose opinions reach a large audience relative to the opinions of other members of that network. Typically, the opinion leader's comments have grown to be well respected in a particular field over time due at least in part to the knowledge, experience, or familiarity with the subject matter on which the opinion leader comments. This respect, in turn, motivates physicians or others seeking to gain knowledge about this subject matter to invite the opinion leader to join their personal network as a primary contact, separated by only one degree of separation. As the number of network members that list the opinion leader as a primary contact increases, so does the opinion leader's prospective audience and therefore, his ability to influence the knowledge of those audience members.

The system for classifying at least one personal-communication-network member as an opinion leader can optionally identify, or otherwise classify at least one personal-communication-network member as an opinion leader in a field of interest based upon the quantity of memberships that the at least one personal-communication-network member has in personal communication networks, wherein all of the networks have the field of interest in common. Thus, one or more opinion leaders can be identified specifically for the particular field of interest.

Computer-readable logic can optionally be provided according to an embodiment of the technology described herein to identify or classify a person as an opinion leader within a field of interest based upon the quantity of electronic communications that the person has sent to personal-communication-network members in the field of interest. Likewise, the one or more opinion leaders can be identified and classified according to instructions within computer-readable logic that classifies a person as an opinion leader within a field of interest based upon the quantity of electronic communications that the person has received from personal-communication-network members in the field of interest. Alternate embodiments consider a combined number of sent and received electronic communications to identify an opinion leader. Other factors, such as the direction and quantity of invitations or connections between nodes, frequency of communication between nodes, the number of words in a communication between nodes, the direction of communication between nodes, the number of key words in a communication between nodes, the search terms and results generated by the nodes, and combinations thereof, for example, can also be used in addition to, or in lieu of, any other factor mentioned above.

An alternate embodiment provides a system for assessing a person's likelihood to use a concept or product that is new to the person. The system includes computer-readable logic for classifying a person's innovativeness based upon the quantity of personal-communication-network invitations the person has received from a personal-communication-network member.

A network member considered to be an innovator, as that term is used herein, is a network member who is more likely to adopt, or otherwise adapt his practice to include a novel technology, treatment, therapeutic agent, ideology, or other advance (collectively referred to as a "recent development") than other network members who are not innovators. Similar to the description above for identifying an opinion leader, an innovator can be selected as the network member who is likely to be the first to adopt a recent development, or as the top y network members who are likely to be the first y people to adopt the recent development. Alternately, the innovator(s) of a particular network can be identified as the z % of network members who are likely to adopt a recent development within a predetermined timeframe. These are but a few examples of the many possible ways to identify the innovator(s) of a network, and should not be considered an exhaustive listing of all possibilities.

Any factor that tends to indicate a network member's likelihood to adopt or otherwise utilize a given recent development can be used to identify the innovator(s) of that network. Non-limiting examples of such factors include: the time between a similar recent development's introduction to the market and a time when the network member adopted the similar recent development; the network member's participation in experimental studies; the length of time required for the person to respond to a personal-communication-network invitation; the duration of prescriptions written by network members; the number of invitations sent to a potential user/member; publications by the network member discussing efforts to develop the recent development; anticipation of the recent development; opinions expressed by opinion leader(s); or opinions by other network members respected by the network member. Any of the factors chosen to identify the innovator(s) of a network can be suitably weighted to fine tune the algorithm used to quantify the degree of innovativeness used to identify innovators.

As mentioned above, innovativeness can be classified based upon the number of invitations sent to a potential user/member, wherein the invitations are directed to the invitee joining a social network or a personal-communication network. Some individuals may require only one invitation to convince them to join—these are the innovators. Others may require up to ten or fifteen invitations from current users before deciding to join—these are the laggards. Innovativeness classifications can be used in marketing campaigns in which innovators can be targeted first, then early adopters, early majority, late majority, and laggards (innovators being the most innovative and laggards being the least innovative).

In one embodiment for classifying a person's innovativeness, an innovativeness classification is arrived at by using computer-readable logic that employs a function that is based upon personal-communication-network data in combination with a statistical diffusion curve and innovativeness classifications (as defined by diffusion researchers). In one embodiment, the statistical diffusion curve is an s-shaped curve that plots the percentage of a population that has adopted an innovation over time. In theory (and as verified by data), once the percent of population adopting an innovation hits roughly 20%, the rate of adopting rapidly increases, and then tapers off as the percent of population adopting the innovation hits about 80%.

It is common for opinion leaders to also be considered innovators because of the personality traits common amongst authoritative figures in a particular field and innovators in that same field. Accordingly, whether a network member is considered to be an opinion leader can optionally be a factor used to determine whether that network member is also an innovator.

In addition to the above, at least one embodiment provides for searching personal-communication-network data that is in the form of electronic or electronically searchable communications between personal-communication-network members. An embodiment that employs the search method provides computer-readable logic for determining or identifying the use of one or more words or phrases in a communication or communications between two personal-communication-network members. Computer-readable logic can be used to search for a string of characters within one or more databases of recorded electronic or electronically searchable communication(s) from one personal-communication-network member to another. The computer-readable logic searches the personal-communication-network communications and quantifies or qualifies the use of at least one string of characters, e.g., word or phrase, within the communications.

An additional embodiment provides for using computer-readable logic to search personal-communication-network data that is in the form of electronic or electronically searchable communications between personal-communication-network members or nodes. A use of such an embodiment can be directed to identifying a topic of discussion or common field of interest between two or more personal-communication-network members. This embodiment provides for using computer-readable logic to search one or more databases of recorded electronic or electronically searchable communication(s) between personal-communication-network communications for words or phrases associated with a search term or search phrase. The computer-readable logic identifies the words or phrases relating to a field of interest and can thereby identify a topic of discussion or field of interest in a particular communication or communications.

In an embodiment of the technology described herein, personal-communication-network data in any known form of communication can be subject to SNA via computer-readable logic. In a further embodiment, personal-communication-network data in any known form of electronic or electronically-searchable communication can be subject to SNA via computer-readable logic. Non-limiting examples of useful forms of known electronic or electronically-searchable communications include: electronic mail (email), chat, online chat, and discussion boards.

Further, regarding the above-mentioned communication between nodes, another embodiment uses computer-readable logic to identify and define communication contexts among personal-communication-network users. Stated differently, the embodiment identifies one or more topics of discussion within a communication between two nodes. The communication contexts will most likely be dependent upon the audience and network boundary. In an example relating to the medical domain, non-limiting examples of communication contexts or general topics of discussion include: medicine, pediatrics, aerospace medicine, diagnosis and treatment, pharmacology, asthma, allergy and immunology, anesthesiology, colon and rectal surgery, dermatology, emergency medicine, family practice, general preventive medicine, internal medicine, critical care medicine, medical genetics, neurology, physical medicine and rehabilitation, preventive medicine, psychiatry, molecular genetic pathology, neurological surgery, diagnostic radiology, neuroradiology, nuclear medicine, obstetrics, gynecology, occupational medicine, ophthalmology, orthopaedic surgery, otolaryngology, pathology-anatomic and clinical pediatrics, plastic surgery, preventive medicine, public health, radiation oncology, radiology-diagnostic surgery, thoracic surgery, urology, abdominal radiology, addiction psychiatry, adolescent medicine, adult reconstructive orthopaedics, blood banking/transfusion medicine, cardiothoracic radiology, cardiovascular disease, chemical pathology, child neurology, clinical cardiac electrophysiology, clinical neurophysiology, clinical and laboratory immunology, craniofacial surgery, critical care medicine, cytopathology, dermatopathology, developmental-behavioral pediatrics, endovascular surgical neuroradiology, foot and ankle orthopaedics, forensic pathology, forensic psychiatry, gastroenterology, geriatric medicine, geriatric psychiatry, hand surgery, hematology, oncology, infectious disease, interventional cardiology, medical microbiology, medical toxicology, musculoskeletal oncology, musculoskeletal radiology, neonatal-perinatal medicine, nephrology, neurodevelopmental disabilities, neuropathology, neuroradiology, neurotology, nuclear radiology, oncology, orthopaedic sports medicine, orthopaedic surgery of the spine, orthopaedic trauma, pain medicine, pediatric anesthesiology, pediatric cardiology, pediatric critical care medicine, pediatric emergency medicine, pediatric emergency medicine, pediatric endocrinology, pediatric gastroenterology, pediatric hematology/oncology, pediatric infectious diseases, pediatric nephrology, pediatric orthopaedics, pediatric otolaryngology, pediatric pathology, pediatric pulmonology, pediatric radiology, pediatric rehabilitation medicine, pediatric rheumatology, pediatric sports medicine, pediatric surgery, pediatric urology, procedural dermatology, pulmonary disease, rheumatology, selective pathology, spinal cord injury, sports medicine, surgical critical care, undersea and hyperbaric medicine, vascular neurology, vascular surgery, vascular and interventional radiology, or a combination thereof.

In another embodiment for using computer-readable logic to identify and define communication contexts or general topics of discussion among personal-communication-network users, employable communication contexts can include any or all fields of interest. For example, if the network involves consumers, and a user or member wants to know what social network or personal-communication-network members are "opinion leaders" on the topic of cars (i.e. who do most consumers consult before buying a car), then one communication context should be for example "automotives." Additional non-limiting examples of general communication contexts, topics of discussion, or fields of interest include: medicine, sports, science, performing arts, mathematics, literature, pharmaceuticals, biotechnology, health sciences, nursing, automotive, social work, dentistry, occupational therapy, physical therapy, rehabilitation counseling, gerontology, health administration, optometry, veterinary medicine, natural sciences, biology, chemistry, physics, forensic science, political science, history, anatomy, biostatistics, physiology, social sciences, philosophy, psychology, sociology, anthropology, education, research, mental health, psychotherapy, health, fitness/exercise, nutrition/diet, athletics/sports, games, hobbies, therapy, engineering, statistics, literature, politics, local government, state government, federal government, advocacy, law, law enforcement, private investigation, military science, journalism, mass communications, consulting, project management, contracting, architecture, religion, spirituality, culture, fine arts, performing arts, art history, dance and choreography, fashion design, interior design, painting, photography, filmmaking, sculpture, theatre, music, martial arts, crafts, entertainment, food, technology, information systems, electronics, business, marketing, management, accounting, economics, finance, entrepreneurship, automotive, real estate, home ownership, insurance, home furnishings, manufacturing, shipping, retail, beauty, fashion, environmental science, nature, animals, pets, botany, agriculture, security, aviation, travel, or a combination thereof.

Still another embodiment provides for evaluating a relationship between two personal-communication-network members wherein computer-readable logic searches one or more databases of personal-communication-network data, including communications between the personal-communication-network members and performs one or all of the following: quantify the number of communications between the members, determine the frequency of electronic communication between the members (frequency can be described in terms of the dimension—number of communications per unit time), recording the number of words in an electronic communication between the members, recording the direction of communication between the members, recording the use of keywords in an electronic communication between the members, or a combination thereof.

The present technology further includes a "social search engine" that allows social-network or personal-communication-network members to search within their networks for other personal communication members or nodes that have access to information that they are seeking. The search component of the embodiment includes computer-readable logic that performs the function of a filtering mechanism, whereby a network member performing a search can use the social search engine's computer-readable logic to search her social network or personal communication network for members that have or are likely to have information of the searched subject. In a further embodiment, all of the search-string information input by a member conducting a search is stored in a searchable database and thereby adds to the personal-communication-network data generated by the member. This may be helpful because it may be beneficial to know what search terms or phrases are most often used by that or other network members.

In one embodiment for searching personal-communication-network data, the search can be directed to a field of interest or characteristics of personal-communication-network members. The search can be as general as "automotives," or as specific as "females between the ages of 12 and 14." A non-limiting list of other potentially searchable topics include: behaviors, needs, desires, trends, and norms.

This technology also provides for using computer-readable logic that searches personal-communication-network data for multiple terms or phrases by initiating the search with a single search term. In other words, an embodiment is directed to using a single term or phrase to initiate a multi-term search of personal-communication-network data. Computer-readable logic initiates a multi-term search of the personal-communication-network data by first identifying one or more terms or phrases that will be searched in addition to the single search term or phrase that was entered by a user. The computer-readable logic does this by associating the single search term or phrase with a predetermined set of additional search terms or search phrases that have been preselected to be searched in addition to the single search term or phrase. The computer-readable logic then applies both the single search term or phrase and the predetermined set of additional search terms or search phrases in a search of one or more databases of personal-communication-network data.

Additionally, if a search term or search phrase used in a personal-communication-network data search does not literally match any terms or phrases in the personal-communication-network data, the present technology has provided computer-readable logic for matching specific conditions, treatments, pharmaceutical drugs, and medical specialties to selected search terms and phrases. Therefore, computer-readable logic will search for at least one predetermined search term or phase that has been associated with the initial search term or phrase. And although there may be no literal match to the initial search term, meaningful search results can still be generated based upon the social search engine's computer-readable logic searching for additional related terms or phrases.

An alternate search embodiment is directed to initiating an internet or intranet search from the personal profile of a social-network member. This embodiment can initiate an internet or intranet search, wherein the search is based at least in part on the name or identity of the social-network member or social-network node. Computer-readable logic can initiate the search by providing for an electronically executable button in an electronic window that displays a profile of information or data relating to a specific social-network node, i.e., social-network member, and when the electronically executable button is electronically pressed—an internet or intranet search is initiated for websites that contain at least a portion of the social-network member's name or identity. In addition to initiating an internet or intranet search using at least a portion of the social-network member's name or identify, another embodiment provides for initiating the search using additional search terms in combination with at least a portion of the social-network member's name or identity.

Another embodiment is directed to initiating a social-network-map data search from an internet or intranet website. More specifically, this embodiment provides for initiating a social-network-map data search from an internet or intranet website by providing an electronically-executable button in the website, wherein when the button is electronically pushed the social-network data search is initiated. The social-network-map data search can be directed to any piece or amount of data. A non-limiting example of a social-network-map data search includes locating a node in a social-network map that represents a person named or identified in the website.

An embodiment also provides for a method directed to establishing a social-network or personal-communication-network link between two people. The invitation-and-acceptance method is directed to sending a social-network or personal-communication-network invitation from a personal-communication-network member, i.e. an inviter, to an invitee. An embodiment of the invitation is directed to making the invitee a member of the inviter's social network or personal communication network. The invitation is not limited to any particular form, but in an embodiment, the invitation is an electronic invitation such as an email. The invitation embodiment has the inviter describe a common field (or fields) of interest between the inviter and invitee. Stated differently, the inviter indicates at least one subject or field of interest that the inviter would like to communicate about with the invitee.

In a further embodiment of the invitation-and-acceptance method, the invitee is provided with an opportunity to send a reciprocal invitation to the original inviter, wherein the original inviter is invited into the invitee's social network or personal communication network.

Another embodiment of the invitation-and-acceptance method also provides for defining the directionality of a link between nodes in a personal-communication-network based upon an indication of whether an original inviter wants to be a member of an original invitee's personal communication network. A social-network or personal-communication-network invitation method generally involves sending a social network or personal-communication-network invitation from one person to another person, i.e., from and inviter to an invitee. And generally, if the invitee accepts the invitation, then the invitee becomes a member of the inviter's social or personal communication network, and thus a unidirectional link is established—from the inviter to the invitee.

An embodiment provides for automatically providing the person that is sending a social network or personal-communication-network invitation with an option to accept a reciprocal invitation from the invitee, should the invitee choose to send a reciprocal invitation. In other words, an original inviter is provided with a way to accept in advance a reciprocal invitation from the invitee, if the invitee should decide to send a reciprocal invitation. A non-limiting example of this embodiment uses computer-readable logic to automatically provide the person that is sending a social network or personal-communication-network invitation with an option to accept a reciprocal invitation from the invitee.

To promote meaningful links between people having a common field of interest, an embodiment provides for a system that helps personal-communication-network members construct meaningful trust networks by providing explicit instructions for an invitation-and-acceptance process used to construct a personal communication network. The system uses computer-readable logic to provide a user with conditions for inviting a person into the user's personal communication network. As a non-limiting example of instructions relating to a personal communication network directed to the medical field, the instructions might read, "Who to invite: Invite colleagues whose opinions you value and often solicit when making medical decisions or considering alternative treatments. This network should include physicians you trust to provide reliable information or advice regarding medical treatments, practices, and advances for the professional services you provide. If you highly value the opinions, judgments, advice, or interpretations of a physician, you should invite them into your trust network. What you can learn: Information is only as good as the source that delivers it. Building this network can help you manage your current contacts—the physicians you trust and know directly—as well as help you identify the trusted sources of your trusted colleagues. Expand your opinion network to obtain volumes of valued opinions and reliable information from your colleagues, colleagues' colleagues, or colleagues' colleagues' colleagues." The system has computer-readable logic that will enable the invitation-and-acceptance instructions to be provided to an inviter that is sending an invitation. These instructions help to ensure that data obtained through personal-communication-network links are meaningful. As a result, a user can be certain that physicians in his personal-communication-network trust each other for valued opinions and advice.

In an embodiment of the invitation-and-acceptance method, a personal-communication-network member (original inviter) sends an invitation, which can be an electronic invitation, to an individual (original invitee). The individual may or may not be a member of a personal communication network, and the invitation invites the invitee into the inviter's personal communication network. In composing an invitation contemplated by the technology disclosed herein, the original inviter can indicate in advance whether, should the inviter receive a reciprocal invitation into the invitee's trust network, the member would accept or decline such an invitation.

The system has computer-readable logic for determining whether an invitee is a current member of a personal communication network; if yes, then in one embodiment an invitation is sent to the invitee's system email address. A system email address is an email address provided by the system to a personal-communication-network member. If the invitee is not a personal-communication-network member, then the invitation is sent to an email address external to the system. Once the invitee reads the email, she can decide whether to accept or decline the invitation. Should she choose to accept, she can indicate whether she wishes to send a reciprocal invitation to the original inviter. If she chooses to send a reciprocal invitation to the original inviter, the system has computer-readable logic that checks for the original inviter's advance indication for either accepting or declining a reciprocal invitation.

In an embodiment of the technology disclosed herein, if an original inviter has indicated in advance that they would accept a reciprocal invitation from an original invitee, and the original invitee has both accepted the original invitation and sent a reciprocal invitation, then the computer-readable logic establishes a bi-directional link. If an original inviter has indicated in advance that they would accept a reciprocal invitation from an original invitee, but the original invitee has only accepted the original invitation and chosen not to send a reciprocal invitation, then the computer-readable logic establishes a unidirectional link from the original inviter to the original invitee. If an original inviter has indicated that they would not accept a reciprocal invitation from an original invitee, and the original invitee accepts the original invitation, then the computer-readable logic establishes a unidirectional link from the original inviter to the original invitee.

The invitation-and-acceptance process affords several opportunities for collecting and storing directional information and confirmation, and such information has implications for searches performed by the members via the site. As a non-limiting example, if a receiving physician (e.g. Dr. Smith) accepts and invitation from an inviter physician (e.g. Dr. Jones), then the system stores this link (as one from Dr. Jones to Dr. Smith. Furthermore, Dr. Smith becomes a member of Dr. Jones' trust network, and Dr. Jones obtains access to Dr. Smith's personal-communication-network data and to the members of Dr. Smith's personal communication network. Likewise, if the receiving physician (Dr. Smith) reciprocates the invitation and the sending physician (Dr. Jones) accepts, then the system stores a second link from Dr. Smith to Dr. Jones, indicating that Dr. Jones is a part of Dr. Smith's trust network as well. Further, Dr. Jones becomes a member of Dr. Smith's trust network, and Dr. Smith obtains access to Dr. Jones' personal-communication-network data and to the members of Dr. Jones' personal communication network.

In the event that a physician declines an invitation, a link is not established, and—although the system stores all invitations and decisions—trust networks usually reflect the convention that a receiving physician that accepts an invitation becomes a part of a sending physician's trust network.

Physicians may have several different sources of advice and information, which they may or may not approach based upon the topic at hand. Such topics may include diagnostic information, treatment recommendations, pharmaceuticals, legal or ethical advice, and the like. Physicians who are respected advisors in terms of diagnoses may not be the best physician to question regarding the latest technological innovations. Therefore, the present technology allows physicians to indicate the topic(s) about which they consult the physician they wish to invite. An embodiment of the present technology implements this idea by way of the non-limiting example:

---

Individual to Invite:
First Name:                                     Last Name:
Type of Practitioner (MD, DO):         Email Address:
I consult this physician regarding the following: (check all that apply)
      _____Pharmacological               _____Practice Management
      _____Diagnostic                         _____Technology
      _____Policy                               _____Procedure
      _____Ethics                               _____Research
      _____Legal

---

The consultation topics checked may also be used as a measurement of trust. For example, if Dr. Gardner indicates that she consults Dr. Harris regarding two topics, but she consults Dr. Johnson regarding five, then it can be inferred that Dr. Gardner trusts Dr. Johnson more than Dr. Harris. Encouraging physicians to indicate the context of their communication with each physician provides a rich and useful database.

A further embodiment is directed to the manner in which social-search-engine search results are presented. In other words, the further embodiment is directed to presenting: 1) personal-communication-network members identified by the personal-communication-network data search; and 2) how the members are linked to the personal-communication-network member performing the search. In an embodiment, the search results are presented in a manner wherein at least one personal-communication-network member is named in a search result, and at least one network path is presented that displays a link or series of links that show how the personal-communication-network member performing the search is linked to the at least one personal-communication-network member identified by the search. The network path can be a visual depiction of a path from one member to another member; links between nodes are conventionally illustrated by strait lines, and nodes are conventionally illustrated by dots or circles.

Still another embodiment is directed to the manner in which social-search-engine search results are presented. More specifically, the embodiment presents: 1) personal-communication-network communications identified by the personal-communication-network data search; and 2) how the personal-communication-network members that generated the communications are linked to the personal-communication-network member performing the search. In other words, the presentation of the social-search engine results displays the both the communications and their source in a visual manner. As mentioned above, the visual manner of presentation is a depiction of a path from one member to another member; links between nodes are conventionally illustrated by straight lines, and nodes are conventionally illustrated by dots or circles.

Yet another embodiment is directed to simultaneously displaying social-network-data search results in combination with internet or intranet search results. In one embodiment, the internet or intranet search results are website search results. One embodiment for accomplishing this simultaneous display of search results uses computer-readable logic to use a first portion of a visual display screen, e.g., a computer monitor, to display social-network-data search results and use a second portion of the visual display screen to display internet search results or intranet search results. One embodiment for displaying social-network-data search results in combination with internet or intranet search results uses two separate electronic windows. Specifically, on a visual-display screen a first electronic window is used for displaying social-network-data search results, and a second electronic window is used for displaying internet search results or intranet search results. There is no limitation on the percentages of a screen that can be used to display either the social-network-data search results or the internet or intranet search results. In one embodiment, at least 50% of the visual display screen is used to display the social-network-data search results. In another embodiment, at least 10% of the visual display screen is used to display the social-network-data search results. In another embodiment, at least 50% of the visual display screen is used to display the internet search results or intranet search results. In still another embodiment, at least 10% of the visual display screen is used to display the internet search results or intranet search results.

This technology will allow personal-communication-network members to analyze personal-communication-network data to obtain search results such as: degrees (the number of direct connections or first-degree contacts a personal-communication-network member has), betweenness (represents a bridge between two cliques or clusters in a person communication network), closeness (a measurement of how close a person is to everyone else in the network), boundary spanners (have access to ideas and information flowing in other clusters—innovators), peripheral players (often connected to networks that are not currently mapped), structural equivalence (determine which people play similar roles in the network), cluster analysis (find cliques and other densely connected clusters), structural holes (find areas of no connection between people that could be used for advantage or opportunity), and E/I Ratio (find which groups in the network are open or closed to other). Personal-communication-network members may also find other statistics useful that are particular to their field of interest. As a non-limiting example, the present technology provides analyses of the percentage of a physician's personal-communication-network using a particular treatment and "distance to X," which allows the physician to determine the shortest path to a target member in the physician's personal communication network.

An embodiment of the technology described herein searches personal-communication-network data using computer-readable logic that employs mathematical algorithms to determine the order of presentation of search results. Such algorithms take into account keywords entered into each personal-communication-network member's profile, field(s) of interest, the likelihood that the target member is the best person to answer the question (based upon personal-communication-network data specific to the target member), degrees of separation from the member conducting the search (degrees or links away), similarity to the searching member (based upon attributes listed in the profiles), physical proximity, and other personal-communication-network data (such as personal-communication-network communications).

Moreover, the search results present the path between personal-communication-network members, e.g., from the personal-communication-network member entering the search terms to the personal-communication-network members identified by the search, which includes all members in the shortest number of links. Therefore, the member performing the search learns who has the information they seek, the personal-communication-network profile of a member or members revealed by the search, and how the members revealed by the search are connected to the member conducting the search.

In an embodiment, social engine search results are presented in an innovative, clear, and tabular manner. The social search engine presents results by clearly denoting who in a member's personal-communication-network has the information being sought and how the searcher is connected to the members revealed by the search. In an embodiment, the columns represent degrees or links between the searching member and the network members revealed by the search. In yet another embodiment, the rows illustrate the relational paths from the searching member to the member(s) revealed by the search. In a further embodiment, highlighted names indicate a personal-communication-network member having the information sought. In another embodiment, the searching member's personal-communication-network profile is shown on the left panel of the results table, and the profile of a personal-communication-network member revealed by the search can be viewed in the right panel by clicking his or her name.

Should the attributes of the personal-communication-network members be of interest, then a personal profile page may be added to the system. In this case, members can input various information about themselves (e.g. fields of interest, credentials, resources, publications, or contact information).

A further embodiment provides a personal-communication-network member with the ability to organize personal-communication-network communications by providing the personal-communication-network member with computer-readable logic for archiving personal-communication-network communications into a personal-communication-network database. The database in turn is searchable by personal-communication-network members, wherein the member performing the archiving designates a searchable term to be associated with the personal-communication-network archive or communication. Upon associating the search term with the personal-communication-network archive or communication, a keyword search of personal-communication-network data that uses the searchable term will return a search result that identifies the personal-communication-network archive or communication.

A further embodiment provides for computer-readable logic that organizes personal-communication-network invitations to email addresses provided by the present technology. In an embodiment, computer-readable logic identifies whether an invitee of a personal-communication-network invitation is a personal-communication-network member. And if the invitee is a personal-communication-network member, then the computer-readable logic directs an invitation to a personal-communication-network electronic mailbox (e-mailbox) provided by the present technology. Stated differently, if an invitee is a personal-communication-network member and receives an invitation from another personal-communication-network member, then that invitation is automatically directed or redirected by the computer-readable logic to an e-mailbox provided by the inventive embodiment.

In another embodiment, the technology does not overwrite personal-communication-network data so as to monitor/record changes in the personal-communication-network data over time. Changes to the network data are preferably stored as new entries in a database, so all entries and revisions are saved in the database, and this database is accessible for personal-communication-network data analyses and the like. Methods of storing electronic data via computers, software, databases, servers, and the like are known and relatively common. In an embodiment, relational databases that are connected to multiple servers or server farms can be employed to store personal-communication-network data.

In an embodiment, the present technology allows for the collection of real-time data. Because an embodiment of the technology provides a system having a server database that stores all information as new—and does not overwrite outdated data—changes in personal communication networks will be stored and traceable so that the dynamic and flexible personal-communication-network data can be analyzed for changes over time. As an example, such changes may include additional links as physicians invite new physicians, forge new friendships, link to physicians they meet via a website, at conferences, or new contacts when they move. Moreover, the database will reflect the deletion or removal of ties when physicians indicate that a relationship or link no longer exists (for reasons such as moves, death, a "falling-out," etc.).

In an embodiment, personal information (or network-profile information) can be verified before a person becomes a personal-communication-network member. For example, if the target members of a personal communication network are an exclusive group (i.e. physicians, attorneys, college students, etc.), then the present technology may require a verification process, wherein a person's information is verified before the person can become a personal-communication-network member. This will not only put the users at ease, but will also ensure the integrity of the collected data. For example, if the social network of attorneys is desired, it is important to ensure that only the network of attorneys is captured, and not the relationships between attorneys, their clients, and their secretaries, etc.

Another embodiment provides a server with computer-readable logic for mapping personal-communication-network paths or links with specificity. In an embodiment, the technology maps two or more personal-communication-network paths or links. In another embodiment, the technology maps three or more personal-communication-network paths or links. In another embodiment, the technology maps four or more personal-communication-network paths or links. In yet another embodiment, the technology maps five or more personal-communication-network paths or links. In still another embodiment, the technology maps a plurality of personal-communication-network paths or links. Pragmatically, personal-communication-network members may want to know all paths that lead from them to a target member for various reasons. Perhaps they have recently spoken to the member who serves as the link in one path, or they prefer to utilize a particular member as a link over another for prestige, or one member is on vacation and therefore cannot serve as a liaison. Whatever the reason behind the desire to see multiple paths, the present technology recognizes and satisfies this desire. Sometimes one direct route is all that is needed, but it may be preferable to have options.

In addition to being invited into a personal communication network, a user can elect to register as the start (or seed) of a new personal communication network that will initially only include that user. In an embodiment, before a user is permitted to register as a new personal-communication-network member, a verification process can optionally be conducted to ensure that the user attempting to register is actually interested or involved in a field of interest. For example, a physician may be verified to be board-certified and duly authorized to practice medicine. According to this physician example, to initiate a new personal communication network, and therefore become a physician within a personal communication network, the user can enter an appropriate URL into an address line of a web-browser displayed by a remote computer terminal in a known manner. Upon accessing the system for the first time, computer-readable logic causes a new-user-registration option to be displayed to the user. To minimize the number of unauthorized users that can use the system for unscrupulous purposes, users can register by creating a profile of themselves before they are able to log in and conduct a search or take advantage of other features of the system. The information entered by the user can be used to confirm the user's status as a licensed physician or other authorized user of the system. Returning users that have already completed their profile can skip the new-user registration step by electing to log in instead. Use of the system following a log-in procedure or after receiving an invitation to join is described in detail below.

In use, an embodiment of the system of the present technology can be accessed by a user by entering an appropriate URL into an address line of a web-browser displayed by a remote computer terminal in a known manner. Upon being invited to join a personal communication network by a personal-communication-network member, a user receives an email with a hyperlink to permit the user to access the system for the first time. Executing the hyperlink causes the display of a new-user-registration interface generated by computer-readable logic. To minimize the number of unauthorized users that can use the system for unscrupulous purposes, even invited users can register by creating a profile of themselves before they are able to log in and conduct a search or take advantage of other features of the system. Returning users that have already completed their profile can skip the new-user registration step by electing to log in instead.

Figure 3:
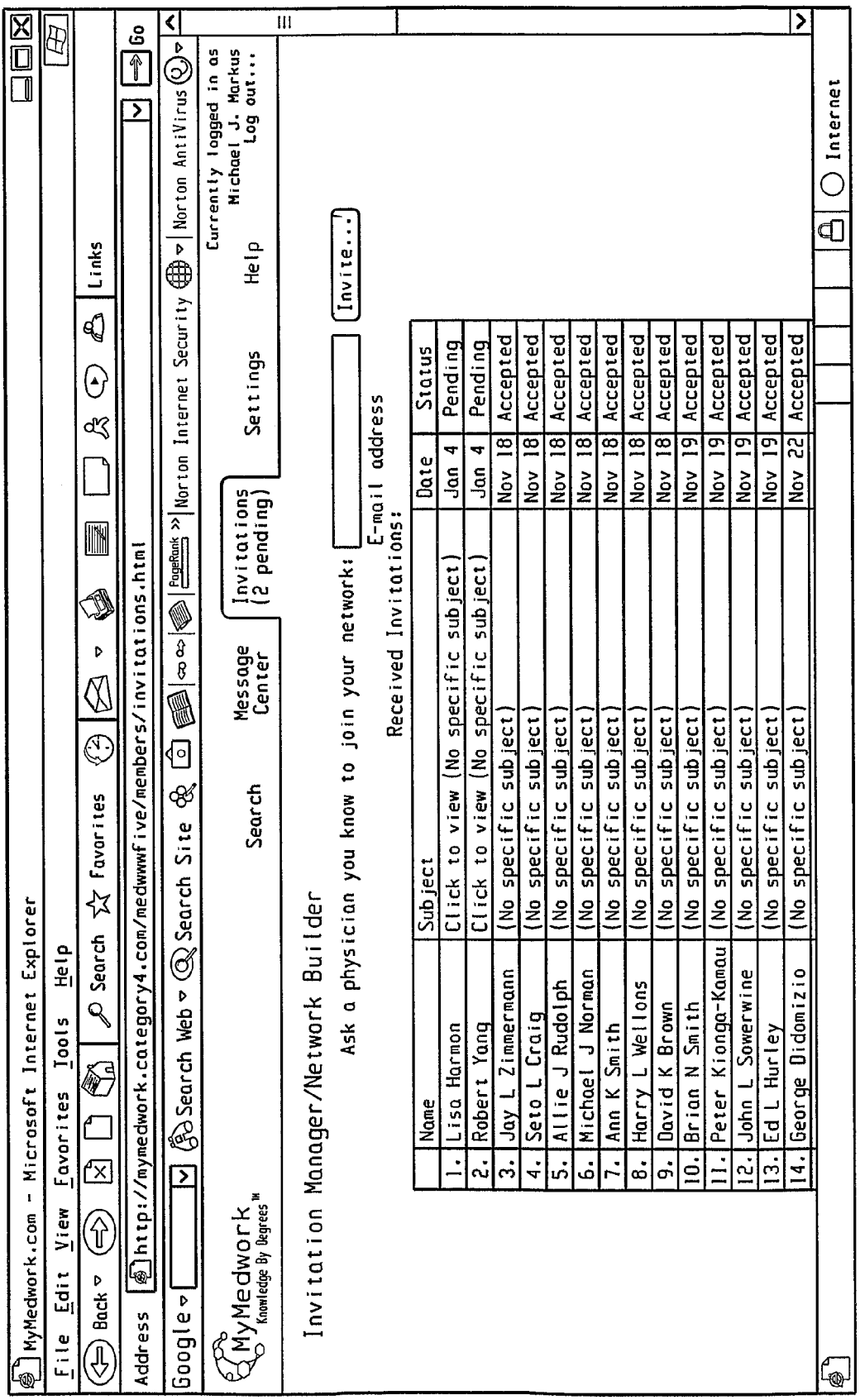
FIG. 3 is an illustrative display of an example invitation screen.

After the invited user has created a profile and logged in, computer-readable instructions cause a home page to be displayed so the user can select from a plurality of options presented as tabs located along an upper portion of the home page. Examples of the options available to logged-in users as shown in FIG. 3 include Home, Search, Message Center, Invitations, Settings, and Help. FIG. 3 is merely an example of the system options that can be provided, but the system of the present technology can offer at least the Search option.

Once a user has generated his/her profile, the user can extend invitations to other registered personal-communication-network members to join the user's personal communication network, and use the Search option to locate personal-communication-network members already in the user's personal communication network and commence communications with those personal-communication-network members that satisfy the user-defined search criteria.

Extending an invitation to join the user's personal communication network can be accomplished by selecting the Invitations tab, which causes an Invitation screen generated by computer-readable logic to be displayed by the monitor as shown in FIG. 3. An invitation to join a personal communication network by selecting the Invitations tab can be sent by entering an email address, contact name, or other information identifying the person or user to be invited into an invitation field. Selecting an Invite button causes the system to convey an invitation via email or other electronic communication to join the user's personal communication network to the invitee who is identified in the invitation field.

For the embodiment shown in FIG. 3, the email address is entered in the invitation field and the Invite button selected. As an example, to illustrate the present technology, the fictitious name and email address of Dr. Steve Johnson at Fake Hospital is used. The detailed display of FIG. 4 generated according to the instructions in the computer-readable logic allows the user to specify the context in which the user will consult with the other physician to be invited into the user's personal communication network. For example, the detailed-invitation screen shown in FIG. 4 allows the user to select one or more of the following consultation contexts: Diagnostic, Treatment, Pharmacological, Research, Education, and Practice Management. Any number of these contexts can be eliminated, replaced with other contexts not specifically recited herein, or supplemented by other contexts without departing from the scope of the disclosure.

To assist the user in selecting a proper context for consultation, the user can view a description of each context by selecting such an option with an electronic pointing device such as a conventional mouse or trackball. In FIG. 4, the (description) option positioned adjacent to the context for which additional information is sought can be selected to view the additional information.

When the user is specifying the context in which he/she will consult with the person or user to be invited, the user can also select whether a reciprocal invitation will automatically be accepted, should the invited person or user elect to send one. A selection whether to accept any reciprocal invitation can be made by choosing the check box, or by any other suitable indicia of the user's desire to automatically accept any reciprocal invitation to join the personal-communication network of the invited person or user. And just as before, the user can specify the areas in which the user feels comfortable rendering advice or generally communicating.

Sending an invitation to an invitee to join a user's personal communication network, and the entire network in general, is an attempt to include that invitee in the personal communication network of the user in the one or more contexts specified by the user. The invitee will be the recipient of an email, or other electronically-originated communication informing the invitee of the existence of the invitation. Other embodiments of the present technology include computer-readable logic that generates a visual notice, audible notice, or a combined visual and audible notice to alert the invitee to the existence of the invitation when the invitee logs onto the system. As shown in FIG. 3, an invitation table of received invitations is generated according to instructions contained in computer-readable logic to list recent invitations, a subject, date of invitation, and status of the invitation. Status symbols such as Accepted, Rejected, Accepted and Reciprocated, Pending, and others can be used to indicate the status of an invitation. Other fields can be included in the invitation table, such as the user-selected context, and the like. Further, computer-readable logic can also be included in the present technology to generate a sent-invitation table to tabulate recent invitations extended by the user, and the status of those invitations.

Figure 5:
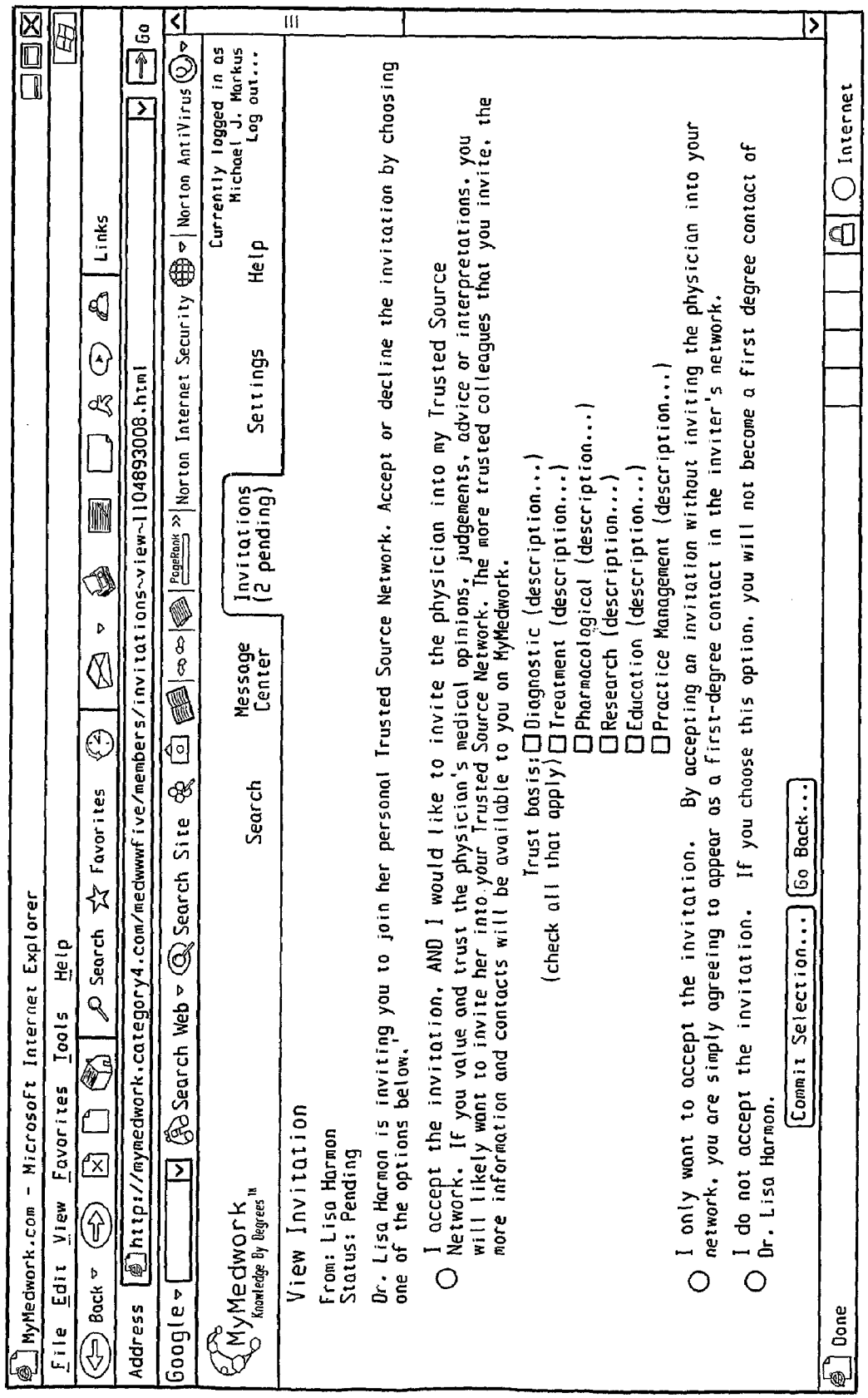
FIG. 5 is an illustrative display of an example invitation response page.

Upon receiving notice of the invitation's existence via email, for example, computer-readable logic included as part of the system presents the invitee with a hyperlink to a response page, where the invitee is presented with a plurality of optional responses as shown in FIG. 5. In the embodiment shown in FIG. 5, the invitee can accept and send a reciprocal invitation, accept without sending a reciprocal invitation, and decline the invitation to join the user's personal communication network.

If the invitee accepts the invitation, a direct communication link is established between the user and the invitee, meaning that the invitee has joined the user's personal communication network, and that the invitee is now a first-degree contact or is separated from the user by only one degree of separation. The user's first-degree contacts are stored electronically in a computer accessible memory provided to a server, for example. Additionally, the invitee has become a member of the user's personal communication network and is thereby linked to all of the nodes in the user's personal communication network. It will be appreciated that the nodes in the user's personal communication network will be two or more degrees of separation away from the invitee once the invitee has accepted an invitation from the user. As a member of the user's personal communication network, the invitee can search or establish communications with other members of the user's personal communication network via the invitee's link through the user.

The fact that the invitee has accepted the invitation to become a first-degree contact of the user does not necessarily mean that the user has become a first-degree contact of the invitee. Whether the user becomes a first-degree contact of the invitee is a consequence of the direction of the communication link. For example, in the scenario where the invitee accepts the user's original invitation and declines to offer a reciprocal invitation to the user, the communication link is said to be unidirectional from the user to the invitee. In this case, the invitee is a first-degree contact of the user, but the user is not a first-degree contact of the invitee.

If the user sent an invitation to the invitee, the invitee accepted the invitation and extended a reciprocal invitation to the user, the user can accept the reciprocal invitation in much the same way as the invitee has to become a first-degree contact of the user. The user's acceptance can be automatic if the user selected the automatic acceptance option shown in FIG. 4, or the user can manually accept such a reciprocal invitation. In this scenario, the communication link between the user and the invitee is a bidirectional communication link, meaning that the user and the invitee are first-degree contacts of each other and consult with each other in the specified contexts.

Finally, the invitee can decline the invitation from the user, thereby not becoming a first-degree contact of the user. If this occurs, computer-readable logic will generate and send a response indicating the invitee's desire to decline the invitation. The invitee's response can optionally include a personal statement issued by the invitee indicating his/her reasons for declining the invitation.

The process of inviting and receiving invitations from others to bring persons or users into the systems entire inventory of personal communication networks (the entire inventory being described as a global network) and establish first-degree contacts is a continuous process. As a non-limiting example, invitations to join a personal-communication network will typically be extended to registered physicians as those extending the invitations encounter medical-related issues with which the invited physicians have experience. Once a physician has accepted an invitation to join a personal communication network, the physician can search for members of that personal communication network to engage with respect to a particular matter, as well as for members of other personal communication networks that are linked by a chain of communication.

A chain of communication is a communication path that has an uninterrupted path from one node to another in a user-specified context. As shown in FIG. 8, example (I) is a chain of communication between Node A and Node C that includes Node B therebetween. This means that Node A can establish communication with Node C using Node B as an introduction, or by merely explaining to Node C that Node A is a contact of Node B. And Node A can form a preliminary opinion about Node C based on what Node A already knows about Node B. If Node B is a very astute individual that exercises great discretion in establishing first degree contacts, Node A can assume that Node C is a reasonably-reliable contact.

Further, example (II) is a four-node chain of communication that includes Nodes A, B, C and D. Node A can establish communication with Node D through Nodes B and C. This does not require Node A to communicate first with Node B, followed by Node B communicating with Node C, and finally Node C communicating with Node D. Instead, Node A can communicate directly with any node, including Node D, in an attempt to establish a dialogue with Node D. As mentioned above, Node A can get an idea of the character of Node C by examining the nodes that stand between Node A and Node D.

Referring again to example (II), Nodes B, C and D are all considered to be in the personal communication network of Node A. Generally, each of Nodes A, B, C and D are considered to be in each other's personal communication network. In fact, any node that a user can establish communications with via an uninterrupted chain of communication is considered to be in the personal communication network of the base node. Note that for a node to be considered within the personal communication network of the user, communications can be established with any number of degrees separating the node from the user. However, the user can elect to display only those possible contacts that are within a predetermined degree of separation from the user. Other criteria can also be used to limit the number of nodes that are displayed in response to a search using the system of the present technology.

In one embodiment, each time a first-degree contact is added to the user's contact list, this increases the user's status as an opinion leader. The system includes computer-readable logic that identifies one or more opinion leaders based on at least the number of first-degree contacts each user has. Additionally, the computer-readable language can identify one or more opinion leaders within a specific subset of the entire network. For instance, the system of the present technology can identify one or more opinion leaders in the field of pharmacology, or one or more opinion leaders in the field of medical education, or one or more opinion leaders in a geographic area, and so on.

The system can optionally generate a listing of the one or more opinion leaders and cause the listing of opinion leaders to be displayed by the computer terminal with which the user accessed the system of the present technology. Computer-readable logic can include instructions controlling the identification and display of the opinion leaders.

The system described herein can optionally include computer-readable logic for identifying one or more innovators. Any number of factors such as those recited above can be considered and assigned a value to be evaluated by an algorithm included in the computer-readable logic.

Figure 6:
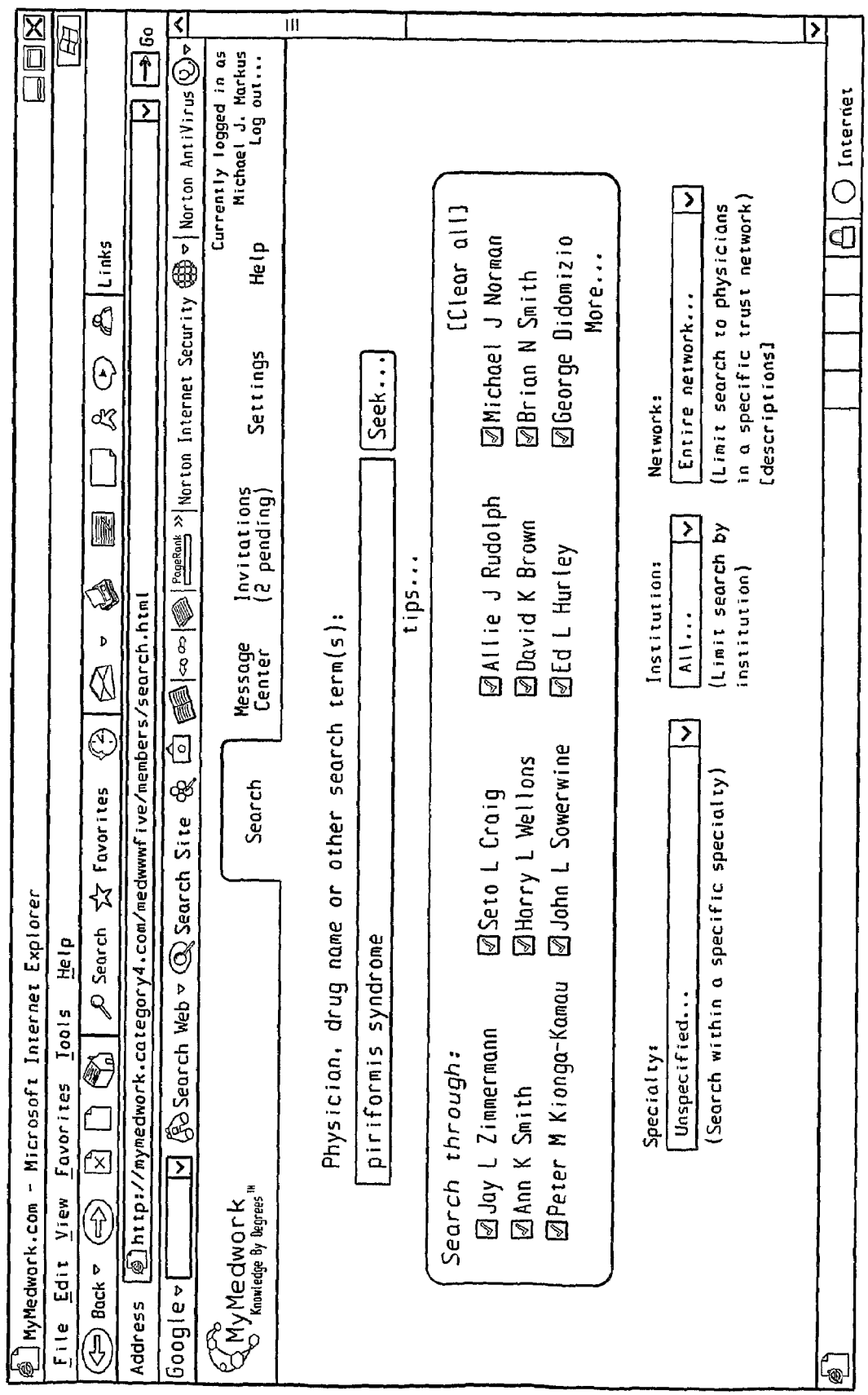
FIG. 6 is an illustrative display of an example search screen.

FIG. 6 is an illustrative arrangement of a Search Screen generated by a CPU under the instruction of computer-readable logic. The user can input one or more key words relating to symptoms, medications, therapeutic agents, ailments, diseases, viral infections, physicians, hospitals, insurance providers, and any other term into a key-word field, and optionally narrow the scope of the search to a particular subcategory of the entire network. For example, the scope of the search can be narrowed by specifying an insurance provider, the number of degrees of separation between the user and another registered physician that could possess knowledge of interest to the user, registered physicians within a predetermined geographic distance from the location of a user or other person, a specific context, and any other specification that will narrow the scope of the search for the key words input by the user.

Selecting the Go button instructs the system to initiate the search based on the user-specified key words entered into the key-word field. Computer-readable logic instructs the search to retrieve all possible results that satisfy the key words. These results are then filtered to remove any results that do not comply with the specifications, or otherwise fall within the desired subcategory selected by the user.

Figure 7:
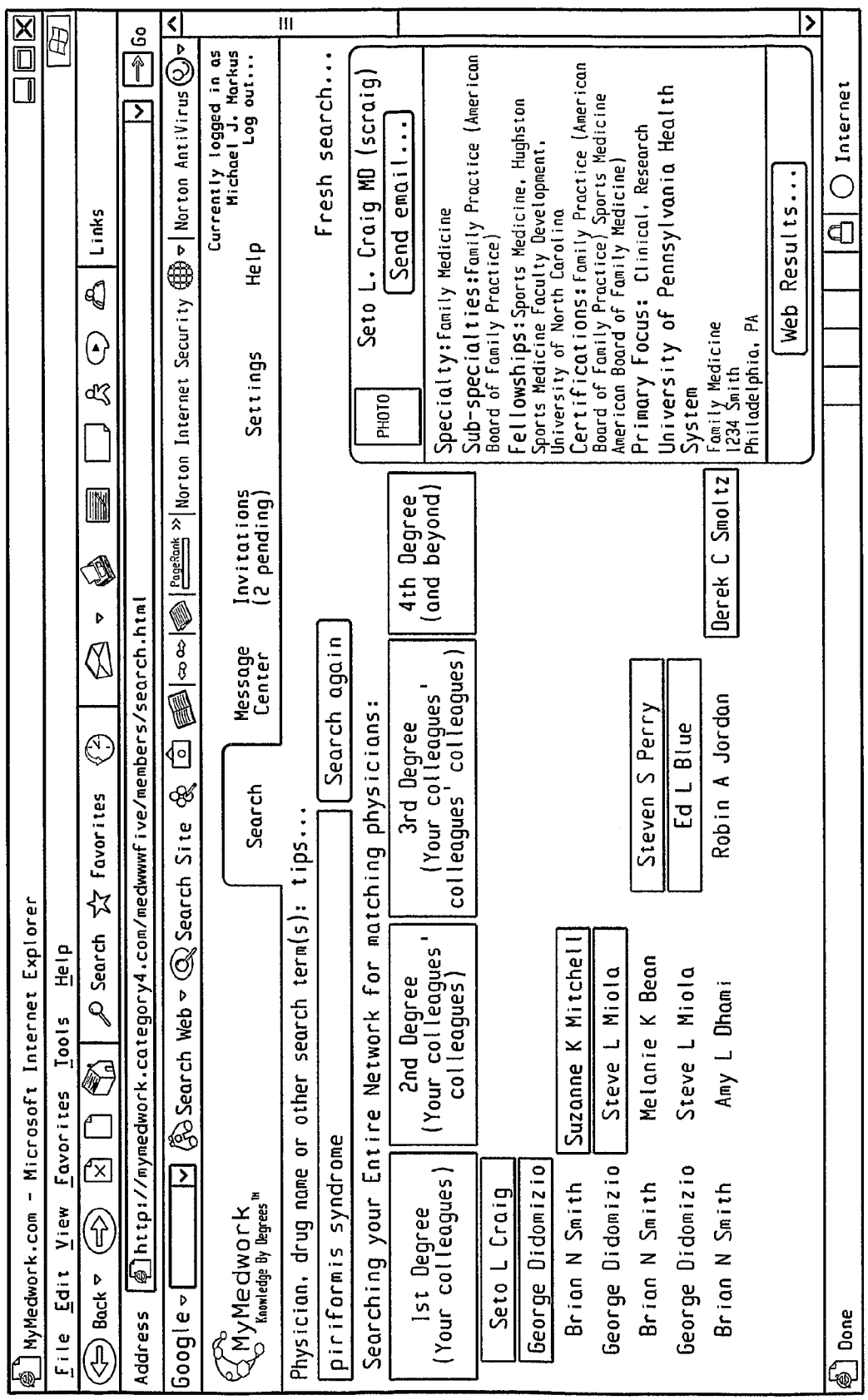
FIG. 7 is an illustrative display of an example search-results screen.

FIG. 7 is an illustrative Search-Results screen generated according to instructions included in computer-readable logic and displayed by the computer terminal. The search results include the names of physicians in the user's personal communication network that satisfy the search criteria input into the Search Screen. The results in FIG. 7 are tabulated with the first-degree, or other most-closely-related contacts that satisfy the query listed at the top of the table. The physicians that satisfy the query can possess knowledge or experience with respect to a certain ailment, practice within a predetermined geographic distance from a user-specified location, or otherwise be relevant with respect to the key words and other criteria used to perform the search.

As shown in FIG. 7, first-degree contacts listed in the first column directly next to the user's profile are physicians who have been personally invited by the user to join the user's personal communication network. The second-degree, or other second most-closely-related contacts are listed in the second column, but starting in rows directly beneath rows that list the most-closely-related contacts. For example, in FIG. 7, the first-degree contacts returned by the search are listed in the first column, and in the first two rows. In rows 3 and 4, the second-degree contacts are listed in the second column, each of said second-degree contacts being separated from the user's profile by a first-degree contact.

The first-degree contact that separates each second-degree contact from the user in FIG. 7 is a node in the chain of communication that extends from the user to the second-degree contact. Obviously, the user trusts the first degree contact, otherwise the user would not have extended an invitation to the first-degree contact to join the user's personal communication network. The user can make a preliminary determination about the trustworthiness of the second-degree contact by considering the first-degree contact (Node B) between the user (Node A) and the second-degree contact (Node C). For example, if the first-degree contact is a physician in a teaching hospital who is primarily concerned with academic research of a particular disease, the second-degree contact known by the first-degree contact is likely to have a similar background. In another example, the first-degree contact may have become less reputable in light of recent accusations of falsifying experimental data. If the second-degree contact was at one time a research partner with the first-degree contact, the user can exercise caution in consulting with the second-degree contact. Regardless of the relationship with the first-degree contact, the user can often obtain an initial impression on the second-degree contact based on his familiarity with the first-degree contact.

Referring once again to FIG. 7, the computer-readable logic can also cause $n^{th}$ degree contacts to be displayed in an arrangement similar to that above for first and second-degree contacts. Third-degree contacts shown in FIG. 7 are listed in the third column from the user and start on row 5. Again, the user can gain a preliminary impression of the trustworthiness of the third-degree contact by considering the trustworthiness of the first and second-degree contacts between the third-degree contact and the user.

Those personal-communication-network members who satisfy the search criteria, key words, etc. . . . entered with the Search Screen can be identified as those search results that are highlighted. Additionally, one or more of the search results can be selected with a cursor, border, or other visual indicia, and profile information of the selected search result can be shown in a profile window displayed by a display device operatively coupled to the computer terminal by computer-readable logic. The user, once making a preliminary determination about the trustworthiness of the selected search result, can communicate with the selected search result via contact information provided in the profile window. Additionally, contact options are presented in the profile window to provide the user with alternate methods of contacting the selected search result. Examples of contact options include Message, allowing the user to send a message to the selected contact with a messenger feature of the present technology; Chat, which allows the user and the selected contact to enter a chat room provided by the present technology; and other contact options.

By way of example, authorized users are permitted to enter a statistical environment where they can obtain statistical information about physicians that are members of at least one personal communication network. Access to the statistical environment can be restricted by a login or other security feature that would allow authorized users into the statistical environment while minimizing the ability of unauthorized users to gain access to the statistical environment. Similar to the Search Screen, the statistical environment will permit the user to specify the statistics the user wishes to observe. For example, the user can select to observe at least one of the opinion leaders, the innovators, and any other class of physicians. Further, the opinion leaders, innovators, and other classes of physicians displayed according to the present technology can be limited to particular contexts, geographic regions, and other specifications similar to those recited above to limit the search results displayed on the Search-Results Screen.

Although the system and method are described herein with reference to the medical field, it is understood that the system and method of the present technology can be employed in any field. Further, the search results can be arranged in any manner that permits observation of the chain of communication between the user and members of the user's personal communication network returned by the search.

One aspect of this technology is directed to searching for a member of a searcher's social network or personal communication network wherein that member has information on a topic. A search for information within one's personal communication network can involve using one or more search strategies. Non-limiting examples of two search strategies are: a broadcast search and/or a directed search. As to the former, a broadcast search involves a person contacting everyone she knows on a first name basis when seeking out information and, in turn, each of these people would contact everyone they know asking the same question until theoretically everyone in the network has been contacted or the person(s) who possess the information are found. On the other hand, a directed search involves selecting and contacting who, among one's direct contacts, is most likely to possess the relevant information or knows of someone within his or her personal communication network who does. This person would then be contacted and, if he or she did not possess the relevant information, would determine who is most likely among his or her direct contacts to possess the relevant information. In this case, a probability estimate and search strategy is based on the following criteria:

1) degree of knowledge/awareness and trust of who knows what (i.e., local information) among direct contacts which is acquired through various interactions over time.

It may be the case that other direct contacts possess relevant information, or know of someone who does, but it is more efficient if a searcher approaches a direct contact based on some relevant parameter which correlates with the information being sought. For example, it is more efficient to search through a direct contact's personal communication network if that contact is a lawyer and the question has to do with the law, than it is to search through a direct contact's network if that contact is a carpenter. That is, a lawyer is more likely to know other lawyers; whereas, a carpenter may know a lawyer(s), but it is more likely they know and have strong connections to other carpenters. Of course, if the search was relevant to building furniture, it would be more efficient to search through the carpenter's personal communication network. Using such "local" information is an effective strategy to conducting a targeted search. The present technology provides a method and system by which a searcher can manually select certain parameters to effectively search his or her personal communication network to identify the shortest path between the searcher and the person(s) who possess the relevant information wherein the main parameter is based on "local information" (i.e., personal knowledge of direct contacts).

A directed search can be described as a search strategy that can be used to search a collection of linked databases. A directed search is distinct from a broadcast search because in most cases, less than all of the available searchable databases will be searched in the directed search, and the sequence of databases that are searched in a directed search will have a logical basis. In one embodiment, an anchor database or anchor node is selected by the searcher, and the anchor database or anchor node is commonly a first-degree contact. The anchor database is then searched (e.g., using computer-readable logic) for the sought-after search term(s). After the anchor database or anchor node has been searched, additional databases or nodes are selected to be searched based upon their similarity to the anchor database or anchor node.

An anchor database is a database that is used in a directed search to aid in guiding or directing the search to meaningful databases throughout a collectively-linked database network. In one embodiment, an anchor database is the first database to be searched in a directed search. An anchor database also serves as the basis for selecting additional databases to be searched throughout the course of a directed search. In one embodiment, an anchor database is used in a similarity correlation to make a relative determination of which directly-linked database is most like the anchor database. And a database that is directly linked to the anchor database and which is also most like the anchor database, relative to the other directly-linked databases, is then searched for the sought-after data. For illustration, the database that is directly linked to the anchor database and that has been identified by a similarity correlation as being most like the anchor database will be called the "second-searched database" (the first-searched database being the anchor database). The "second-searched database" is then searched for the sought-after data. The directed search can then proceed from the "second-searched database" to a "third-searched database." The "third-searched database" is a database that is directly linked to the "second-searched database" (but it is not the anchor database) and identified by a similarity correlation as being most like the anchor database relative to other databases that are directly linked to the "second-searched database." A directed search can proceed on in this manner through a "third-searched database," a "fourth-searched database," a "fifth-searched database," and so forth through an "nth-searched database." There is no limit on the number of databases that can be searched using a directed search method.

Any database can act as an anchor database. In one embodiment, a node in a social network map can be an anchor database. In another embodiment, an internet or intranet website can act as an anchor database.

In another search embodiment, a directed-search strategy is conducted through the "second-searched database," "third-searched database," and "fourth-searched database" and then from that database, the search strategy stops being a directed search strategy and becomes a broadcast search of all databases that are directly and then indirectly linked to the database at which the directed search strategy ended. This is an example of a combination of directed and broadcast search strategies, and this combination of search strategies is within the scope of the technology described herein.

In a social-network search embodiment, a directed search strategy can also be combined with historical search data. In such an embodiment, the historical data relates to determining who among a social-network node's first-degree contacts the node historically identified as an anchor in conducting a search on a particular topic. Stated differently, if a node conducting a search identified one of their first-degree contacts as an anchor regarding a search relating to "cars," the historical data will reflect that that node made that first-degree contact anchor selection when the topic was "cars". And a social-network search strategy may combine a directed search strategy with historical data in order to guide a search throughout a social network. In such a social-network search strategy, a directed search (as has been described above) of the social network may be performed and when the directed search reaches a node that has historical data relating to the subject search topic, the current search may be redirected based upon the historical anchor selection that the node previously made on the same or similar search topic. In other words, in a search embodiment, historical data may be used to override a directed-search similarity-correlation calculation in making a determination as to which database/node is to be searched next.

In yet another embodiment, the historical data can be used to initiate a second search in addition to the existing directed search. As an example of such an embodiment, a directed search of a social network is conducted until it reaches a node with historical data relating to anchor-database/anchor-node selection on the current search topic. Upon reaching that node, two separate searches may spring from that node. One of those searches may be a continuation of the initial directed search that proceeds to follow a search path dictated by a similarity correlation determination. The second search will be initiated/directed to a node based upon historical data and not based upon a similarity correlation calculation. So at any point during the course of a directed search, a second search may be initiated based upon historical data.

In yet another embodiment, any combination of search strategies; i.e., a directed search strategy, a broadcast search strategy, and a historical-data search strategy; may be employed in performing a search of a collectively-linked databases or a social network.

In another embodiment, the presently described technology provides for simultaneously initiating two or more directed searches of at least one collection of linked databases. More specifically, two or more directed searches can be initiated simultaneously, wherein a first search is performed on a first collection of linked databases and a second search is performed on a second collection of linked databases.

Figure 23:
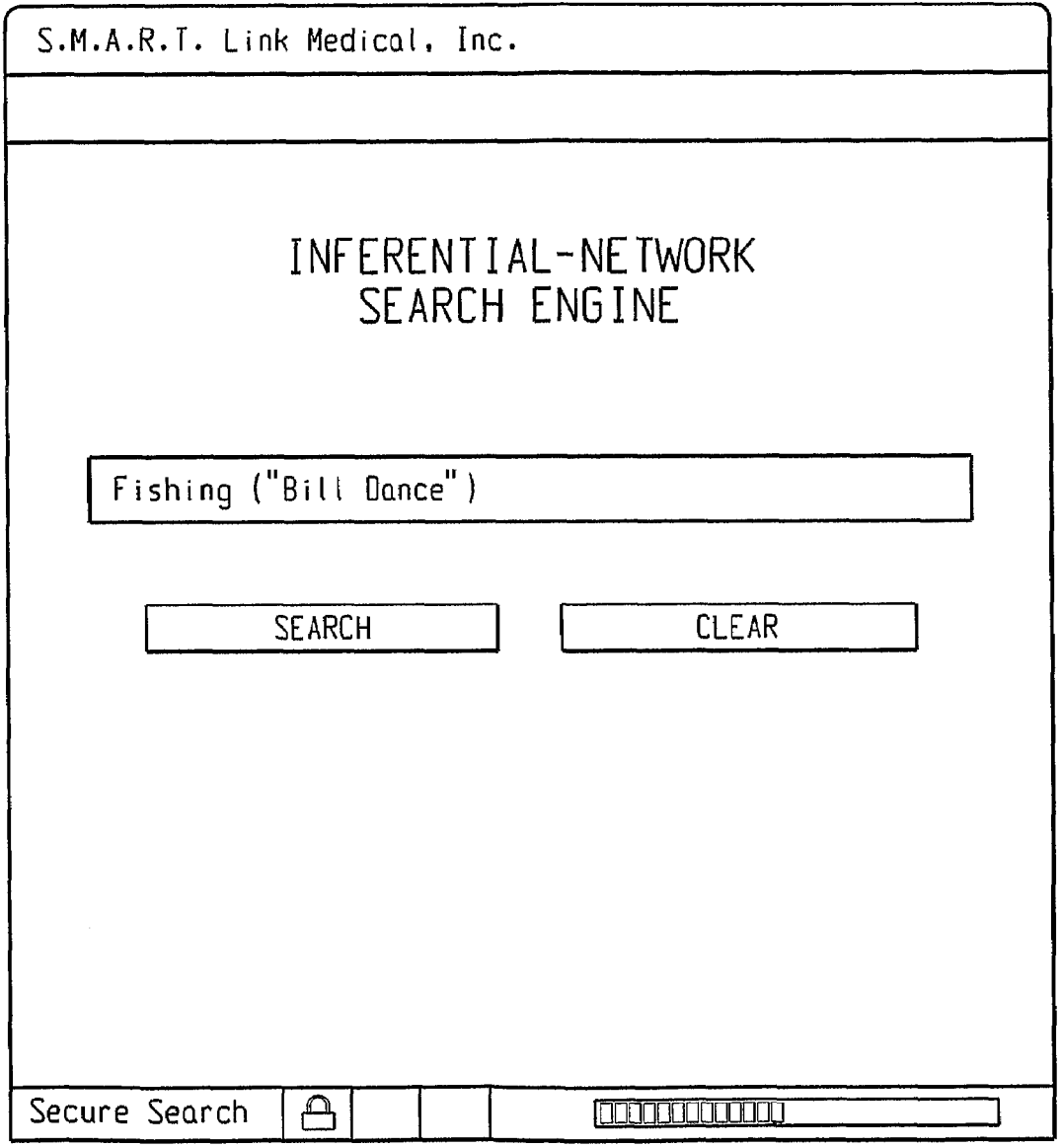
FIG. 23 is an illustrative display of an example inferential network search.

Another embodiment is directed to initiating a directed search from a single search field. This is performed by entering into the search field: both a directed-search search term and a term that identifies an anchor database. A differentiator is used within the field to differentiate the directed-search search term from the term that identifies the anchor database. The differentiator is also used to indicate which of the two terms are the directed-search search term and which of the two terms is the term that identifies an anchor database. FIG. 23 provides an illustration of this embodiment, wherein the directed-search search term is Fishing; the term that identifies the anchor database is "Bill Dance"; and parenthesis are used as the visual indicator. In an embodiment, the differentiator can be a visual or audible.

Computer-readable logic can be used to perform any of this described search methods.

A similarity correlation is an algorithm or mathematical function used to determine the degree of similarity between two databases. Any algorithm or mathematical function can be used to perform this function. As a non-limiting example, a useful algorithm or mathematical function would simply count the number of data entries in common (i.e., shared) between the two databases. The degree of similarity could then be described on a percentage basis by a function having the form:

$$\left( \frac{\text{Number of Data Entries in Common Between a First and Second Database}}{\text{Total Number of Data Entries Possessed by the First Database}} \right) \times 100\%$$

Other forms of relative comparison can also be employed.

Linked databases are databases that are connected to each other in some manner. As a non-limiting example of linked databases, wherein people are characterized as databases, a social network represents a group of people or databases that are linked to one another through the people that they know. In other words, social networks illustrate how people are linked to the people that they know directly (first-degree contacts) as well as to the people that they know indirectly through their friends. As another example of linked databases, electronic models of actual social networks will often assign attributes to each electronic social-network node, and those attributes may be directed to a node/person's profession, hobbies, geographic location, or other descriptive characteristic. The collection of attributes that are assigned to a particular social network node make up a single database of data that can be used to describe the subject social-network node. And each individual electronic social-network node has such a descriptive database assigned to it. So an electronic model of a social network will commonly have a plurality of descriptive databases that are linked to each other, through electronic links or electronic connections, in an arrangement that is representative of the actual social network. The databases are linked by electronic links or electronic connections represent an embodiment of linked databases within the scope of the present technology. Other embodiments wherein databases are linked electronically or in some other way are also within the scope of this technology.

In general, at least one embodiment of this technology is directed to a method or system for searching databases. Further, this technology is directed to a method or system for searching one or more databases in order to identify at least one database that has data on a topic. In one embodiment, the search method or system is applied to a plurality of databases that are collectively linked together in a highly-branched architecture. A non-limiting two-dimensional illustrative example of a highly-branched architecture of a collection of linked databases is provided:

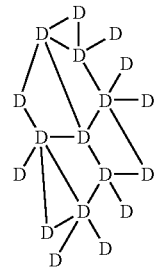

wherein D is a database; and
wherein "-" is a link between two databases

In one embodiment, social networks and personal communication networks serve as non-limiting examples of collections of linked databases having highly-branched architectures upon which the inventive search method or system can be applied.

In one embodiment, the search method or system can be applied to a collection of linked databases that have an architecture wherein at least a portion of the architecture can be described by the expression:

$$D_x \text{—} [D]_a$$

wherein $D_x$ is a seed database;
wherein each D represents a database;
wherein each "-" represents a link between two databases; and
wherein "a" is an integer greater than or equal to 1.

As a non-limiting example, an architecture of a collectively-linked database that falls within the scope of the expression:

$$D_x \!\!-\!\![D\,]_a$$

wherein "a" is 4, is presented:

In another embodiment, the search method or system can be applied to a collection of databases that have at least a portion of their architecture that can be described by the expression:

$$D_x \!\!-\!\![D\,\tfrac{}{a}\!\!-\!\![D]_b$$

wherein $D_x$ is a seed database;
wherein D represents a database;
wherein each "-" represents a link between two databases;
wherein a is an integer greater than or equal to 1;
wherein b is an integer greater than or equal to 0; and
wherein the value of each b is independently selected.

As non-limiting examples, two architectures of collective databases that fall within the scope of the expression:

$$D_x \!\!-\!\![D\,\tfrac{}{a}\!\!-\!\![D]_b$$

wherein "a" is 4 and wherein each "b" is 1, are presented:

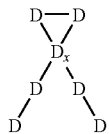 and 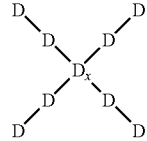

Still further, in another embodiment, the search method or system can be applied to a collection of databases that have at least a portion of their architecture that can be described by the expression:

$$D_x \!\!-\!\![D\,\tfrac{}{a}\!\!-\!\![D\,\tfrac{}{b}\!\!-\!\![D]_c$$

wherein $D_x$ is a seed database;
wherein each D represents a database;
wherein each "-" represents a link between two databases;
wherein each a is an integer greater than or equal to one;
wherein each b is an integer greater than or equal to 0;
wherein each c is an integer greater than or equal to 0; and
wherein each b and c is independently selected.

As a non-limiting example, an architecture of collective databases that falls within the scope of the expression:

$$D_x \!\!-\!\![D\,\tfrac{}{a}\!\!-\!\![D\,\tfrac{}{b}\!\!-\!\![D]_c$$

wherein "a," "b," and "c" are as described above, is presented:

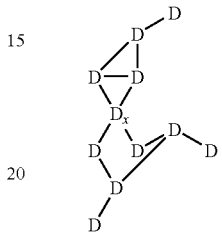

As mentioned above, one embodiment for performing a directed search involves searching for information within a plurality of databases that are collectively linked together in a highly-branched architecture. In one particular embodiment, a directed search is used to search a social network or personal communication network. Further, a directed search of such a collection of individual databases involves searching less than all of the individual databases in the collection. Instead, the search for the information is channeled or directed to the individual databases that are most likely to contain the sought-after data or information, or have access to a database that does. And as a result, a directed search of such a collection of databases typically involves searching only a portion of the individual databases in the entire collection.

All of the databases described above are within the scope of being searched using the search methods described herein.

Another embodiment is directed to establishing a social-network path from a search initiator to a person that is identified in a website. Stated differently, if a search initiator conducting an internet or intranet website search wants to know of at least one social-network path that connects them to a specific person that has been named or identified in a specific website, then this embodiment provides for establishing at least one social-network path from the search initiator to the person that is identified in the website. In a particular embodiment, the website that names or identifies the person is listed among the search initiator's website search results.

In order to establish a social-network path from a search initiator to a person that is either named or identified in a website, computer-readable logic is used to match the person identified in the website with a representative node in an existing social-network map. In other words, the computer-readable logic searches one or more existing social-network maps for a social-network node that represents the person identified in the website.

When the computer-readable logic is searching for a match, the sequence in which the computer-readable logic searches for the match is not a limitation of the technology described herein. In other words, in a first type of search sequence, the computer-readable logic searches for a match by basing the search on the identity in the website and subsequently searches for a node in an existing social-network map wherein the node represents the identity in the website.

Once the computer-readable logic locates such a representative node, the computer readable logic forms a match between the two. Alternatively, in a second type of search sequence, the computer-readable logic determines the representative identity of a node in an existing social-network map and subsequently searches for an identity or name match in the target website. In yet another embodiment, the computer-readable logic performs the match by employing both types of search sequences simultaneously. In still another embodiment, the computer-readable logic can perform a combination of the two types of search sequences in order to match the person identified in a website with a node in a social network map. Any known computer-readable logic or search engine can be used in this technology to perform a search function that matches either 1) a social-network node to an identity in a website or 2) an identity in a website to a social-network node.

There is no limitation on the types of social-network maps that can be used in performing a match between a social-network node and a person that is either named or identified in a website. As mentioned above, an embodiment of this technology provides for performing the social-network-node/website-identity match using a social-network map that has a node representing the search initiator. In one embodiment, computer-readable logic performs a match by searching representative nodes in a social-network map that has been constructed using an invitation-and-acceptance method as described above.

For ease of explanation, a social-network node that represents the identity in the website will herein be identified as the website-identity node. Furthermore, a social-network node that represents the search initiator will herein be identified as the search-initiator node. Once the computer-readable logic has successfully performed a match between a social-network node and a person identified in a website, and thereby determined that the website identity is a node in a social network, additional computer-readable logic is used to select a social-network path between the search-initiator node and the website-identity node. In establishing a social-network path between the search-initiator node and the website-identity node, the search-initiator node and the website-identity node are preferably part of the same social-network map.

Where the search-initiator node and the website-identity node are part of the same social-network map, the map may provide for any number of social-network paths between the search-initiator node and the website-identity node. And the actual number of social-network paths between the search-initiator node and the website-identity node is in no way a limitation. In one embodiment, the computer-readable logic actually establishes a social-network path by selecting an existing social-network path from among those available in the social-network map, wherein the selected path connects the search-initiator node to the social-network node. The computer-readable logic can select any social-network path from the social-network map, as long as the selected path connects the search-initiator node to the website-identity node. In one embodiment, the computer-readable logic selects an existing path from the social-network map, wherein relative to all of the paths from the search-initiator node to the website-identity node, the selected path has the fewest number of intervening nodes between the search-initiator node and the website-identity node.

In one embodiment, a path from the search-initiator node to the website-identity node can be displayed in combination with the website listed as a search result. In another embodiment, the website search result is the product of an internet search or an intranet search.

Figure 9:
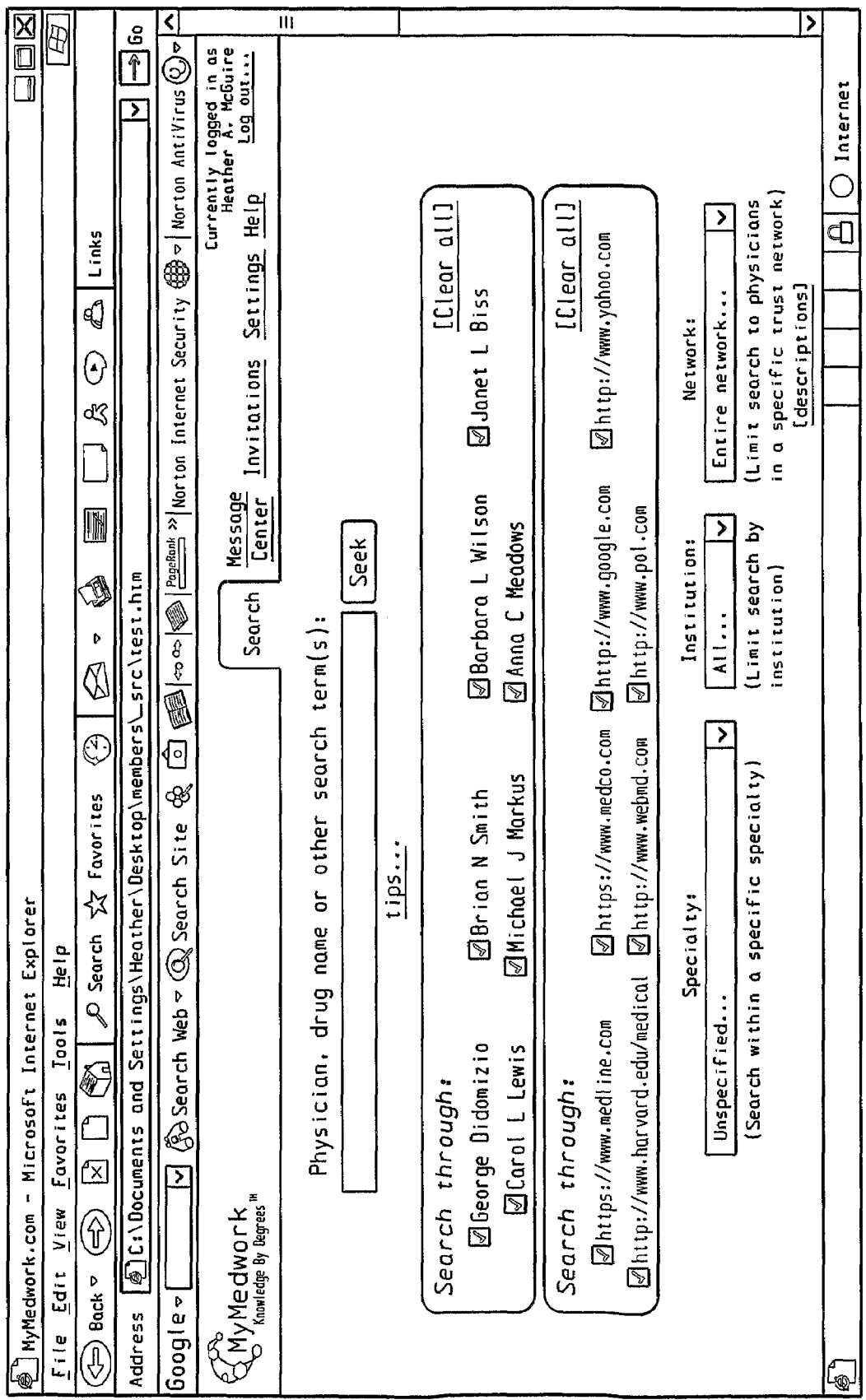
FIG. 9 is an illustrative example of an interface that will act as a bridge or gateway allowing the user search initiator to search multiple databases.

As a non-limiting example, FIG. 9 provides an embodiment of an interface that will act as a bridge or gateway allowing the user/search initiator to search multiple databases and various types of databases either individually or simultaneously. Such databases may include, but are not limited to, social search networks and social search engines, traditional search engines, individual websites or webpages (such as popular sites like Amazon.com or sites that the user frequently visits), online databases such as Medline, individuals, groups, institutions, governments, and the like. The interface will allow for general broadcast searches as well as anchored, directed searches, and the user will also be able to type particular web addresses into the browser. The user will also have the option to edit the lists that appear in their personal manifestations of this interface. For example, if user X frequently visits webmed.com to search for information, the interface will allow (and possibly even prompt) the user to add webmd.com to its list of anchors. Below are some visual examples of this interface and examples of the utility of such interface.

Figure 10:
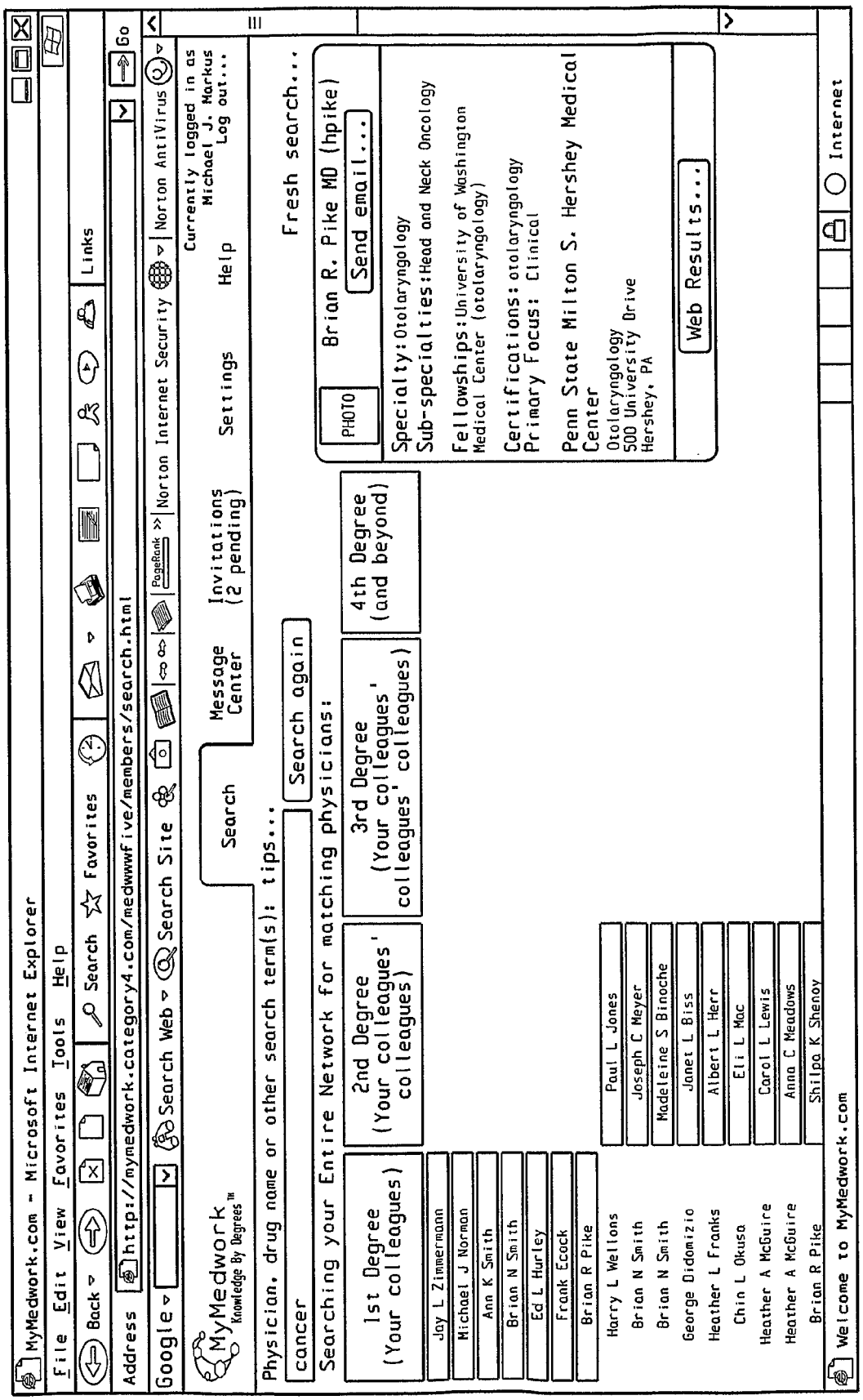
FIG. 10 is an illustrative example of a social-search-engine results display.

FIG. 10 provides a non-limiting embodiment of a social-search-engine results display. More specifically, FIG. 10 provides a clear delineation of one or more social-network paths connecting the user (search initiator) to social-network nodes matching the search initiator's search criteria.

Figure 11:
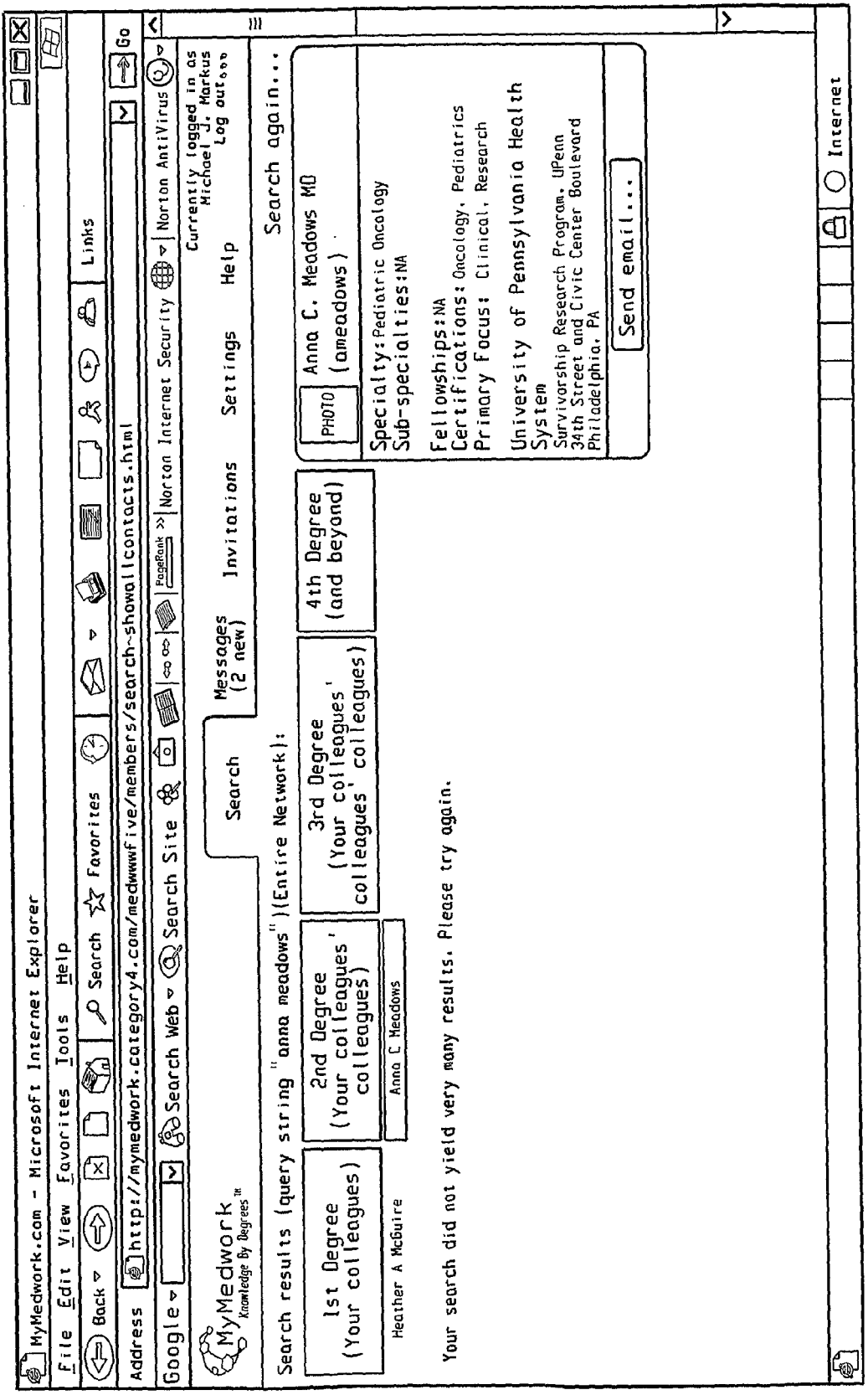
FIG. 11 is an illustrative example displaying a social network path from a user/search initiator to a social-network member.

FIG. 11 provides an embodiment for viewing/displaying a social network path from a user/search initiator to a social-network member (Dr. Anna Meadows). This path could be provided (1) on the current web page, (2) on the traditional results page or toolbar, or (3) it could open a new window with social search engine results displayed, where the user is logged in as the user and "Anna Meadows" is the query term.

Figure 12:
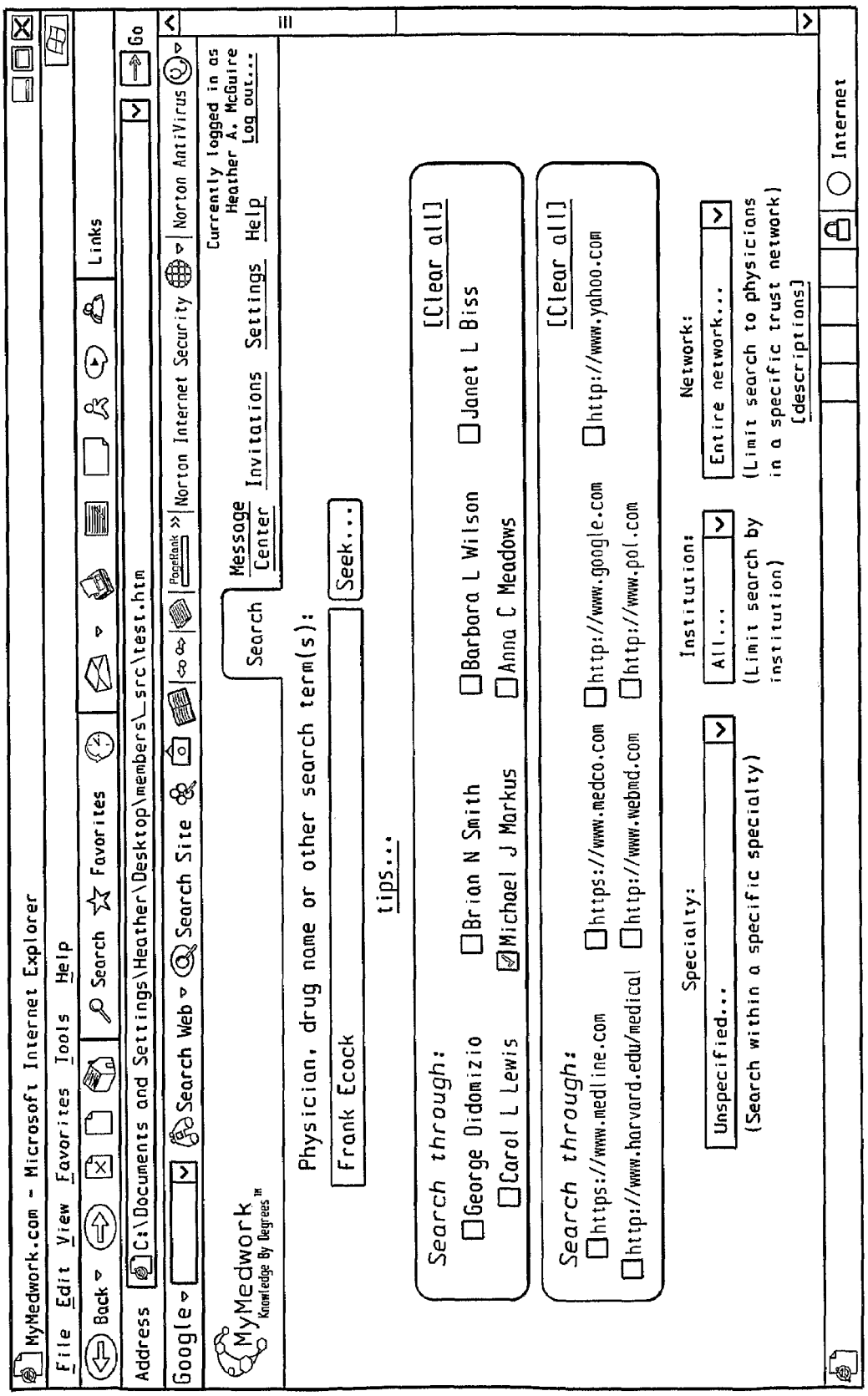
FIG. 12 is an illustrative display of an example screen for searching a network by anchoring the search with a person.

As a non-limiting example, FIG. 12 provides a search embodiment wherein a search initiator wants to locate Frank Ecock within her interpersonal network. She suspects that Mike Markus may know Frank or know of someone who does. Therefore, she anchors her search with a person, "Mike Markus," by clearing the boxes and checking only the box next to Mike's name. Note, searching through a person may require that the user/search initiator uncheck all the boxes next to the other databases, too, by selecting "clear all."

Figure 13:
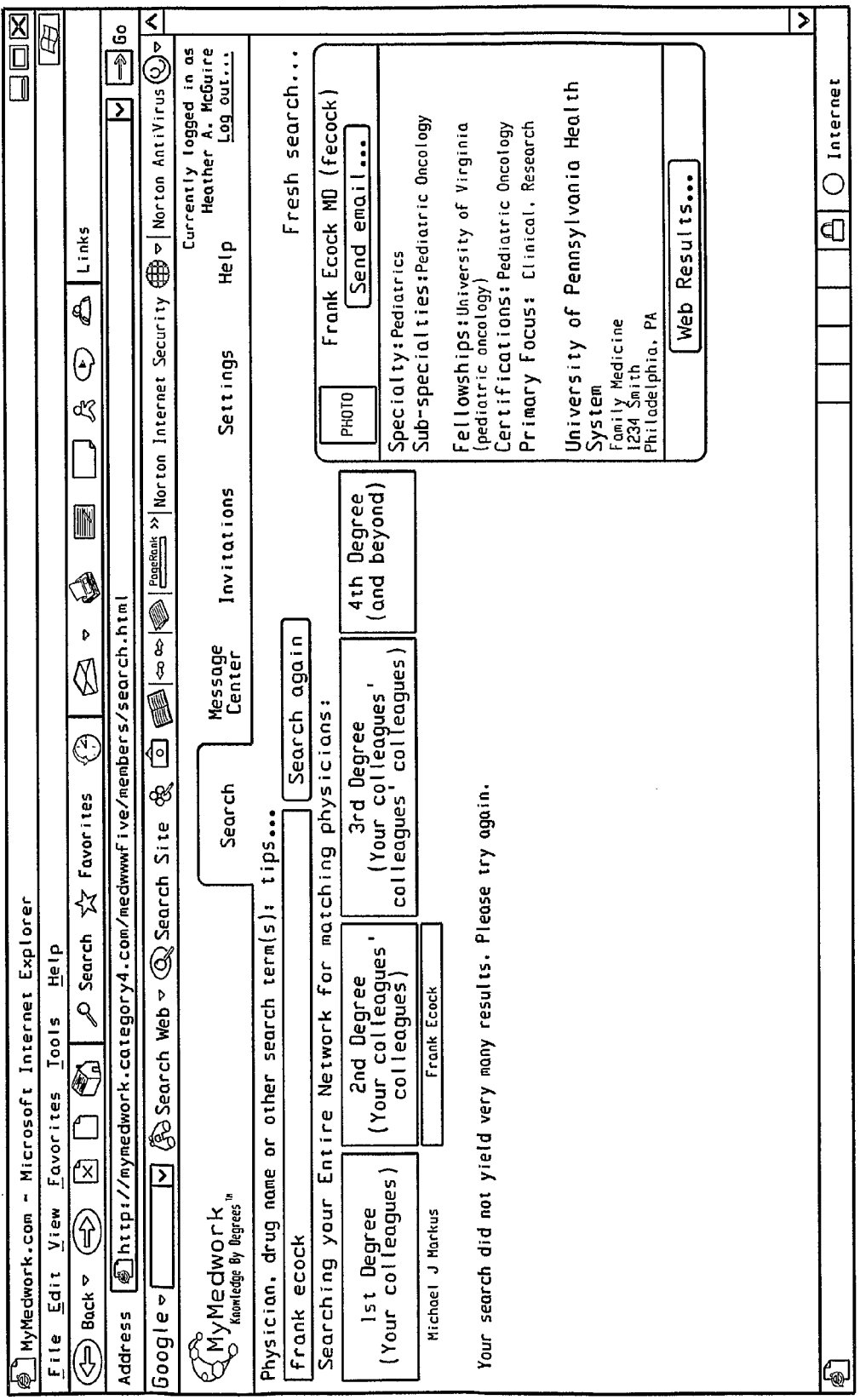
FIG. 13 is an illustrative example display of the search results of the example search of FIG. 12.

FIG. 13 provides an embodiment of a search result display based upon the search described in FIG. 12.

Figure 14:
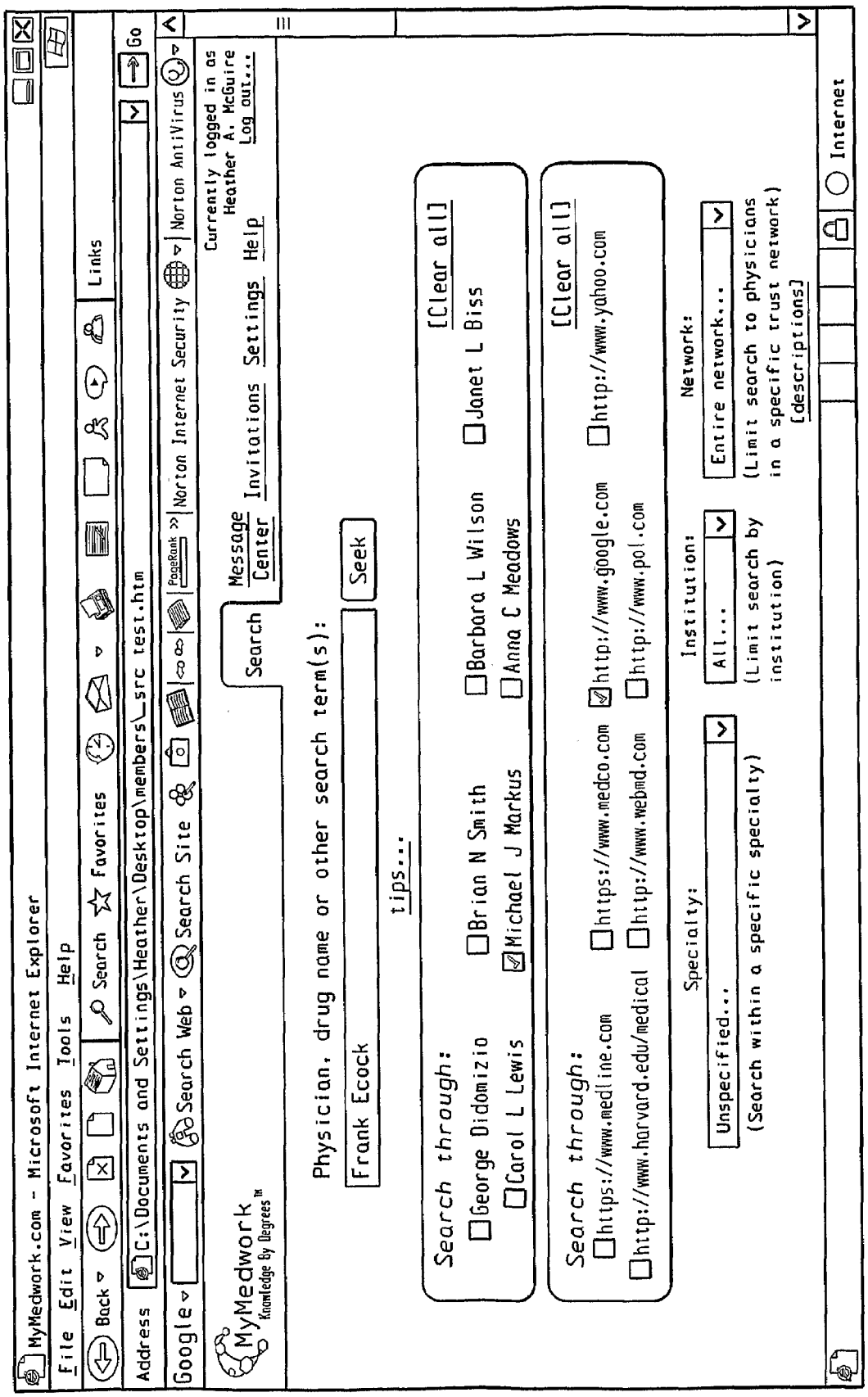
FIG. 14 is an illustrative display of an example search using two anchors.

As a non-limiting example, FIG. 14 provides a search embodiment wherein a search initiator wants to find Frank Ecock within her interpersonal network, and she suspects that Mike Markus may know Frank or know of someone who does. However, she also wants to search for relevant information regarding Frank on the World Wide Web using the Google search engine. In this case, Heather performs a search using two anchors, Mike Markus and google.com. To do so, she anchors her search with a person, "Mike Markus," by clearing the boxes and checking only the box next to Mike's name, and by clearing the boxes in the other database table (by selecting "clear all") and checking the box next to www-.google.com.

Figure 15:
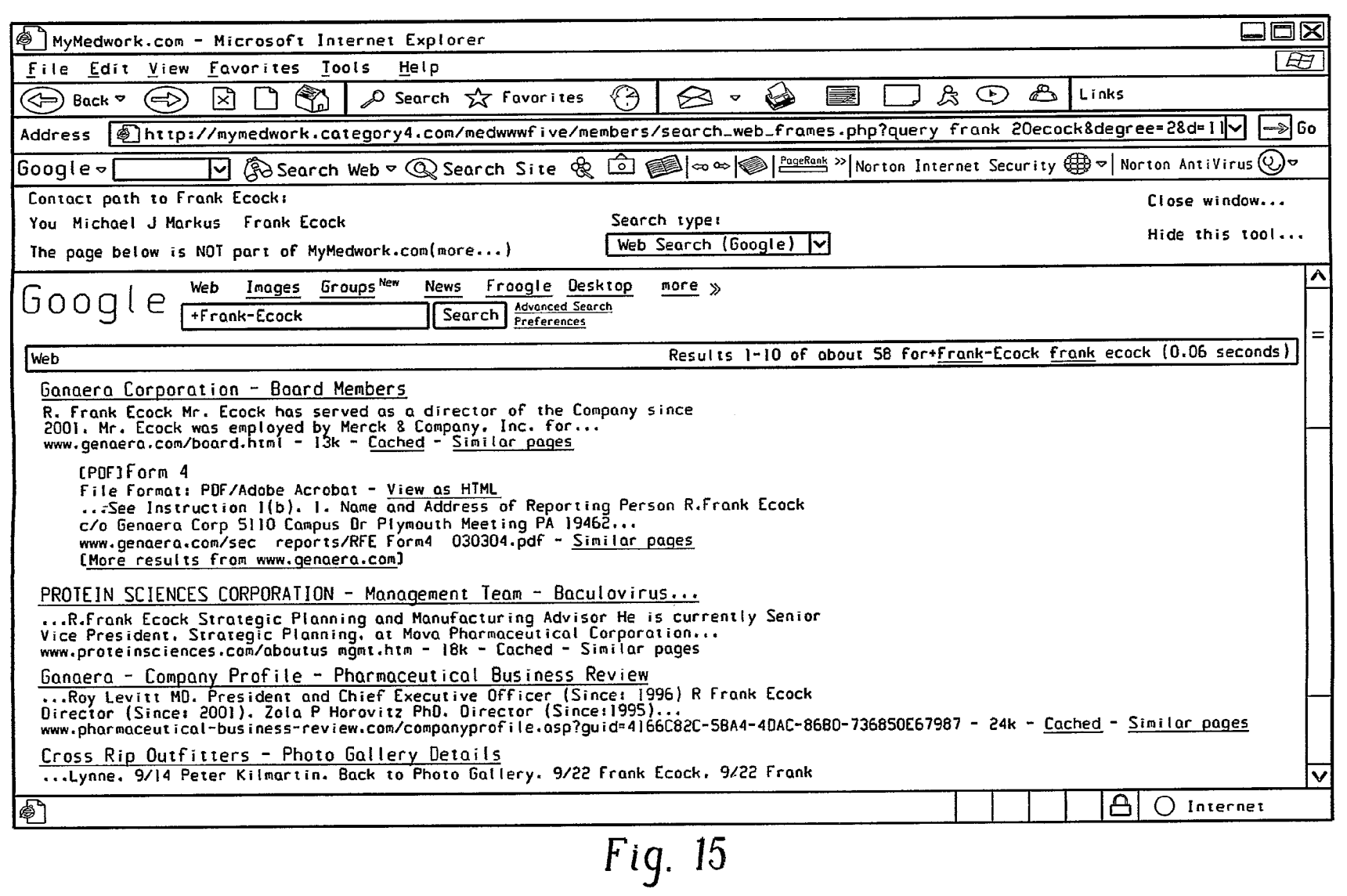

FIG. 15 provides an embodiment of a search result display based upon the search described in FIG. 14. In this embodiment, the first anchored search (via Mike) yields the results presented in the top half of the "split screen;" the path from Heather (the user) to Frank Ecock (the query). The second anchored search (via Google) yields the results presented in the bottom half of the screen.

Figure 16:
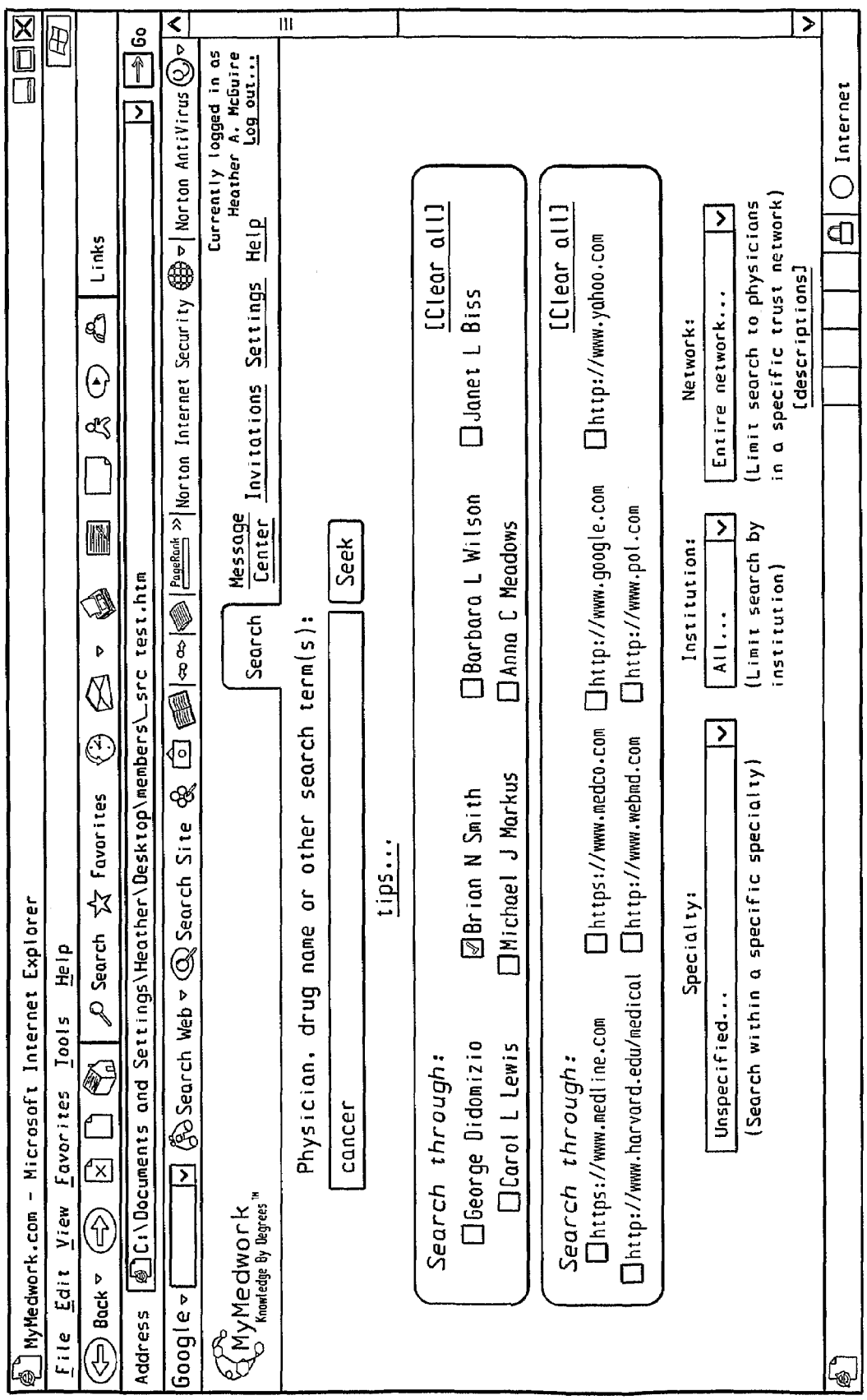
FIG. 16 is an illustrative display of an example search using a single anchor.

As a non-limiting example, FIG. 16 provides a search embodiment wherein a search initiator wants to locate information regarding cancer within her interpersonal network. She suspects that Brian Smith may have information on the topic cancer or know someone who does. Therefore, she anchors her search with a person, "Brian Smith," by clearing the boxes and checking only the box next to Brian's name.

Figure 17:
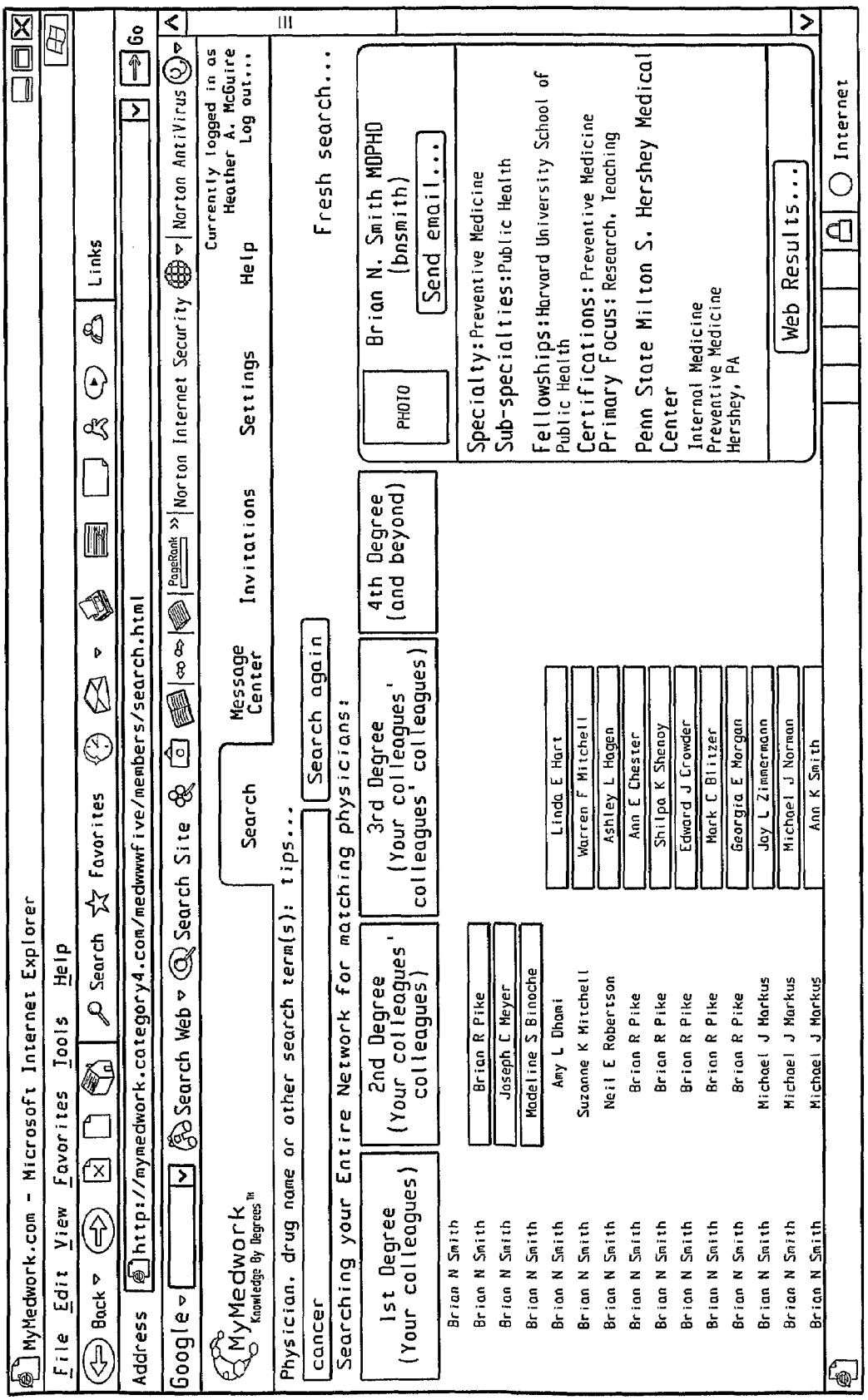
FIG. 17 is an illustrative example display of the search results of the example search of FIG. 16.

FIG. 17 provides an embodiment of a search result display based upon the search described in FIG. 16. In these results, Brian has information on cancer, and all of the other individuals listed in the results table (1) have information regarding cancer, and (2) are connected to Heather (the user) via her first degree colleague Brian Smith. (we can tell this by noting that Brian is listed repeatedly in the first column).

Figure 18:
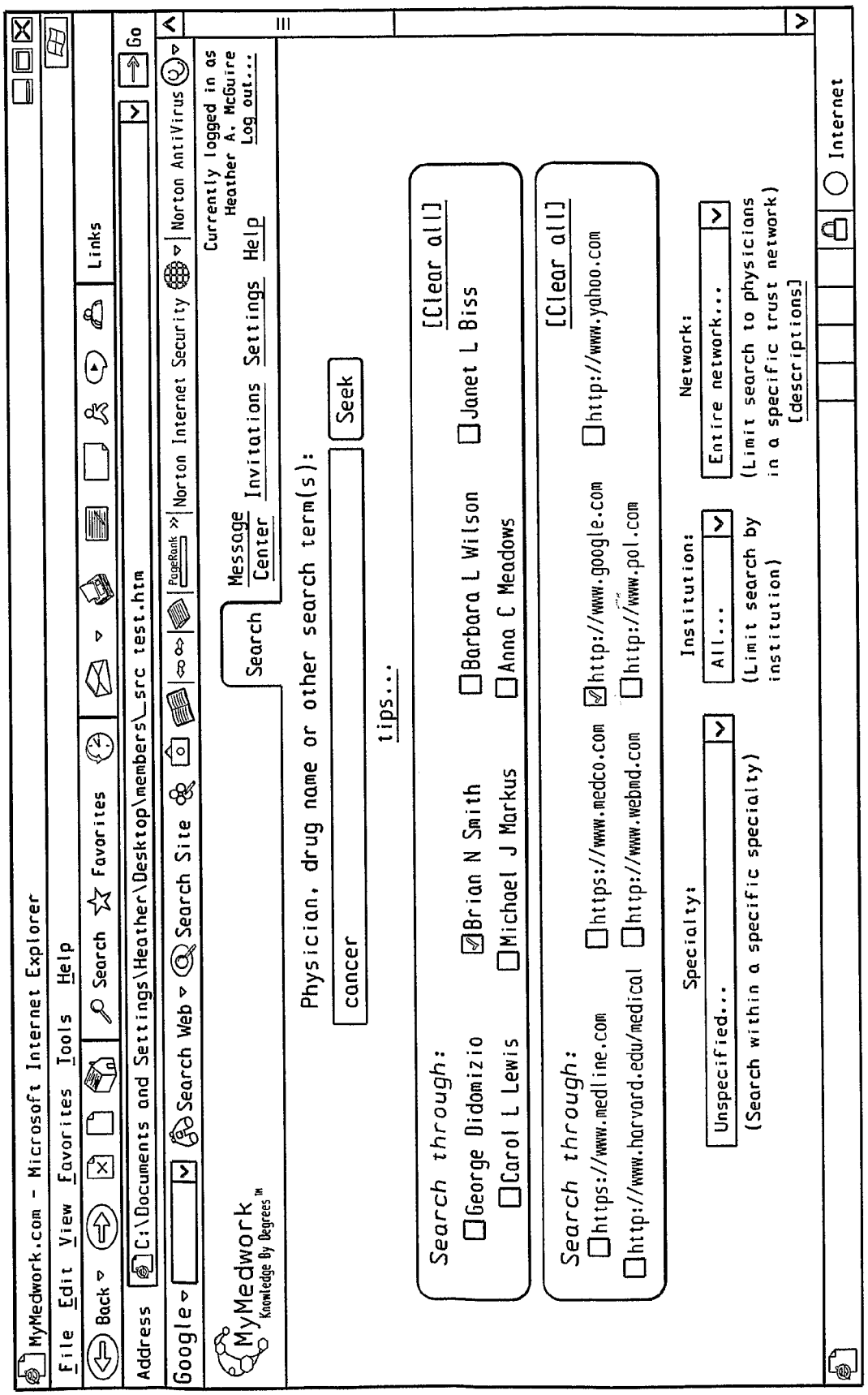
FIG. 18 is an illustrative display of an example search using two anchors.
Figure 19:
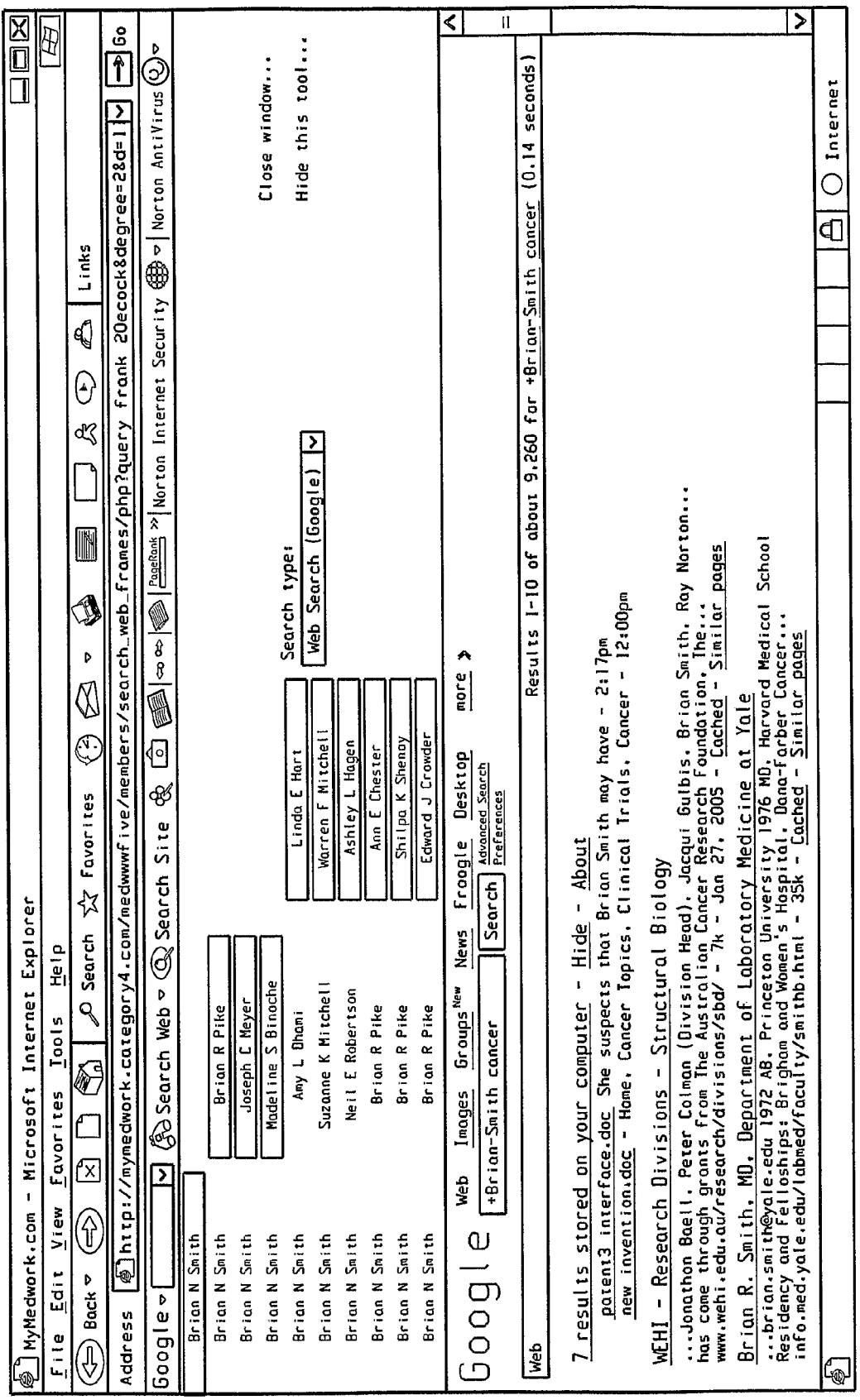
FIG. 19 is an illustrative example display of the search results of the example search of FIG. 18.

As a non-limiting example, FIG. 18 provides a search embodiment wherein a search initiator wants to find information regarding "cancer" within her interpersonal network, and she suspects that Brian Smith may have information on the topic cancer or know someone who does. However, she also wants to search for relevant information regarding cancer on the World Wide Web using the Google search engine. In this case, Heather performs a search using two anchors, Brian Smith and google.com. To do so, she anchors her search with a person, "Brian Smith," by clearing the boxes and checking only the box next to Brian's name, and by clearing the boxes in the website table (by selecting "clear all") and checking the box next to www.google.com FIG. 19 provides an embodiment of a search result display based upon the search described in FIG. 18. In this case, the first anchored search (via Brian) yields the results presented in the top half of the "split screen;" the path from Heather (the user) to people in her interpersonal network that have information regarding cancer (the query). The second anchored search (via Google) yields the results presented in the bottom half of the screen. These results are interactive. For example, if Heather (the user) clicks on a person's name in the top half of the screen, in this example she has clicked on Brian Smith, then the bottom half of the screen presents Google results in which the person's name (e.g. Brian) and the original search query (i.e. cancer) becomes the new search query.

Figure 20:
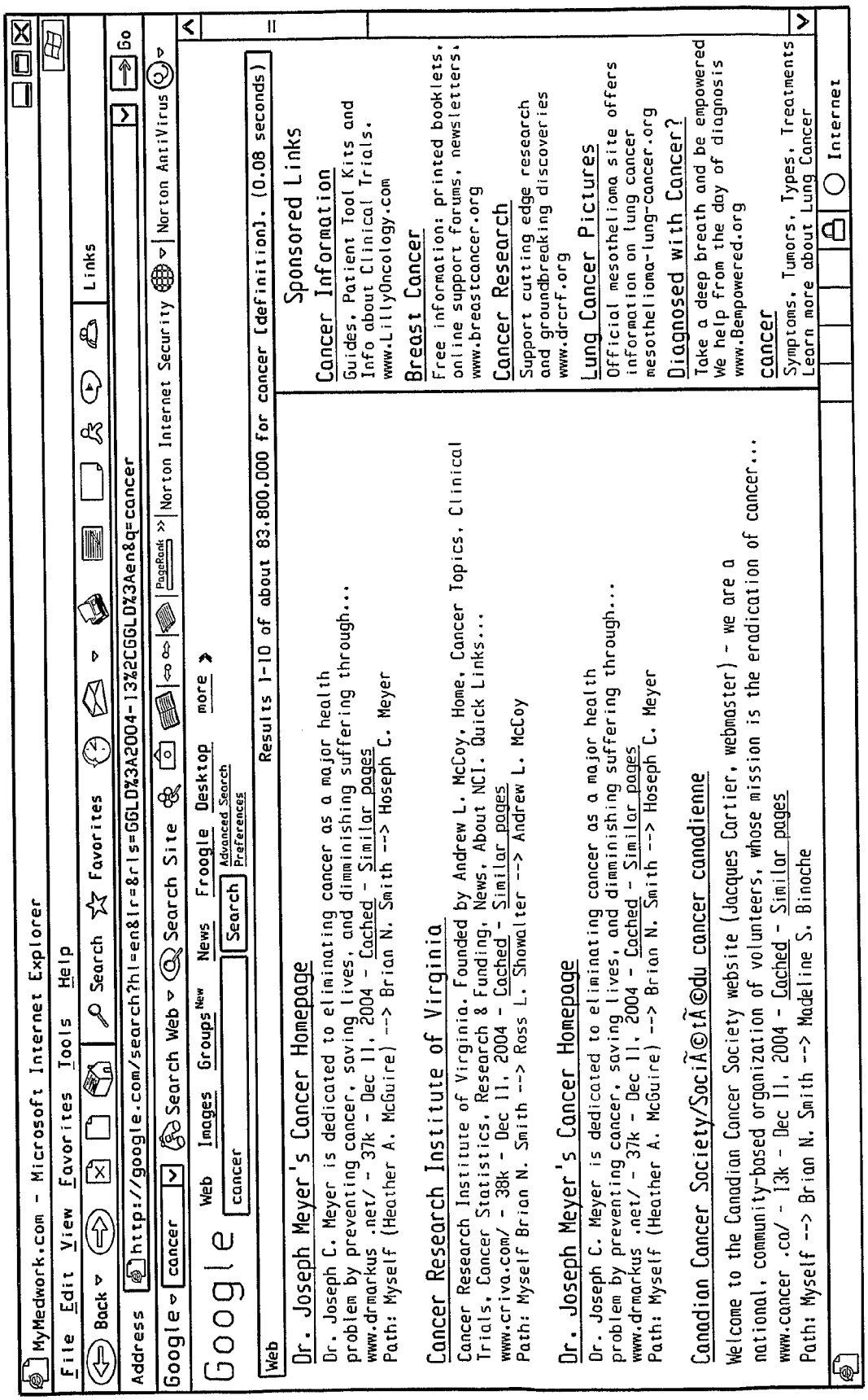
FIG. 20 is another illustrative example display of the search results of the example search of FIG. 18.

FIG. 20 provides yet another embodiment of a search results display based upon the search described in FIG. 18. In this case, the results look similar to traditional Google search results with one exception—the list line of each paragraph/the last part of the description for each individual result, indicates the path from the user (i.e. Heather) to the individual with the queried information that is listed, cited, etc. in that particular result. In this example, the search was anchored via Brian Smith, so Brian is always the first link in the paths of these results.

FIG. 21 provides an embodiment of a search result display that could be employed in a system in which a web crawler locates all websites and web pages relevant to (e.g. written by or including information about) all new and current social-network nodes/users or if a social network and traditional network were to merge or otherwise "join forces" and integrate databases. In this case, the results could be a formatting embodiment of the social search engine results page such that, when a search initiator types in "cancer" instead of receiving a list of physicians' names and paths connecting the search initiator to those individuals, the search initiator is provided with a list of websites and web pages identified by the social search engine's web crawler as including information about network members and users. These results would be organized in a manner that could be a hybrid form of traditional search results pages—including the URL (uniform resource locator), name of the site or page, description, etc.—as well as components of the social search engine results page—personal profiles and paths linking the user to the author, publisher, or person affiliated with the website or web page.

Another embodiment of the technology is directed to constructing one or more social-network maps that serve as social-network models. In particular, an embodiment provides a method or system for substituting a portion of a first social-network map with at least a portion of a second social-network map. More specifically, an embodiment is directed to substituting a portion of a first social-network map with at least a portion of a second social-network map, wherein the portion of the first social-network map is a social-network path and the portion of the second social-network map is a social-network path. Computer-readable logic can be used to perform any of the social-network map or social-network path substitutions. In order to substitute a first social-network path with at least a portion of a second social-network path, the first social-network path at least in part has the form:

$$D_A - [D_X]_y - D_B$$

and the portion of the second social-network path has the form:

$$D_A - [D_X]_z - D_B$$

wherein each D represents a node;
wherein $D_A$ represents a first node;
wherein $D_B$ represents a second node;
wherein each $D_X$ represents an intervening node between $D_A$ and $D_B$;
wherein "y" is an integer greater than or equal to zero;
wherein "z" is an integer greater than or equal to zero; and
wherein each "-" represents a link between two nodes.

As non-limiting examples, two exemplary social-network paths that fall within the scope of the general form:

$$D_A - [D_X]_y - D_B$$

is a first social-network path having four intervening nodes:

$$D_A\text{-}D_X\text{-}D_X\text{-}D_X\text{-}D_X\text{-}D_B$$

and a second social-network path having five intervening nodes:

$$D_A\text{-}D_X\text{-}D_X\text{-}D_X\text{-}D_X\text{-}D_X\text{-}D_B$$

Other non-limiting examples of two exemplary social-network paths that fall within the scope of the general form:

$$D_A - [D_X]_z - D_B$$

is a third social-network path having one intervening node:

$$D_A\text{-}D_X\text{-}D_B$$

and a fourth social-network path having two intervening nodes:

$$D_A\text{-}D_X\text{-}D_X\text{-}D_B$$

A non-limiting visual example of one of the embodiments for substituting a first social-network path with at least a portion of a second social-network path is provided below.

A first social-network path from $D_1$ to $D_7$:

$D_1$-$D_2$-$D_3$-$D_4$-$D_5$-$D_6$-$D_7$ wherein the portion of the first social-network path represented by:

—[$D_2$—$D_3$—$D_4$—$D_5$—$D_6$]— is substituted with a second social-network path:

—[$D_2$—$D_8$—$D_9$—$D_6$]— thereby producing a new social-network path:

$D_1$-$D_2$-$D_8$-$D_9$-$D_6$-$D_7$

In the above non-limiting example of substituting a first social-network path with at least a portion of a second social-network path, the new social-network path has a different intervening path than the intervening path in the first social-network path.

Another embodiment is directed to copying or altogether removing a portion of a social-network map and substituting that portion back into a different section of the same social-network map. This same-social-network-map substitution embodiment is performed in a similar manner as the above-described substitution method for substituting a portion of a first map into a second map, with the exception that in this embodiment the portion of the map that is copied or altogether removed—is substituted back into a different location of the same social-network map from which it was taken.

To further define the use of computer readable logic in a substitution embodiment of this technology, computer-readable logic can be used to define the portions of a first social-network map that are to be substituted into a different portion of the first social-network map or that are to be substituted into a second social-network map. In order to define the social-network portions that are to be substituted or substituted into, an embodiment provides that the computer-readable logic identifies an existing path between two nodes, and then locates alternate paths between the two nodes from among paths in existing social-network maps.

There is no limit on the different types of substitutions that can be made into a social-network map or social-network path. In one embodiment, the substitution replaces or removes at least one node in the intervening-node portion of a social-network path. In another embodiment, the substitution adds one or more additional nodes to the intervening-node portion of a social-network path. In still another embodiment of the technology, the substitution replaces one or more intervening nodes, removes one or more intervening nodes, adds at least one or more intervening nodes, rearranges one or more intervening nodes, or a combination thereof to the intervening-node portion of a social-network path.

Another embodiment of this technology is directed to constructing a social-network map by grafting a section of a first social-network map onto at least one node in a second social-network map. Still another embodiment of this technology is directed to copying or removing a section of a first network map and grafting it onto a different portion of the first social-network map. Grafting occurs when at least a portion of a social-network map is copied or removed from one section of the social-network map and directly linked to a node in another section of the social-network map. Grafting also occurs when a portion of a first social-network map is copied or removed from a section of the first social-network map and directly linked to a node in a second social-network map.

Below is a non-limiting visual example of a portion of a first social-network map that is grafted onto a second social-network map. The portion of the first social-network map represented by:

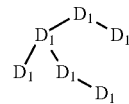

wherein each "$D_1$" is a database from the first social-network map; and wherein each "-" is a link between the databases, the portion of the second social-network map represented by:

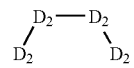

wherein each "$D_2$" is a database from the second social-network map; and wherein each "-" is a link between the databases, and the portion of the first social-network map grafted onto the portion of the second social-network map represented by:

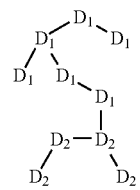

wherein "$D_1$", "$D_2$", and "-" are as described above; and
wherein "$D_1$-$D_2$" represents the point of grafting.

Computer-readable logic can be used to perform the grafting of one or more collections of linked databases onto a node or another collection of linked databases.

In one grafting embodiment, social networks and personal communication networks serve as non-limiting examples of collections of linked databases having highly-branched architectures upon which the method or system for grafting can be applied.

In one embodiment, the grafting method or system can be applied to grafting a collection of linked databases to another collection of linked databases wherein at least a portion of each of the linked-database architectures can be described by the expression:

$D_x$—[$D$]$_a$ wherein $D_x$ is a seed database;
wherein each D represents a database;
wherein each "-" represents a link between two databases; and
wherein "a" is an integer greater than or equal to 1.

As a non-limiting example, an architecture of a collection of linked databases that falls within the scope of the expression:

$$D_x \text{---} [D]_a$$

wherein "a" is 4, is presented:

In another embodiment, the grafting method or system can be applied to grafting a collection of linked databases to another collection of linked databases wherein at least a portion of each of the linked-database architectures can be described by the expression:

$$D_x \text{---} [D \text{---}]_a [D]_b$$

wherein $D_x$ is a seed database;
wherein D represents a database;
wherein each "-" represents a link between two databases;
wherein a is an integer greater than or equal to 1;
wherein b is an integer greater than or equal to 0; and
wherein the value of each b is independently selected.

As non-limiting examples, two architectures of collectively-linked databases that fall within the scope of the expression:

$$D_x \text{---} [D \text{---}]_a [D]_b$$

wherein "a" is 4 and wherein each "b" is 1, are presented:

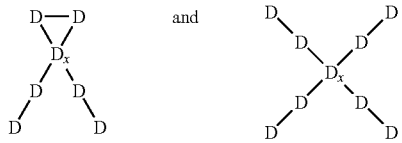

Still further, in another embodiment, the grafting method or system can be applied to grafting a collection of linked databases to another collection of linked databases wherein at least a portion of each of the linked-database architectures can be described by the expression:

$$D_x \text{---} [D \text{---}]_a [D \text{---}]_b [D]_c$$

wherein $D_x$ is a seed database;
wherein each D represents a database;
wherein each "-" represents a link between two databases;
wherein each a is an integer greater than or equal to one;
wherein each b is an integer greater than or equal to 0;
wherein each c is an integer greater than or equal to 0; and
wherein each b and c is independently selected.

As a non-limiting example, an architecture of collectively-linked databases that falls within the scope of the expression:

$$D_x \text{---} [D \text{---}]_a [D \text{---}]_b [D]_c$$

wherein "a," "b," and "c" are as described above, is presented:

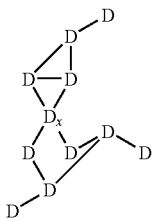

Another embodiment of this technology is directed to visually qualifying a link between two nodes in a social-network map. Visually qualifying a link can be performed in a number of different ways, and this technology is not limited to any specific type of visual qualification. Non-limiting examples of visual qualifiers that can be used to visually qualify a link between two linked databases or two nodes in a social-network map are: a colored line, a number on or in close proximity to a line, a line of varying thickness, a dashed line, a dotted line, or a combination thereof. More specifically, a visual link qualification can be used to qualify any link in a collection of linked databases, and in one embodiment, the collection of linked databases is made up either entirely or at least in part by social-network nodes. Visual qualifiers can be used to indicate the type of link between two nodes. As non-limiting examples, a visual qualifier for a link between nodes can be used to describe the quantity of different categories of data that are exchanged between the first database and the second database, the number of communications that are exchanged between the first database and the second database, or the length of time the first database has been linked to the second database.

In one embodiment for using visual qualifiers to describe a link between two linked databases, the linked databases are linked websites. In another embodiment for using visual qualifiers to describe a link between two linked databases, the linked databases are linked social network nodes.

A non-limiting example of a method for displaying a portion of a collection of linked databases, and specifically a link between two databases, uses color to visually qualify the link. Specifically, a link between two databases has the form:

$$D_1\text{-c-}D_2$$

wherein "$D_1$" is a first database,
wherein "$D_2$" is a second database,
wherein "-" represents a link between the first database and the second database,
wherein "c" represents a color designation of the "-" link between the first database and the second database, and
wherein the color designation of the "-" link qualifies the link as any of two or more possible link qualifications.

An additional non-limiting example of a method for displaying a portion of a collection of linked databases, and specifically a link between two databases, uses a number to visually qualify the link. Specifically, a link between two databases has the form:

$$D_1\text{-n-}D_2$$

wherein "$D_1$" is a first database,
wherein "$D_2$" is a second database,
wherein "-" represents a link between the first database and the second database, and
wherein "n" is a number that qualifies the link between the first database and the second database.

An embodiment of this technology is directed to recording directed-search data. Specifically, an embodiment is directed to making a record, electronic or other, that a particular search term and anchor database were used in combination to perform a directed search of a collection of limited databases. A directed search can be performed using any of the embodiments described herein. Furthermore, making a record that a search term was used in combination with a particular anchor database can be applied to a directed search of any collection of linked databases. The collection of linked databases can be a collection of linked websites on an internet, a collection of linked websites on an intranet system, a collection of linked nodes having the form of a social-network map, a collection of linked databases that is the product of an invitation—and acceptance method, or a collection of linked databases wherein each linked databases is independently selected from an internet website, an intranet website, and a social-network node.

Another embodiment of this technology is directed to using the record of a search term and anchor database that have been used in combination to qualify a database as an opinion leader, as a database that is most likely to have information on a topic relative to other databases in a collection of linked databases, as a database that is more likely than not to have information on a topic relative to other databases in a collection of linked databases, as a database that is most likely to be directly linked to another database having information on a search topic, or as a database that is more likely than not to be directly linked to a database having information on a topic. Yet another embodiment of this technology is directed to visually displaying the database qualification to a user or administrator after the record has been used to qualify the database.

Still another embodiment of this technology is directed to an inferential network and related systems and methods. An inferential network is a distinct network that is constructed as a result of one or more directed searches of one or more collections of linked databases. Stated differently, an inferential network is a network that is separate from the one or more collection of linked databases that are subject to a directed search. Further, an inferential network is a network that is constructed based upon the inferences that one or more search initiators make in selecting an anchor database for a directed search.

To further define an inferential network and its construction, the mechanics of a directed search of a collection of linked databases must be understood. As mentioned above, a directed search is initiated by a search initiator using a keyword search in combination with an anchor database that the search initiator has selected as being most likely to possess information on the search topic, as being most likely to be directly linked to another database having information on the search topic, or a combination thereof. In selecting an anchor database, the search initiator is making an inference about what information the anchor database possesses, about the databases that the search anchor is likely to be directly linked to, or a combination thereof. Further, the search initiator is drawing an inference about which database is most likely to have information on a topic, about the databases that are a single degree of separation from the anchor database, or a combination thereof. In summary, the search initiator is drawing an inference on an anchor database and databases that are a single degree of separation away from the anchor database.

As a non-limiting example, if a search initiator is conducting a directed search of a collection of linked databases and the search topic is "cancer," then the search initiator will select an anchor database by drawing an inference on which database in a collection or collections of linked databases is most likely to possess information on the search topic "cancer," by drawing an inference on which database is most likely to be directly linked to another database having information on "cancer," or a combination thereof. And it is the search initiator's inference in selecting an anchor database that provides the basis for the inferential link between the inferential-network search-initiator node and the inferential-network anchor-database node.

An inferential network is a network that is based upon the inferences that one or more directed-search search initiators have made about the one or more anchor databases that they have selected in conducting their directed searches. Further, an inferential network is made up of one or more inferential links between inferential-network nodes. In one embodiment, an inferential network is made up entirely of inferential-network nodes and inferential links, wherein the inferential link or links represent the inferences that one or more databases have made about another database or databases.

As a non-limiting example, an inferential link is or can be created between a first inferential-network node and a second inferential-network node wherein the first inferential-network node represents a directed-search search initiator that has conducted a directed search using a search term in combination with an anchor database and wherein the second inferential-network node represents the anchor database used in the directed search. The directionality of an inferential link between a first inferential-network node and a second inferential-network node is from the first inferential-network node that represents a directed-search search initiator to the second inferential-network node that represents the anchor database used in the search initiator's directed search. In one embodiment, an inferential link is created when a search initiator initiates a directed search. In another embodiment, an inferential link is created after a search initiator initiates a directed search. In still another embodiment, the inferential link is created as a function of search data, directed-search search data, broadcast-search search data, or a combination thereof.

In another embodiment, an inferential link can be created when a search initiator selects or electronically clicks on one of the search initiator's search results. Because the search initiator is making an inference about which of the search results is most likely to possess information on the search term or search topic, an inferential link can be created from an inferential-network node representing the search initiator to an inferential-network node representing the selected search result. As non-limiting examples, the search results or selected search result can be a website, a social-network node, an inferential-network node, or any electronic database or document available on the internet or on an intranet system.

Figure 24:
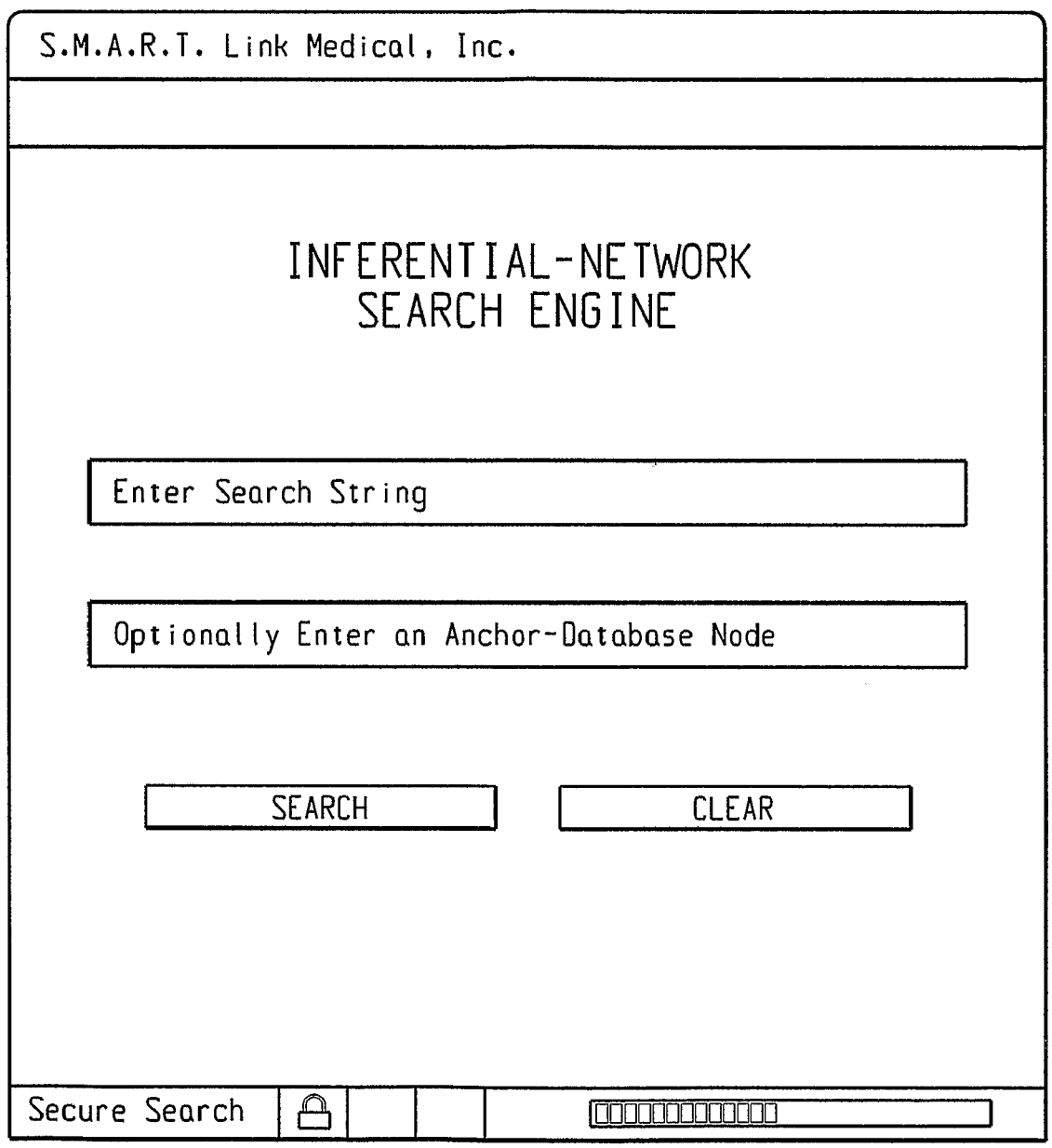
FIG. 24 is illustrative display of an example search using a single anchor.

In still another embodiment of this technology, an inferential link can be created outside the setting of a directed search that requires a first-degree contact or first-degree database to be selected as an anchor database. For example, consider the illustrative display generated by the computer processor according to computer-readable logic shown in FIG. 24. In FIG. 24, the search initiator is optionally provided with a field in which he can specify an anchor database other than one of his first-degree contacts in his personal communication network, and other than the websites or other predetermined anchor-database options. For example, the search initiator can login to a website outside of the personal-communication network setting that will allow the search initiator to conduct the equivalent of a directed search. Just as before, the search initiator can specify a search string in a search field, but instead of selecting an anchor database from a finite number of available options, the search initiator can specify any desired anchor database in an "anchor database" field. In this manner, the search initiator is provided with the freedom to select any anchor database without being constrained to network members who have accepted a formal invitation or other predetermined options.

In a non-limiting example of creating an inferential link when a search initiator selects or electronically clicks on one of the search initiator's search results; if a search initiator performs a broadcast search on a social network, the search results can be displayed and the search initiator can select any of the returned members of the social network that may possess information of the search topic. Selection of members of the social network displayed in the search results can be carried out by clicking on a hyperlink identifying the members, or by any other suitable method. When one or more members of the social network are selected from the search results, an inferential link can be created between a first inferential-network node representing the search initiator that performed the selection and a second inferential-network node representing the selected social-network member. In a specific embodiment, an inferential link is be created between a first inferential-network node representing the search initiator that performed the selection and a second inferential-network node representing the selected social-network member.

In creating an inferential link, there is no limitation on the collections of linked databases that can be used in performing a directed search. As non-limiting examples, an inferential link can be created from a directed search wherein the anchor database is a website that is selected from among a collection of linked websites on the internet, wherein the anchor database is a website that is selected from among a collection of linked websites on an intranet system, wherein the anchor database is a node selected from among a collection of linked nodes in a social-network map, or a combination thereof.

In an embodiment, an inferential-network search-initiator node and an inferential-network anchor-database node can be created simultaneously with the initiation of a directed search. In another embodiment, an inferential-network search-initiator node and an inferential-network anchor-database node can be created following the performance of a directed search. In a specific embodiment, an inferential-network search-initiator node and an inferential-network anchor-database node are created before or at the same time as inferential link is created between them. In any of the above embodiments for creating an inferential-network node, an inferential-network search-initiator node or an inferential-network anchor-database node can be created independently. In other words, if an inferential-network node representing a search initiator exists, but an inferential-network node representing an anchor database does not yet exist, then an embodiment provides for creating only an inferential-network node representing the anchor database. Likewise, if an inferential-network node representing an anchor database exists, but an inferential-network node representing a search initiator does not yet exist, then an embodiment provides for creating only an inferential-network node representing the search initiator.

In another embodiment for creating an inferential-network node, the inferential-network node is created as a function of search data, directed-search search data, broadcast-search search data, or a combination thereof.

In an embodiment, inferential links and inferential-network nodes can be used to create a visual map of an inferential network. An inferential-network map is a visual display that represents the relationships or links in an inferential network.

In an embodiment, an inferential link between and first inferential-network node and a second inferential-network node can be qualified with a subject-matter based qualification. As mentioned above, an inferential link from an inferential-network search-initiator node to inferential-network anchor-database node is based upon the inference that the search initiator has made in selecting the anchor database in conducting a directed search. In one embodiment, qualifying an inferential link is based at least in part on the search term or search topic used to conduct the directed search. As a non-limiting example, if a search initiator were to conduct a directed search of a social network map that was the product of an invitation-and-acceptance process, and the search initiator (Dr. Markus) designated "Dr. Smith" or a social-network node representing Dr. Smith as an anchor database for a search on "cancer," then an inferential link would be created from an inferential-network node representing Dr. Markus to an inferential-network node representing Dr. Smith. And the inferential link would be labeled as a "cancer" inferential network link from an inferential-network node representing Dr. Markus to an inferential-network node representing Dr. Smith.

An additional embodiment provides for qualifying an inferential link with more than one subject-matter based qualification. In this embodiment, the directed-search search term, which was used in the directed search that gave rise to the inferential link, is associated with one or more related terms or phrases that are used to create additional subject-matter based labels or qualifications for the inferential link. So, in this embodiment, an inferential link can be qualified with multiple subject-matter based qualifications, wherein each qualification is based at least in part on the search initiator's original directed-search search term. A non-limiting embodiment for providing additional subject-matter based qualifications for an inferential link uses a library of predetermined terms that have been designated in advance as being related to one another. And if a directed-search search initiator uses a search term that is in the library of predetermined terms, then an inferential link arising out of that directed search will have multiple subject-matter based qualifications as defined in the library of predetermined terms. In one embodiment, an inferential link has one subject-matter based qualification. In another embodiment, an inferential link has two or more subject-matter based qualifications. In still another embodiment, an inferential link has three or more subject-matter based qualifications. There is no limit on the number of subject matter-based qualifications that an inferential link can have.

An additional embodiment is directed to increasing the strength of an inferential link between a first inferential-network node and a second inferential-network node. The strength of an inferential link increases as a function of the number of directed searches that a directed-search search initiator performs wherein the search initiator uses the same anchor database in combination with the same search term or search topic. In other words, an inferential link increases in strength as a directed-search search initiator performs repeated directed searches using the same anchor database in combination with the same or similar search terms. In one embodiment, an inferential link increases directly in proportion with the number of directed searches that a search initiator performs by using the same anchor database in combination with the same or similar search terms. There is no limitation on the types of mathematical functions that can be used to determine the strength of an inferential link based upon the number of directed searches that a search initiator performs by using the same anchor database in combination with the same or similar search terms. Additionally, there are no limitations on the functions that can be performed on inferential-network data in order to arrive at the strength of an inferential link.

Another embodiment is directed to decreasing the strength of an inferential link as a function of time. Stated differently, once an inferential link is created between a first inferential-network node and a second inferential-network node, an embodiment of this technology provides for decreasing the strength of that inferential link over time. A further embodiment of the technology provides for decreasing the strength of an inferential network to such an extent that the inferential link will cease to exist given enough time. There is no limitation on the rate at which an inferential link will decrease in strength. Additionally, there are no limitations on the functions that can be performed on inferential-network data in order to arrive at a rate for decreasing the strength of inferential link.

Figure 22:
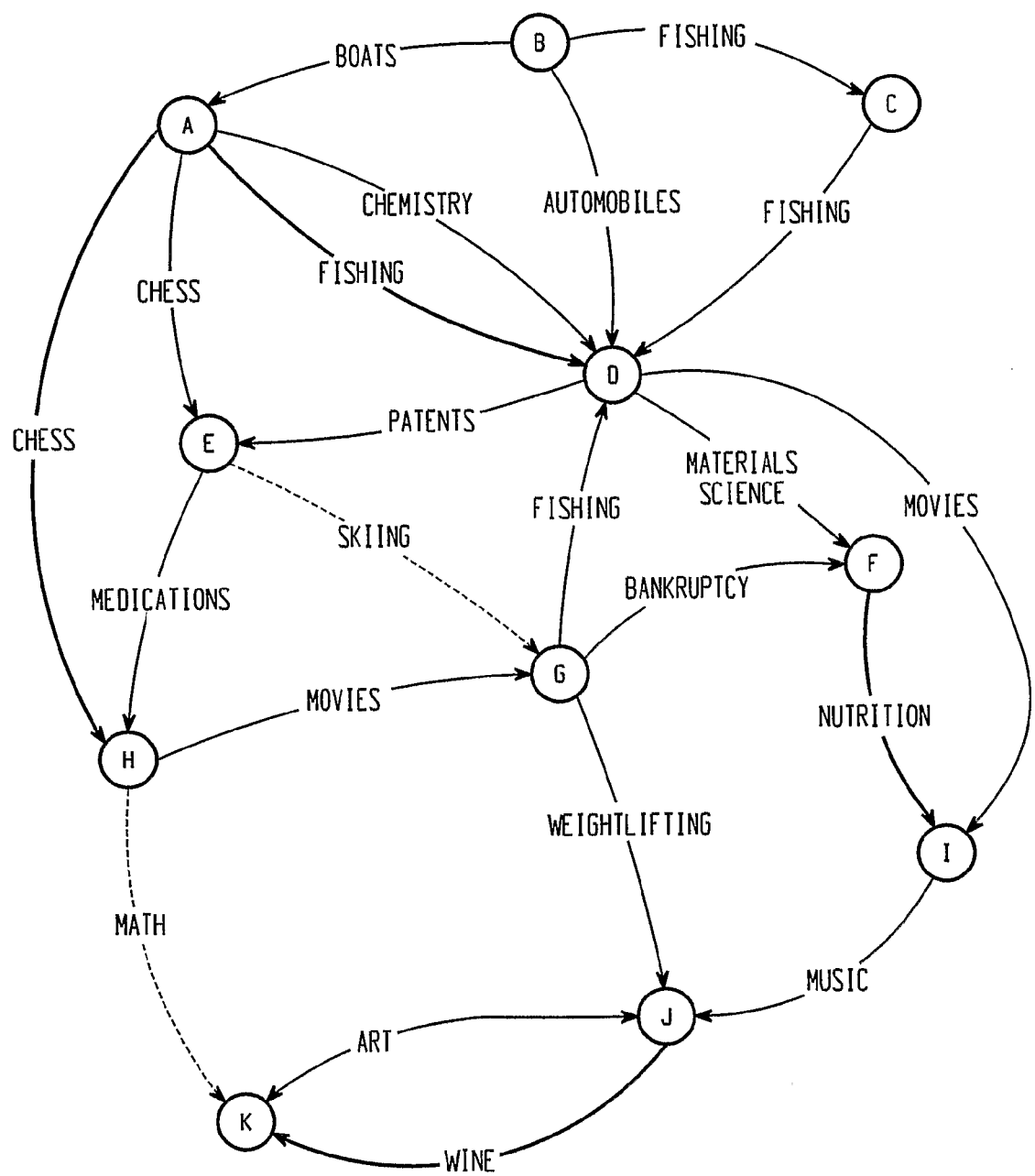
FIG. 22 is an illustrative display of relationships between inferential-network nodes A-K within an inferential network.

FIG. 22 represents illustrative relationships between inferential-network nodes A-K within an inferential network according to an embodiment of the present technology. The inferential-network nodes A-K, can represent any entity capable of possessing information regarding one or more topics and include: people, websites, books, documents, microfiche, motion pictures, video or audio broadcasts, drawings, illustrations, and so on. The spatial arrangement of the nodes in the figure is merely intended to illustrate interaction between the nodes, and is not considered to limit the scope of the present technology. The inferential-network node located at the start of a line extending between two inferential-network nodes, which represents an inferential link, will be referred to as an inferential-network search-initiator node for that particular inferential link. Likewise, the inferential-network node adjacent to the arrow at the terminal end of each link between two inferential-network nodes will be considered an inferential-network anchor-database node as specified by the corresponding search initiator. It is apparent from FIG. 22 that an inferential-network node can represent both a search initiator and an anchor database. Further, the term or phrase intersecting each inferential link indicates the context or subject of the information sought by the search initiator in initiating the search. Still further, the relative strength of an inferential link can be assessed from the thickness of the line (a visual indicator).

An inferential network such as that shown in FIG. 22 can be created and developed over time by the system and method of the present technology. The inferential network will evolve as search initiators conduct directed searches or the equivalent of directed searches over time to reflect the perceived possession of knowledge amongst members of the inferential network pertaining to a variety of topics. In the general sense, an inferential link is created as a result of a directed search initiated by a search initiator. In conducting the directed search, the search initiator specifies a search string that can be a subject, keyword, phrase, person, a combination thereof, or any other item that the search initiator seeks information about, along with an anchor database that the search initiator believes possesses the information sought. An anchor database can refer to any person, website, publication, database, social-network member, or any other potential source of information that the search initiator believes has the information he or she is searching for.

An additional embodiment is directed to qualifying an inferential-network node. Non-limiting examples of useful qualifications include 1) qualifying the inferential-network node as a node that represents a database that is most likely to have information on a search topic relative to other databases represented by nodes in an inferential network, and 2) qualifying the node as a node that represents a database that is more likely than not to have information on a search topic relative to other databases represented by nodes in an inferential network. There is no limitation on the types of qualifications that can be used to qualify an inferential-network node. Additionally, there are no limitations on the functions that can be performed on inferential-network data in order to arrive at a qualification for an inferential-network node.

In one embodiment, an inferential-network node is qualified at least in part based upon on the strength of inferential links to the inferential-network node. As mentioned above, the directionality of an inferential link between a first inferential-network node and a second inferential-network node is from the first inferential-network node that represents a directed-search search initiator to the second inferential-network node that represents the anchor database used in the search initiator's directed search. So in one embodiment, an inferential link is an indicator of which database (anchor database) the directed-search search initiator believes is most likely to possess information on a search topic. In an additional embodiment, the strength of the inferential link reflects the strength of the inference that the directed-search search initiator is drawing on a specific database or a specific node representing a database. For example, if a search initiator designates a specific database as an anchor database in a directed search, then the strength of the inference represented by that single directed search is not as strong as if that same search initiator performed ten directed searches that used the same anchor database in combination with the same or a similar search term or topic. As the strength of the inferential link increases so does the likelihood that the anchor database actually possesses information on the directed-search search topic.

Therefore, for example, if eight directed-search search initiators perform directed searches independent of each other, but use the same anchor database in combination with the same or a similar search term, then the likelihood that the anchor database actually possesses information on the search topic increases because there will be eight inferential links to the inferential-network node that represents the anchor database. Furthermore the subject-matter qualifications of the eight links will be the same. So qualifying the inferential-network node as a node that represents a database that is most likely to have information on a search topic relative to other databases represented by nodes in an inferential network can be a function of both the strength and number of inferential links leading to the inferential-network node that represents the anchor database. Stated differently, an inferential-network node can be qualified as a function of the strength of one or more inferential links in one or more inferential networks.

An additional embodiment is directed to establishing an inferential-network path from a first inferential-network node to a second inferential-network node. In one embodiment, an inferential-network path from a first inferential-network node to a second inferential-network node is established by selecting an existing inferential-network path from among paths in an inferential network. In an additional embodiment for establishing an inferential-network path from a first inferential-network node to a second inferential-network node, the first inferential-network node and the second inferential-network node are part of the same inferential network.

Where the first inferential-network node and the second inferential-network node are part of the same inferential network, the inferential network may provide for any number of inferential-network paths between the first inferential-network node and the second inferential-network node. And the actual number of inferential-network paths between the first inferential-network node and the second inferential-network node is in no way a limitation on the present technology. In one embodiment, computer-readable logic actually establishes an inferential-network path by selecting an existing inferential-network path from among those available in the inferential network, wherein the selected path connects the first inferential-network node to the second inferential-network node. The computer-readable logic can select any inferential-network path from the inferential network, as long as the selected path connects the first inferential-network node to the second inferential-network node. In one embodiment, the computer-readable logic selects an existing path from the inferential network, wherein relative to all of the paths from the first inferential-network node to the second inferential-network node, the selected path has the fewest number of intervening nodes between the first inferential-network node to the second inferential-network node.

In an additional embodiment, the computer-readable logic selects an inferential-network path from the first inferential-network node to the second inferential-network node, wherein the selected path has the least number of intervening nodes between the first inferential-network node and the second inferential-network node relative to other inferential-network paths from the first inferential-network node to the second inferential-network node.

In still another embodiment, the computer-readable logic selects an inferential-network path from the first inferential-network node to the second inferential-network node, wherein the sum of the strengths of the inferential links in the selected path is the greatest relative to other inferential-network paths having the least number of intervening nodes between the first inferential-network node and the second inferential-network node.

In yet another embodiment, the computer-readable logic selects an inferential-network path from the first inferential-network node to the second inferential-network node, wherein the first inferential-network node represents an inferential-network search initiator and the second inferential-network node represents a database that is most likely to have information on a search topic relative to other databases represented by nodes in the inferential network. In another embodiment, the second inferential-network node has been qualified as a node representing a database that is most likely to have information on a search topic relative to other databases represented by nodes in an inferential network. In yet another embodiment, the second inferential-network node has been qualified as a node representing a database that is more likely than not to have information on a search topic relative to other databases represented by nodes in an inferential network.

In yet another embodiment, this technology is directed to providing a historical list of directed-search search terms or directed-search search topics that were anchored to an anchor database. Computer-readable logic can be used to perform this embodiment by recording the directed-search search terms or directed-search search topics that have been anchored to a particular database during a directed search. A further embodiment provides for using computer-readable logic to make the directed-search search terms available in a visual display or other known methods for displaying or providing information. Any method for recording data can be used to record the directed-search search data. One embodiment for initiating the display of the directed-search search terms or directed-search search topics that were anchored to an anchor database uses an electronic command. As non-limiting examples, electronically pressing an electronically-executable command button associated with an anchor-database node or an inferential-network anchor-database node can cause the historical list of directed-search search terms or directed-search search topics that were anchored to the anchor database to be displayed.

Another embodiment of the technology is directed to constructing one or more inferential networks. In particular, an embodiment of this technology provides a method or system for substituting a portion of a first inferential network with at least a portion of a second inferential network. More specifically, an embodiment of the technology is directed to substituting a portion of a first inferential network with at least a portion of a second inferential network, wherein the portion of the first inferential network is an inferential-network path and the portion of the second inferential network is an inferential-network path. Computer-readable logic can be used to perform any of the inferential network or inferential-network path substitutions. In order to substitute a first inferential-network path with at least a portion of a second inferential-network path, the first inferential-network path at least in part has the form:

$$D_A - [D_X]_y - D_B$$

and the portion of the second inferential-network path has the form:

$$D_A - [D_X]_z - D_B$$

wherein each D represents an inferential-network node;

wherein $D_A$ represents a first inferential-network node;

wherein $D_B$ represents a second inferential-network node;

wherein each $D_X$ represents an intervening inferential-network node between $D_A$ and $D_B$;

wherein "y" is an integer greater than or equal to zero;

wherein "z" is an integer greater than or equal to zero; and wherein each "-" represents a link between two inferential-network nodes.

As non-limiting examples, two exemplary inferential-network paths that fall within the scope of the general form:

$$D_A - [D_X]_y - D_B$$

is a first inferential-network path having four intervening inferential-network nodes:

$$D_A - D_X - D_X - D_X - D_X - D_B$$

and a second inferential-network path having five intervening inferential-network nodes:

$$D_A - D_X - D_X - D_X - D_X - D_X - D_B$$

Other non-limiting examples of two exemplary inferential-network paths that fall within the scope of the general form:

$$D_A \dashv D_X \dashv_Z D_B$$

is a third inferential-network path having one intervening inferential-network node:

$$D_A\text{-}D_X\text{-}D_B$$

and a fourth inferential-network path having two intervening inferential-network nodes:

$$D_A\text{-}D_X\text{-}D_X\text{-}D_B$$

A non-limiting visual example of one of the embodiments for substituting a first inferential-network path with at least a portion of a second inferential-network path is provided below.

A first inferential-network path from $D_1$ to $D_7$:

$$D_1\text{-}D_2\text{-}D_3\text{-}D_4\text{-}D_5\text{-}D_6\text{-}D_7$$

wherein the portion of the first inferential-network path represented by:

$$\dashv D_2 \text{—} D_3 \text{—} D_4 \text{—} D_5 \text{—} D_6 \dashv$$

is substituted with a second inferential-network path:

$$\dashv D_2 \text{—} D_8 \text{—} D_9 \text{—} D_6 \dashv$$

thereby producing a new inferential-network path:

$$D_1\text{-}D_2\text{-}D_8\text{-}D_9\text{-}D_6\text{-}D_7$$

In the above non-limiting example of substituting a first inferential-network path with at least a portion of a second inferential-network path, the new social-network path has a different intervening path than the intervening path in the first inferential-network path.

Another embodiment of this technology is directed to copying or altogether removing a portion of an inferential network and substituting that portion back into a different section of the same inferential network. This same-inferential-network substitution embodiment is performed in a similar manner as the above-described substitution method for substituting a portion of a first inferential network into a second inferential network, with the exception that in this embodiment the portion of the network that is copied or altogether removed—is substituted back into a different location of the same inferential network from which it was taken.

To further define the use of computer readable logic in a substitution embodiment of this technology, computer-readable logic can be used to define the portions of a first inferential network that are to be substituted into a different portion of the first inferential network or that are to be substituted into a second inferential network. In order to define the inferential-network portions that are to be substituted or substituted into, an embodiment provides that the computer-readable logic identifies an existing path between two inferential-network nodes, and then locates alternate paths between the two inferential-network nodes from among paths in existing inferential networks.

There is no limit on the different types of substitutions that can be made into an inferential network or inferential-network path. In one embodiment, the substitution replaces or removes at least one inferential-network node in the intervening-node portion of an inferential-network path. In another embodiment, the substitution adds one or more additional inferential-network nodes to the intervening-node portion of an inferential-network path. In still another embodiment of the technology, the substitution replaces one or more intervening inferential-network nodes, removes one or more intervening inferential-network nodes, adds at least one or more intervening inferential-network nodes, rearranges one or more intervening inferential-network nodes, or a combination thereof to the intervening-node portion of an inferential-network path.

Another embodiment of this technology is directed to constructing an inferential network by grafting a section of a first inferential network onto at least one node in a second inferential-network. Still another embodiment of this technology is directed to copying or removing a section of a first inferential network and grafting it onto a different portion of the first inferential network. Grafting occurs when at least a portion of an inferential network is copied or removed from one section of the inferential network and directly linked to a node in another section of the inferential network. Grafting also occurs when a portion of a first inferential network is copied or removed from a section of the first inferential network and directly linked to a node in a second inferential network.

Below is a non-limiting visual example of a portion of a first inferential network that is grafted onto a second inferential network. The portion of the first inferential network represented by:

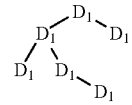

wherein each "$D_1$" is an inferential-network node from the first inferential network; and wherein each "-" is an inferential link between the inferential-network nodes, the portion of the second inferential network represented by:

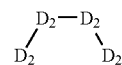

wherein each "$D_2$" is an inferential-network node from the second inferential network; and wherein each "-" is an inferential-network link between the inferential-network nodes, and the portion of the first inferential network grafted onto the portion of the second inferential network represented by:

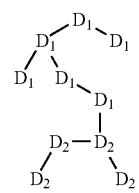

wherein "$D_1$", "$D_2$", and "-" are as described above; and wherein "$D_1$-$D_2$" represents the point of grafting.

Computer-readable logic can be used to perform the grafting of one or more collections of linked databases onto a node or another collection of linked databases.

In one grafting embodiment, inferential networks serve as non-limiting examples of collections of linked databases having highly-branched architectures upon which the method or system for grafting can be applied.

In one embodiment, the grafting method or system can be applied to grafting one inferential network to another inferential network wherein at least a portion of each of the inferential-network architectures can be described by the expression:

$$D_x \text{—} [D]_a$$

wherein $D_x$ is a seed inferential-network node;
wherein each D represents an inferential-network node;
wherein each "-" represents an inferential-network link between two inferential-network nodes; and
wherein "a" is an integer greater than or equal to 1.

As a non-limiting example, an architecture of an inferential network that falls within the scope of the expression:

$$D_x \text{—} [D]_a$$

wherein "a" is 4, is presented:

In another embodiment, the grafting method or system can be applied to grafting one inferential-network to another inferential-network wherein at least a portion of each of the inferential-network architectures can be described by the expression:

$$D_x \text{—} [D\text{—}]_a [D]_b$$

wherein $D_x$ is a seed inferential-network node;
wherein D represents an inferential-network node;
wherein each "-" represents an inferential-network link between two inferential-network nodes;
wherein a is an integer greater than or equal to 1;
wherein b is an integer greater than or equal to 0; and
wherein the value of each b is independently selected.

As non-limiting examples, two architectures of inferential networks that fall within the scope of the expression:

$$D_x \text{—} [D\text{—}]_a [D]_b$$

wherein "a" is 4 and wherein each "b" is 1, are presented:

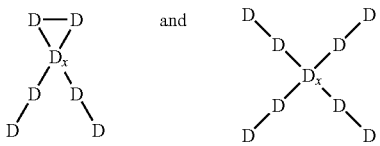

Still further, in another embodiment, the grafting method or system can be applied to grafting one inferential network to another inferential network wherein at least a portion of each of the inferential-network architectures can be described by the expression:

$$D_x \text{—} [D\text{—}]_a [D\text{—}]_b [D]_c$$

wherein $D_x$ is a seed inferential-network node;
wherein each D represents an inferential-network node;
wherein each "-" represents an inferential-network link between two inferential-network nodes;
wherein each a is an integer greater than or equal to one;
wherein each b is an integer greater than or equal to 0;
wherein each c is an integer greater than or equal to 0; and
wherein each b and c is independently selected.

As a non-limiting example, an architecture of an inferential network that falls within the scope of the expression:

$$D_x \text{—} [D\text{—}]_a [D\text{—}]_b [D]_c$$

wherein "a," "b," and "c" are as described above, is presented:

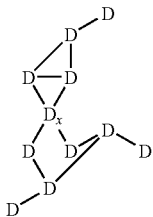

Yet another embodiment of this technology is directed to simultaneously displaying inferential-network search results in combination with internet search results, intranet system search results, or social-network-map data search results. In one embodiment, the internet or intranet search results are website search results. One embodiment for accomplishing this simultaneous display of search results uses computer-readable logic to use a first portion of a visual display screen, e.g., a computer monitor, to display inferential-network search results and use a second portion of the visual display screen to display internet search results, intranet search results, or social-network-map data search results. One embodiment for displaying inferential-network search results in combination with internet, intranet, or social-network-map data search results uses two separate electronic windows. Specifically, on a visual-display screen a first electronic window is used for displaying inferential-network search results, and a second electronic window is used for displaying internet, intranet, or social-network-map data search results. There is no limitation on the percentages of a screen that can be used to display either the inferential-network search results or the internet, intranet, or social-network-map data search results. In one embodiment, at least 50% of the visual display screen is used to display the inferential-network search results. In another embodiment, at least 10% of the visual display screen is used to display the inferential-network search results. In another embodiment, at least 50% of the visual display screen is used to display the internet, intranet, or social-network-map data search results. In still another embodiment, at least 10% of the visual display screen is used to display the internet, intranet, or social-network-map data search results.

In one embodiment, the inferential-network search, the internet search, the intranet search, the social-network-map data search, or a combination thereof use the same search term. In yet another embodiment, the inferential-network search, the internet search, the intranet search, the social-network-map data search, or a combination thereof are initiated simultaneously from a single visual-display-screen interface with the search initiator.

Another embodiment of this technology is directed to visually qualifying an inferential link between two inferential-network nodes in an inferential network. Visually qualifying an inferential link can be performed in a number of different ways, and this technology is not limit to any specific type of visual qualification. Non-limiting examples of visual qualifiers that can be used to visually qualify an inferential link between two inferential-network nodes in an inferential-network are: a colored line, a number on or in close proximity to a line, a line of varying thickness, a dashed line, a dotted line, or a combination thereof. More specifically, a visual link qualification can be used to qualify any inferential link in an inferential network, and in one embodiment, the inferential-network is made up either entirely or at least in part by inferential-network nodes. Visual qualifiers can be used to indicate the type of inferential link between two inferential-network nodes. As non-limiting examples, a visual qualifier for an inferential link between inferential-network nodes can be used to describe the strength of the inferential link or the length of time the first inferential-network node has been linked to the second inferential-network node.

In one embodiment for using visual qualifiers to describe a link between two linked databases, the linked databases are linked websites. In another embodiment for using visual qualifiers to describe a link between two linked databases, the linked databases are linked social network nodes.

A non-limiting example of a method for displaying a portion of an inferential network, and specifically an inferential link between two inferential-network nodes, uses color to visually qualify the link. Specifically, an inferential link between two inferential-network nodes has the form:

$$D_1\text{-}c\text{-}D_2$$

wherein "$D_1$" is a first inferential-network node,
wherein "$D_2$" is a second inferential-network node,
wherein "-" represents an inferential link between the first inferential-network node and the second inferential-network node,
wherein "c" represents a color designation of the "-" link between the first inferential-network node and the second inferential-network node, and
wherein the color designation of the "-" link qualifies the inferential link as any of two or more possible link qualifications.

An additional non-limiting example of a method for displaying a portion of an inferential network, and specifically an inferential link between two inferential-network nodes, uses a number to visually qualify the link. Specifically, an inferential link between two inferential-network nodes has the form:

$$D_1\text{-}n\text{-}D_2$$

wherein "$D_1$" is a first inferential-network node,
wherein "$D_2$" is a second inferential-network node,
wherein "-" represents an inferential link between the first inferential-network node and the second inferential-network node, and
wherein "n" is a number that qualifies the inferential link between the first inferential-network node and the second inferential-network node.

This technology also provides for using computer-readable logic that searches inferential-network data for multiple terms or phrases by initiating the search with a single search term. In other words, an embodiment is directed to using a single term or phrase to initiate a multi-term search of inferential-network data. Computer-readable logic initiates a multi-term search of the inferential-network data by first identifying one or more terms or phrases that will be searched in addition to the single search term or phrase that was entered by a user or searcher. The computer-readable logic does this by associating the single search term or phrase with a predetermined set of additional search terms or search phrases that have been pre-selected to be searched in addition to the single search term or phrase. The computer-readable logic then applies both the single search term or phrase and the predetermined set of additional search terms or search phrases in a search of one or more databases of inferential-network data.

Additionally, if a search term or search phrase used in an inferential-network data search does not literally match any terms or phrases in the inferential-network data, the present technology has provided computer-readable logic for matching specific conditions, treatments, pharmaceutical drugs, and medical specialties to selected search terms and phrases. Therefore, computer-readable logic will search for at least one predetermined search term or phase that has been associated with the initial search term or phrase. And although there may be no literal match to the initial search term, meaningful search results can still be generated based upon the social search engine's computer-readable logic searching for additional related terms or phrases.

An embodiment of this technology is also directed to using inferential network data to order search results. Stated differently, search results can be ordered as a function of inferential-network data, e.g., strengths of inferential links or inferential-network node qualifications. The method by which the search results are obtained is in no way a limitation on the technology, e.g., the search results can be obtained by a broadcast search, a directed search, or any other known search method. In an embodiment, ordering of search results can be accomplished by first identifying inferential-network nodes that represent each of the search results, and then using the inferential-network data relating to each of the inferential-network nodes to assign an order to the results. As a non-limiting example, if a broadcast search returns three search results and each of the search results is represented by an inferential-network node in an inferential network, then the three search results could be ordered in descending order as a function of the combined strengths of all inferential links leading to each of the nodes, wherein the links are qualified with the search term or search topic. To illustrate this point, if each of the one or more inferential links leading to each of the three nodes all had the same strength and were qualified with the search term or search topic, then the ordering of search results would be based upon which of the three nodes had the greatest number of inferential links leading to it. Alternatively, the search results could be ordered as a function of one or more inferential-network node qualifications, wherein each of the inferential-network nodes relates to one of the search results.

An inferential network can exist in cyberspace or any other medium suitable for collecting, holding, or describing data relating thereto. Further, computer-readable logic can be used to perform any of the above embodiments relating to inferential networks.

Alternate embodiments of the technology described herein include an electronic newsletter feature that updates a user of developments that have taken place with first degree contacts in the user's personal communication network. As the user's personal communication network grows, it becomes increasingly difficult to maintain a working knowledge of the types of information each contact could possibly provide, as well as the status of each contact. After a person is invited to become a first-degree contact in a user's personal communication network, that user can receive public speaking engagements, publications, awards, promotions, an advanced degree in a particular field of expertise, and the like. All such accolades are likely to influence the user's opinion of the first-degree contact, and the subjects about which the user communicates with the first-degree contact.

Figure 25:
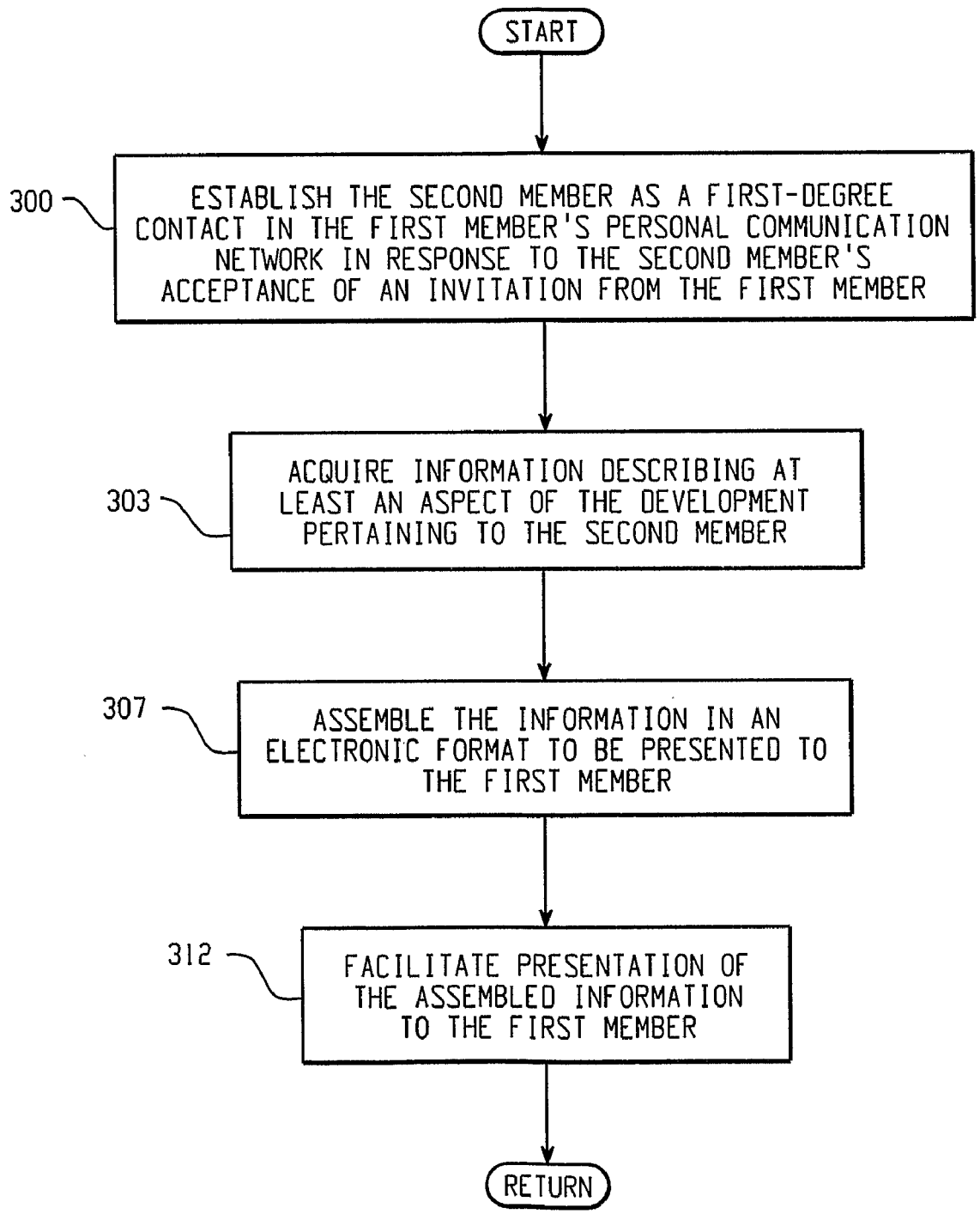
FIG. 25 is a flow diagram illustrating steps in an example method for updating members of the communications network.

Accordingly, the present technology provides a method, a computer-readable medium including computer-executable instructions, and a system for updating a user, or first member of a personal communication network about a development pertaining to a second member of the personal communication network. The method, represented schematically in FIG. 25, comprises the step of establishing the second member as a first-degree contact in the first member's personal communication network in response to the second member's acceptance of an invitation from the first member. The details concerning this step, illustrated as 300 in FIG. 25, were discussed above in the description of the invitation-and-acceptance process.

Once the first-degree contact has been established in the user's personal communication network, the method further includes the step of acquiring information describing at least an aspect of the development pertaining to the second member, illustrated as step 303. As the first-degree contact updates his profile to reflect recent developments such as an award he received, a public-speaking arrangement, experience in a field of interest, a change in practice interests, a published article, and any other change that was not previously included in the first-degree contact's profile, a notice is generated describing at least one aspect of the development. The notice is an electronic record of the update to the first-degree contact's profile that can be automatically generated according to computer-executable instructions upon the alteration to the first-degree contact's profile, and spooled at a server in communication with a network.

The method further includes the step of assembling the information in an electronic format to be presented to the first member at step 307. The information about the development noted in the first-degree contact's profile can be assembled into an electronic newsletter format to be transmitted and displayed to the user. The electronic format can include one or more of a title, a subject line, a date, an image, and any other description of the development.

The information describing the development added to the first-degree contact's profile is transmitted, presented, or both at step 312 to the user. The information can be transmitted to the user daily, weekly, or periodically; as desired by the user; or substantially in real time as developments are added as alterations of the first-degree contact's profile.

The information transmitted to the user can optionally include a hyperlink that directs the user to an electronic document with details concerning the development reflected in the first-degree contact's profile. A hyperlink is an electronically clickable graphic, word or phrase that jumps the user to another portion of the same electronic document, or to another electronic document when selected. Examples of the electronic document to which the hyperlink can direct the user include the first-degree contact's profile, an electronic publication authored by the first-degree contact, a website, and the like.

Alternate embodiments include an electronic newsletter that presents developments reflected in the profile of a plurality of different first-degree contacts as a single edition of the newsletter.

The technology further includes a computer-readable medium having computer-executable instructions for performing a method of updating a first member of a personal communication network about a development pertaining to a second member of the personal communication network. As described above, the method includes the steps of establishing the second member as a first-degree contact in the first member's personal communication network in response to the second member's acceptance of an invitation from the first member; recording information describing at least an aspect of the development pertaining to the second member; assembling the information in an electronic format to be presented to the first member; and facilitating presentation of the assembled information to the first member.

Yet another embodiment of the present technology includes a system for updating a first member of a personal communication network about a development pertaining to a second member of the personal communication network. The system comprises a network that includes a server in communication with a remotely-located computer terminal over a communication link such as an Internet connection. At least one of the server and the computer terminal includes computer-executable instructions for establishing the second member as a first-degree contact in the first member's personal communication network in response to the second member's acceptance of an invitation from the first member, as described in detail above. Computer-executable instructions are also provided for controlling the recording of information describing at least an aspect of the development pertaining to the second member. Further, computer-executable instructions are provided to at least one of the server and the computer for assembling the information in an electronic format to be presented to the first member and for facilitating presentation of the assembled information to the first member.

Although the description of the technology above explains that developments pertaining to a first-degree contact can be included in the electronic newsletter, the technology is not limited to reporting developments pertaining only to one or more first-degree contacts. In another embodiment, computer-executable instructions also provide an interface allowing the user to select the number of degrees that separate the user from those contacts whose developments are to be included in the newsletter. For instance, the interface allows the user to set the number of degrees of separation to three, meaning that any developments pertaining to the user's contacts in his personal communication network that are separated from the user by three degrees or less will be reported in the newsletter. Thus, the user can filter the contacts whose developments the user wants to appear in the newsletter from those contacts whose developments the user does not wish to appear in the newsletter.

Similarly, alternate embodiments include computer-executable instructions that provide an interface allowing the user to select particular contacts from the user's personal communication network whose developments the user desires to include in the newsletter. This way, the user can select individual contacts from his third-degree contacts, for example, providing the user with updates about developments pertaining to said individuals in the newsletter without having to receive updates about developments pertaining to each and every third-degree contact. Again, the user can select individual contacts from among his first, second, third, fourth, . . . $n^{th}$-degree contacts, where n can be any positive integer. And yet another embodiment allows the user to select any individual who has been invited into the network established by the present technology, regardless of whether that individual is "connected" to the user by a communication path. The user will then also receive updates in the newsletter of developments pertaining to the individual selected.

In light of the foregoing, it should thus be evident that the technology described herein substantially improves the art. While, in accordance with the patent statutes, only some embodiments of the present technology have been described in detail hereinabove, the technology is not to be limited thereto or thereby. Rather, the scope of the technology shall include all modifications and variations that fall within the scope of the attached claims.

As an example of such a variation, another example of the technology for updating a member about a development utilizes historical search data to provide additional functionality. In this example, a first member is updated about a change to the profile of a second member of the network. This occurs as a result of a second member having their profile automatically updated with historical search data related to the second member. The historical search data includes a search term and information describing an association between the search term and the second member.

Figure 26:
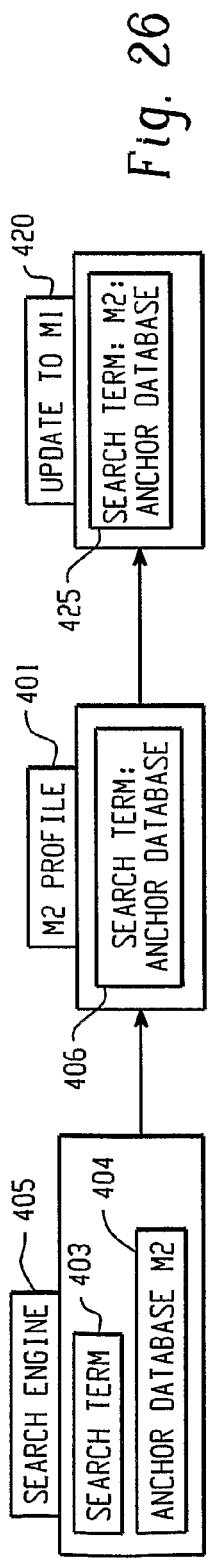
FIG. 26 is a flow diagram illustrating a first example method for updating a profile with historical search data.

In a first example, depicted in FIG. 26, the historical search data is a record that a second member was selected as a person likely to have information relating to a search term, (i.e., that the second member was selected as an anchor database 404). For example, a member enters the search term "malaria" 403 in a search engine 405 and designates the second member as a person likely to have information relating to malaria 404. The second member's profile 401 is then updated with a record 406 indicating that the second member was designated as a person likely to have information relating to the search term "malaria." A first member then receives an update 420 that indicates that the second member was designated as a person likely to have information regarding the search term "malaria" 425. This information may enable the first member to trust the second member more for information on malaria, since other members of the personal communication network have designated the second member as a person likely to have information on malaria.

Figure 27:
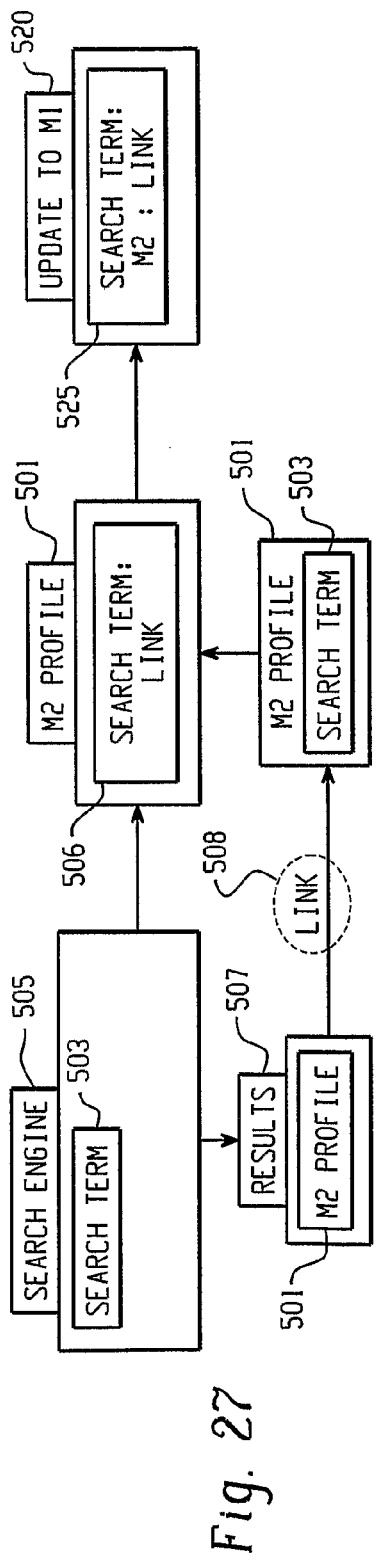
FIG. 27 is a flow diagram illustrating a second example method for updating a profile with historical search data.

In a second example, depicted in FIG. 27, the historical search data is a record indicating that a member of the personal communication network linked to the second member's profile 501 as a result of entering a particular search term 503. For example, a member enters the search term "malaria" 503 in a search engine 505. The search engine 505 retrieves results 507 matching the search term 503, which include the second member's profile 501. The member then links to (e.g., by selecting a hyperlink 508) the second member's profile 501. The second member's profile 501 is then updated with a record 506 indicating that the second member's profile was linked to as a result of a search for malaria. The total number of times that a member's profile is linked to may also be indicative of their influence in the field, and would thus be something that other user's may want to be updated about—this may also be considered historical search data. A first member receives an update 520 that indicates that the second member was linked to as a result of a search for malaria 525. This may enable the first member to trust the second member more for information on malaria, since it is apparent that other persons have linked to the second member as a result of searching for information on malaria.

Figure 28:
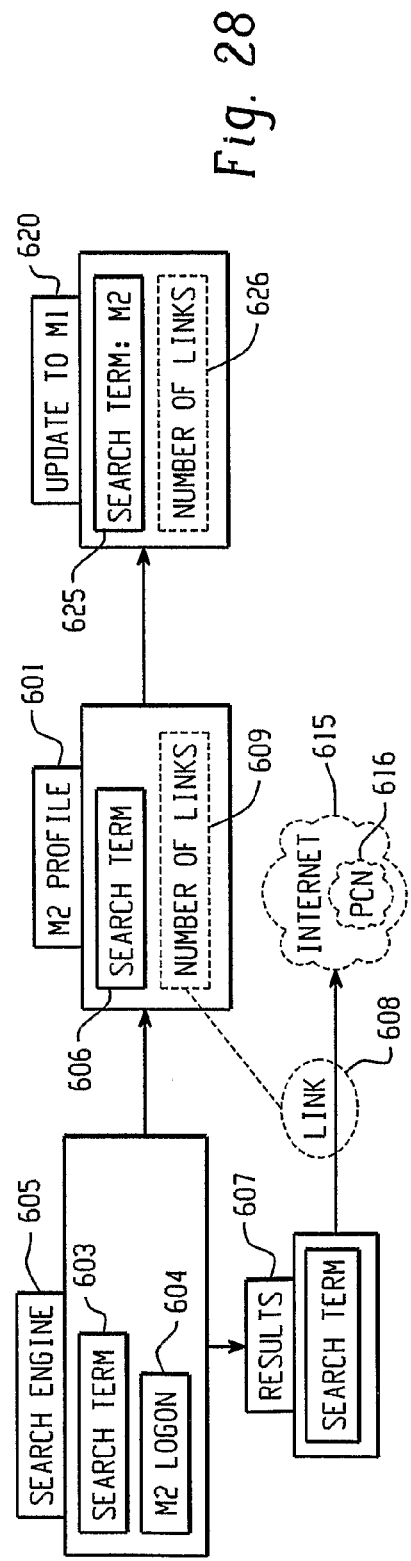
FIG. 28 is a flow diagram illustrating a third example method for updating a profile with historical search data.

In a third example, depicted in FIG. 28, the historical search data is a record that a second member entered a search term 603, and/or linked to a number of results 607 associated with the search term 603. For example, the second member enters the search term "malaria" in a search engine 605, after logging on to the personal communication network 604. The search engine 605 retrieves results 607 matching the search term 603, and the member links to (e.g. by selecting a hyperlink 608) one or more results retrieved from the internet as a whole 615 or the personal communication network 616. The second member's profile 601 is updated with a record 606 indicating that the second member searched for information relating to malaria and/or the number of results the member linked to 609. A first member receives an update 620 that indicates that the second member searched for information relating to malaria 625 and/or the number of results the member linked to 626. In this manner the first member is kept apprised of the research of his colleagues. This may enable the first member to trust the second member more for information on the search topic, or it may notify the first member that the second member has gained knowledge in a new area.

One or more of three types of historical search data mentioned above may be added to the second member's profile and may be included in the update to the first member. For each of these types of historical search data, the record may be generated in the second member's profile immediately, or a separate server may record the historical search data, and then later generate the update to the profile of the second member with the search and link data. In the latter situation, the update to the profile may occur after a certain threshold of searches or links occurs.

The historical search data may be acquired from searches entered in an interface dedicated to the personal communication network and/or searches entered in other web search engines. As more and more searches and links to members of the network take place, the historical search data reflects which members are generally regarded by other members as sources for information related to certain search topics, or, in the third example above, the historical search data reflects what topics members themselves have been researching.

The member historical search data is incorporated in the previously described system and method for updating a first member about a development pertaining to a second member of the personal communication network. Examples of forms for updating the first member include, without limitation, an electronic newsletter, a text message, or a website. In this example, the update notification that is sent to the first member includes one or all of the three types of historical search data described in FIGS. 26-28 above. In one example, the update also indicates who the network member was that linked to the second member for the particular search term. The system determines this based on login information that is entered before the search and link occurs. This may also include displaying a visual map or textual description of how the first member is connected to the second member in the personal communication network.

An update may take place to the linked-to member's profile every time a search and link occurs, or, to reduce processing requirements, the member profile may only be updated periodically or after a certain threshold of searches and links are reached. The update containing historical search data may be invisible to users that are browsing the information in the profile of the member. Additionally, the details of the historical search data pertaining to the particular member may not be stored in the member's database itself. Instead, the information might be stored at a main server, with only a link to the details stored in the member's database.

The update notification may be generated every time a search and link occurs to the second member, after a certain threshold of searches and links are reached, or whenever the user logs on to their account in the personal communication network.

What is claimed is:

1. A computer implemented method of communicating to a first member of a personal communication network of professionals about an accolade pertaining to a second member of the personal communication network of professionals, the method comprising the steps of:
    establishing the second member as a contact of the first member in the personal communication network of professionals, the personal communication network of professionals being a type of social network for professional persons that is based upon communication links between professional persons;
    updating a second member's profile in the personal communication network of professionals with information pertaining to an accolade of the second member, the accolade being information related to a professional accomplishment;
    acquiring the information pertaining to the accolade from the second member's profile; and
    presenting the acquired information pertaining to the accolade to the first member for visual notification of the updating, wherein the acquiring and the presenting occur automatically upon the updating of the second member's profile with the information pertaining to the accolade of the second member.

2. The method of claim 1, wherein the personal communication network of professionals is a type of social network for professional persons that is based upon communication links between electronically stored databases that are associated with professional persons.

3. The method according to claim 1, wherein the accolade is at least one of a publication by the second member, a newly-acquired skill, an award, a promotion, a change in the second member's knowledge base, an advanced degree, and a speaking engagement.

4. The method according to claim 1, further comprising the steps of:
    acquiring information about an accolade pertaining to a third person who has previously received an invitation to join the personal communication network of professionals;
    presenting the information pertaining to the accolade to the first member;
    wherein the third person is selected by the first member.

5. The method according to claim 1, further comprising the step of:
    formatting the information pertaining to the accolade of the second member into a newsletter to be occasionally transmitted to the first member or received by the first member.

6. The method according to claim 5, wherein the newsletter is e-mailed to the first member or is made available to the first member through a website interface dedicated to the personal communication network.

7. The method according to claim 1, further comprising the step of:
    establishing a hyperlink to an electronic document that can be retrieved over a network and that provides details of the information pertaining to the accolade of the second member;
    wherein the hyperlink is automatically presented to the first member upon the updating of the second member's profile with the information pertaining to the accolade of the second member.

8. The method according to claim 1, wherein the step of acquiring information comprises the step of:
    spooling a notice including the information pertaining to an accolade of the second member in the second member's profile, the notice being automatically transmitted upon entry of the information pertaining to the accolade in the second member's profile.

9. The method according to claim 1, wherein the second member's profile in the personal communication network of professionals is updated with historical search data, the historical search data including a search term that was entered in a search engine and information describing an association between the search term and the second member.

10. The method according to claim 9, wherein the association is that the second member was designated by a member of the personal communication network of professionals as being likely to possess information on the search term.

11. The method according to claim 1, wherein the information pertaining to the accolade may be viewed by the first member and affect the first member's trust of the second member, or inform the first member of an additional area of expertise of the second member.

12. A computer implemented method of updating a first member of a personal communication network with historical search data that is associated with a second member of the personal communication network, the method comprising the steps of:
    acquiring historical search data, the historical search data including a search term that was entered in a search engine and information describing an association between the search term and the second member;
    updating the second member's profile in the personal communication network with the historical search data;
    retrieving the historical search data from the second member's profile; and
    presenting the historical search data in electronic format to the first member for visual notification of the updating, where the retrieving and the presenting occurs automatically upon the updating of the second member's profile in the personal communication network with the historical search data.

13. The method according to claim 12, wherein the association is that the second member was designated by a member of the personal communication network as being likely to possess information on a particular subject that is being searched for.

14. The method according to claim 13, wherein the historical search data also indicates which personal communication network member designated the second member as a person likely to have information about the search term.

15. The method according to claim 12, wherein the association is that the second member's profile was linked to as a result of the search term being entered in the search engine.

16. The method according to claim 15, wherein the historical search data also indicates which personal communication network member linked to the second member for the particular search term.

17. The method according to claim 15, wherein the historical search data further comprises the total number of links to the second member.

18. The method according to claim 12, wherein the association is that the second member has performed a search on the search engine that includes the search term.

19. The method according to claim 18, wherein the association further includes a number of links that the second member has traversed as a result of the search.

20. The method according to claim 12, wherein the personal communication network is a type of social network that is based upon communication links between electronically stored databases that are associated with persons.

21. The method according to claim 12, wherein the step of assembling the historical search data in an electronic format comprises the step of:
formatting the historical search data into a newsletter to be transmitted to the first member or received by the first member.

22. The method according to claim 12, further comprising the step of:
establishing a hyperlink from the electronic format presented to the first member to an electronic document that provides details of the historical search data.

23. The method according to claim 12, wherein the step of assembling historical search data includes acquiring data from searches performed on a search engine dedicated to searching the profiles of members of the personal communication network.

24. The method according to claim 23, wherein the step of assembling historical search data further includes acquiring data from searches performed on web search engines.

25. The method according to claim 12, wherein the step of assembling historical search data includes acquiring data from searches performed on web search engines.

26. The method according to claim 12, wherein the step of presenting the historical search data to the first member includes making the historical search data available to the first member through a website interface.

27. The method according to claim 12, wherein the step of updating is triggered by one of the following occurrences: a search and link to the second member, a certain threshold of searches and links are reached, or the user logs on to their account in the personal communication network.

28. The method according to claim 12, wherein the historical search data is displayed as part of a display of the second member's profile, and the profile is accessible for viewing through an internet interface.

29. The method according to claim 12, wherein a visual or textual description of how the first member is connected to the second member in the personal communication network is also presented to the first member.

30. The method according to claim 12, wherein in the personal communication network the members are associated with one another based on trust, and presenting the historical search data functions to affect the first member's trust of the second member on a topic associated with the search term.

31. The method according to claim 12, wherein the historical search data apprises the first member of an additional area of expertise of the second member.

32. A system for communicating to a first member of a personal communication network about an accolade pertaining to a second member of the personal communication network, the accolade being information related to a professional accomplishment, the system comprising:
a network that includes a server in communication with a remotely-located computer terminal over a communication link;
wherein at least one of the server and the computer terminal comprises:
means for establishing the second member as a first-degree contact of the first member in the personal communication network;
means for updating a second member's profile in the personal communication network with information pertaining to an accolade of the second member;
means for acquiring the information pertaining to the accolade from the profile of the second member;
means for presenting the acquired information pertaining to the accolade to the first member for visual notification of the updating, wherein the acquiring the information pertaining to the accolade of the second member occurs automatically, and wherein the presenting the acquired information pertaining to the accolade to first member happens automatically upon the acquiring.

33. The system according to claim 32, wherein at least one of the server and the computer terminal further comprises means for establishing a hyperlink to be presented to the first member, wherein the hyperlink directs the first member to an electronic document that can be retrieved over the network and that provides details of the accolade, and wherein the hyperlink is automatically presented to the first member upon the updating of the second member's profile with the information pertaining to the accolade of the second member.

34. The system according to claim 32, further comprising:
means for formatting the acquired information into a newsletter to be occasionally received by or transmitted to the first member of the communication network.

35. The system according to claim 32, wherein the means for acquiring the information comprises computer readable logic that controls the recording of information that was added to the second member's profile since a previous presentation of the assembled information to the first network member.

36. The system according to claim 32, wherein the accolade is at least one of a publication, a newly-acquired skill, an award, a promotion, a change in the second member's knowledge base, an advanced degree, and a speaking engagement.

37. The system according to claim 32, further comprising means for directing the first member to an electronic document that can be retrieved over the network that provides details of the accolade pertaining to the second member, and wherein the means for directing the first member to an electronic document is automatically presented to the first member upon the updating of the second member's profile with the information pertaining to the accolade of the second member.

38. The system according to claim 32, further comprising means for updating the second member's profile with historical search data, the historical search data including a record that the second member's profile was linked to as a result of a search term being entered in a search engine, and a record of the search term that was entered.

39. The system according to claim 38, wherein the historical search data further includes a record that the second member was designated by a member of the personal communication network as being likely to possess information on a particular subject that is being searched for.

40. The method system according to claim 32, further comprising means for presenting a description of how the first member is connected to the second member in the personal communication network.

* * * * *